United States Patent
Araki et al.

(10) Patent No.: US 7,496,482 B2
(45) Date of Patent: Feb. 24, 2009

(54) SIGNAL SEPARATION METHOD, SIGNAL SEPARATION DEVICE AND RECORDING MEDIUM

(75) Inventors: Shoko Araki, Kyotanabe (JP); Hiroshi Sawada, Nara (JP); Shoji Makino, Machida (JP); Ryo Mukai, Nara (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 452 days.

(21) Appl. No.: 10/539,609

(22) PCT Filed: Sep. 1, 2004

(86) PCT No.: PCT/JP2004/012629

§ 371 (c)(1),
(2), (4) Date: Jun. 17, 2005

(87) PCT Pub. No.: WO2005/024788

PCT Pub. Date: Mar. 17, 2005

(65) Prior Publication Data

US 2006/0058983 A1 Mar. 16, 2006

(30) Foreign Application Priority Data

Sep. 2, 2003 (JP) ............................. 2003-309720
Jul. 1, 2004 (JP) ............................. 2004-195818
Jul. 1, 2004 (JP) ............................. 2004-195867

(51) Int. Cl.
*G06F 15/00* (2006.01)
(52) U.S. Cl. .................. 702/190; 702/189; 702/195; 702/196; 375/232; 375/377; 704/203; 704/205
(58) Field of Classification Search ............... 702/190, 702/189, 195–196; 375/377, 232; 704/203, 704/205

See application file for complete search history.

(56) References Cited

U.S. PATENT DOCUMENTS 5,786,872 A * 7/1998 Miyazaki et al. ............ 348/669

(Continued)

FOREIGN PATENT DOCUMENTS

JP 2004-145172 5/2004

(Continued)

OTHER PUBLICATIONS

Scott Rickard et al., "On the Approximate W-Disjoint Orthogonality of Speech", Proc. ICASSP, vol. 1, pp. 529 to 532, 2002.

(Continued)

*Primary Examiner*—John E. Barlow, Jr.
*Assistant Examiner*—Hien X Vo
(74) *Attorney, Agent, or Firm*—Oblon, Spivak, McClelland, Maier & Neustadt, P.C.

(57) ABSTRACT

A method and a device for signal separation. First, values of signals observed by M sensors are transformed into frequency domain values, and these frequency domain values are used to calculate relative values of the observed values between the sensors at each frequency. These relative values are clustered into N clusters, and the representative value of each cluster is calculated. Then, using these representative values, a mask is produced to extract the values of the signals emitted by V ($1 \leq V \leq M$) signal sources from the frequency-domain signal values, and this mask is applied to the frequency-domain signal values. After that, if $V=1$ then the limited signal is output directly as a separated signal, while if $V \geq 2$ then the separated values are obtained by separating this limited signal with separation techniques such as ICA.

30 Claims, 29 Drawing Sheets

U.S. PATENT DOCUMENTS 6,011,824 A * 1/2000 Oikawa et al. .............. 375/377
2003/0103561 A1 6/2003 Rickard et al.

OTHER PUBLICATIONS

Hiroshi Saruwatari, "[Invited Paper] Blind Source Separation for Speech and Acoustic Signals" The Institute of Electronics, Information and Communication Engineers, vol. 101, No. 669, CS2001-134, pp. 59 to 66, Feb. 25, 2002.

Shoko Araki et al., "Jikan Shuhasu Masking to ICA no Heiyo ni yoru Ongensu > Microphone-su no Baai no Blind Ongen Bunri", The Acoustical Society of Japan (ASJ)2003 Nen Shuki Kenkyu Happyokai Koen Ronbunshu -I-, 1-P-5, pp. 587 to 588, Sep. 17, 2003.

Aapo Hyvaerinen, Juha Karhunen, Erkki OJA, "Independent Component Analysis" John Wiley & Sons, ISBN 0-471-40540, 2001.

H. Sawada, R. Mukai, S. Araki and S. Makino, "A Robust and Precise Method for Solving the Permutation Problem of Frequency-Domain Blind Source Separation," Proc. the 4th International Symposium on Independent Component Analysis and Blind Signal Separation (ICA 2003), pp. 505-510, 2003.

S. Rickard, R. Balan, J. Rosca, "Real-Time Time-Frequency Based Blind Source Separation" 3rd International Conference on Independent Component Analysis and Blind Source Separation (ICA2001), San Diego, p. 651-656, Dec. 2001.

F. Abrard, Y. Deville, P. White, "From Blind Source Separtion To Blind Source Cancellation in the Underdetermined Case: A New Approach Based on Time-Frequency Anaysis" Proceedings of the 3rd International Conference on Independent Component Analysis and Signal Separation (ICA'2001), pp. 734-739, San Diego, California, Dec. 2001.

Y. Deville, "Temporal and time-frequency correlation-based blind source separation methods," in Proc., ICASSP2003, pp. 1059-1064, Apr. 2003.

Morio Onoe (trans.): "Pattern Classification," Shingijutsu Communications, ISBN 4-915851-24-9, Chapter 10.

Shoko Araki: "Blind Separation of More Speech Signals than Sensors using Time-Frequency Masking and Mixing Estimation" 1-P-4, Sep. 2003.

Audrey Blin et al.: Blind Source Separation when Speech Signals Outnumber Sensors using a Sparseness—Mixing Matrix Estimation (SMME), International Workshop on Acoustic Echo and Noise Control (IWAENC2003), Sep. 2003.

Shoko Araki et al.: "Underdetermined Blind Separation of Convolutive Mixtures of Speech by Combining Time-frequency Masks and ICA" Mo4.D.1 pp. I-321 to I-324, 2004.

Audrey Blin et al.: Undertermined Blind Source Separation for Convolutive Mixtures Exploiting a Sparseness—Mixing Matrix Estimation (SMME), Th.P1.11, IV-3139-3142, 2004.

Shoko Araki et al.: "Underdetermined Blind Separation for Speech in Real Environments with Sparseness and ICA" 0-7803- 8484-9/04/$20.00 © 2004 IEEE, III-881-884.

Audrey Blin et al.: "A Sparseness- Mixing Matrix Estimation (SMME) Solving the Underdetermined BSS for Convolutive Mixtures" 0-7803-9595-9/04/$20.00 © 2004 IEEE IV-85-88.

Shoko Araki et al.: "Underdetermined Blind Speech Separation with Directivity Pattern based Continuous Mask and ICA" EUSIPCO (European Signal Processing Conference), pp. 1991-1994, Sep. 6-10, 2004.

Shoko Araki et al.: "Underdetermined Blind Separation of Convolutive Mixtures of Speech with Directivity Pattern Based Mask and ICA" C.G. Puntonet and A. Prieto (Eds.) ICA 2004, LNCS 3195, pp. 898-905, 2004.

Shoko Araki et al.: Source Extraction from Speech Mixtures with Null-Directivity Pattern based Mask HSCMA, Rutgers University, Piscataway, New Jersey, USA, pp. d-1-2, Mar. 17-18, 2005.

Stefan Winter et al.: "Overcomplete BSS for Convolutive Mixtures Based on Hierarchical Clustering" C.G. Puntonet and A. Prieto (Eds.): ICA 2004, LNCS 3195, pp. 652-660, 2004.

Stefan Winter et al.: "Hierarchical clustering to overcomplete BSS for convolution mixtures" Workshop on Statistcal and Perceptual Audio Processing SAPA-2004, Oct. 3, 2004, Jeju, Korea.

A. Ossadtchi et al.: "Over-complete Blind source separation by applying sparse decomposition and information theoretic based probabilistic approach" ©2000 HRL Laboratories, LLC, all rights reserved.

J. Michael Peterson et al.: "A Probabilistic Approach for Blind Source Separation of Underdetermined Convolutive Mixtures" 0-7803-7663-3/03/$17.00 © 2003 IEEE, VI-581-584.

Stefan Winter et al.: "Hierarchical clustering applied to overcomplete BSS for convolutive mixtures" NTT Communication Science Laboratories, NTT Corporation.

Shoko Araki et al., "Jikan Shuhasu Masking to ICA no Heiyo ni yoru Ongensu > Microphone-su no Baai no Blind Ongen Bunri", The Acoustical Society of Japan (ASL)2003 Nen Shuki Kenkyu Happyokai Koen Ronbunshu -I-, 1-P-5, pp. 587 to 588, Sep. 17, 2003. (submitting English Translation of Introduction only, reference Previously filed on Jun. 17, 2005).

Futoshi Asano, et al. "Combined Approach of Array Processing and Independent Component Analysis for Blind Separation of Acoustic Signals", IEEE Transactions on Speech and Audio Processing, vol. 11, No. 3, May 2003, XP-011079702, pp. 204-215.

Pau Bofill, et al. "Blind Separation of more Sources Than Mixtures Using Sparsity of Their Short-time Fourier Transform", International Workshop on Independent Component Analysis and Blind Signal Separation, Jun. 19, 2000, XP-008005807, pp. 87-92.

Shoko Araki, et al. "Blind Separation of More Speech than Sensors with Less Distortion by Combining Sparseness and ICA" International Workshop on Acoustic Echo and Noise Control, Sep. 2003, XP-002459797, pp. 271-274.

* cited by examiner

SIGNAL SEPARATION METHOD, SIGNAL SEPARATION DEVICE AND RECORDING MEDIUM

TECHNICAL FIELD

The present invention relates to the field of signal processing, and in particular it relates to a signal separation method, a signal separation device and a signal separation program that can be used to estimate a source signal (target signal) in situations where the required target signal cannot be obtained by direct observation and the target signal is observed as a mixture with other signals, and to a recording medium that stores such a program.

BACKGROUND ART

Hitherto, blind source separation (BSS) has been known as a technique for separating and extracting the original source signals from a mixed signal consisting of a mixture of a plurality of source signals (e.g., audio signals), without using any prior knowledge about the source signals or the mixing process. FIG. 27A shows a block diagram that illustrates the concept of this blind source separation technique.

As this figure shows, a plurality of (in this case, N) signal sources 701 emit source signals $s_i$ (i=1, ..., N) which are mixed together and observed with a plurality of (in this case, M) sensors 702, and under these conditions the separated signals $y_k$ (k=1, ..., N) estimated to correspond to the source signals are extracted from these observed signals $x_j$ (j=1, ..., M). Here, the process that takes place between the source signals $s_i$ emitted from signals sources 701 and the observations by sensors 702 is referred to as the "mixing process", and the process whereby the separated signals are extracted from the observations of sensors 702 is called the "separation process".

To start with, the observed signals and the separation problem are formularized as follows.

A Model of Mixed Signals (Observed Signals) in Real Environments

First, the mixing process is modeled as follows.

Here, N is the number of signal sources 701, M is the number of sensors 702, $s_i$ is the signal (source signal) emitted from the i-th signal source 701 (signal source i), and $h_{ji}$ is the impulse response from signal source i to the j-th sensor 702 (sensor j). The signal $x_j$ observed at sensor j is modeled by the convolutive mixtures of these source signals $s_i$ and impulse responses $h_{ji}$ as follows:

FORMULA 1 (1)

$$x_j(t) = \sum_{i=1}^{N} \sum_{p=1}^{P} h_{ji}(p) s_i(t - p + 1)$$

Here, the term "convolution" means that the signals are added together after being delayed and being multiplied by specific coefficients in the signal propagation process. It is assumed that all the signals are sampled at a certain sampling frequency and represented by discrete values. In Formula (1), P represents the length of the impulse response, t represents the sampling time, and p represents a sweep variable ("sweep" being an operation whereby different coefficients are applied to each sample value of a time-shifted signal). The N signal sources 701 are assumed to be statistically mutually independent, and each signal is assumed to be sufficiently sparse. Here, "sparse" means that the signal has a value of zero at most time t—sparsity is exhibited by speech signals, for example.

The aim of BSS is to obtain separated signals $y_k$ from the observed signals $x_j$ by estimating a separation system (W) 703 without any prior knowledge of the source signals $s_i$ or impulse responses $h_{ji}$.

Since convolutional mixing problems are complicated to address and the assumption of sparsity holds better in the time-frequency domain, an effective way of addressing the above problem involves first applying a short-time discrete Fourier transform (DFT) to the abovementioned Formula (1) to transform the signal into the time-frequency domain. In the time-frequency domain, the abovementioned Formula (1) becomes $$X(f,m) = H(f) S(f,m)$$

where f is the frequency, and m represents the timing of the DFT frames. H(f) is an (M×N) matrix whose ji element is the frequency response $H_{ji}(f)$ from signal source i to sensor j, and is referred to as the mixing matrix. Also, $S(f,m) = [S_1(f,m), \ldots, S_N(f,m)]^T$ and $X(f,m) = [X_1(f,m), \ldots, X_M(f,m)]$ are the DFT results obtained for the source signals and observed signals, respectively. Here, the notation $[\alpha]T$ denotes the transposed matrix of $\alpha$. Furthermore, S(f,m) and X(f,m) are vectors.

Hereafter, explanations are given in the time-frequency domain.

Model of the Separation Process

The separation process is modeled as follows.

First, let W(f,m) be an (N×M) matrix whose jk element is the frequency response $W_{jk}(f,m)$ from the observed signal at sensor j to the separated signal $y_k$. This matrix W(f,m) is called the separation matrix. Using the separation matrix, the separated signals can be obtained in the time-frequency domain as follows:

$$Y(f,m) = W(f,m) X(f,m)$$

Here, $Y(f,m) = [Y_1(f,m), \ldots, Y_N(f,m)]^T$ represents the separated signals in the time-frequency domain, and subjecting this to a short-time inverse discrete Fourier transform (IDFT) yields the separated signals $y_k$—i.e., the results of estimating the source signals. Note that the separated signals $y_k$ are not necessarily ordered in the same way as the source signals $s_i$. That is, it is not necessarily the case that k=i. Also, Y(f,m) is a vector.

Estimating the Separation Matrix W(F,M)

In BSS, the separation matrix W(f,m) is estimated by using solely the observed signals.

Known conventional methods for estimating the separated signals Y(f,m) include: (a) methods based on independent component analysis, (b) methods that utilize the sparsity of the signals, and (c) methods in which the mixing matrix is estimated based on the signal sparsity. These methods are discussed in turn below.

Conventional Method 1: Independent Component Analysis

Independent component analysis (ICA) is a technique in which signals that have been combined by linear mixing as in Formula (1) above are separated based on the statistical independence of the signals. FIG. 27B shows a block diagram of an ICA separation process for the case where N=M=2. In the time-frequency domain ICA, we perform successive learning with the learning rule W(f)=W(f)+ΔW(f) to find a separation matrix W(f,m) at each frequency so that each element of the output signal Y(f,m) becomes mutually independent. Here, the estimation unit 705 of the ICA separation matrix might determine ΔW(f) by the following rule, for example:

$$\Delta W = \mu[I - <\phi(Y(f,m))Y(f,m)^H>] \quad (2)$$

Here, the notation $[\alpha]^H$ denotes the conjugate transpose of $\alpha$. Also, I represents a unit matrix, $< \ldots >$ represents time averaging, $\phi$ represents a nonlinear function, and $\mu$ represents the update coefficient. Separation systems obtained by ICA are time-invariant linear systems. Various forms of the ICA algorithm have been introduced, including the one mentioned in Non-Patent Reference 1.

In ICA, since separation is performed by concentrating on the independence of the signals, the matrix $Y'(f,m) = [Y_1'(f,m), \ldots, Y_N'(f,m)]^T$ obtained from the relationship $Y'(f,m) = W(f,m)X(f,m)$ using this separation matrix $W(f,m)$ is indeterminate with respect to the ordering and scaling of the separated signals. This is because independence between the separated signals is preserved even when the ordering and scaling of the signals change.

The process of resolving this indeterminacy of ordering is referred to as permutation resolution, and results in a separated signal $Y_i(f,m)$ where the separated signal components corresponding to the same source signal $s_i$ have the same subscript i at all frequencies. Methods for achieving this include a method in which the estimated arrival directions of signals obtained using the inverse matrix of the separation matrix (the Moore-Penrose pseudo-inverse matrix for cases where N≠M) are verified, and the rows of the separation matrix $W(f,m)$ are replaced so that the estimated arrival direction corresponding to the i-th separated signal becomes the same at each frequency, and a method in which the rows of the separation matrix $W(f,m)$ are replaced so as to maximize the correlation between the absolute values $|Y_i(f,m)|$ of the i-th separated signal between different frequencies. In this example, a permutation/scaling solving unit 706 resolves these permutations while feeding back the separated signals $Y_i(f,m)$.

The process of resolving the indeterminacy of magnitude is referred to as scaling resolution. Permutation/scaling solving unit 706 performs this scaling resolution by, for example, calculating the inverse matrix (the Moore-Penrose pseudo-inverse matrix for cases where N≠M). $W^{-1}(f,m)$ of the separation matrix $W(f,m)$ obtained after permutation resolution, and then scaling each row $w_i(f,m)$ of the separation matrix $W(f,m)$ as follows:

$$w_i(f,m) \leftarrow [W^{-1}(f,m)]_{ji} w_i(f,m)$$

The separated signals at each frequency can then be obtained from $Y(f,m) = W(f,m)X(f,m)$ by using the separation matrix $W(f,m)$ in which the indeterminacy of ordering and magnitude have been resolved.

With regard to the abovementioned learning rule, it is possible to use a function like $$\phi(Y) = \phi(|Y|) \cdot \exp(j \cdot \angle(Y))$$

$$\phi(x) = \text{sign}(x)$$

as the nonlinear function in Formula (2). Also, as mentioned above, it is possible to use any permutation resolution method such as the signal arrival direction estimation method or the method that utilizes the similarity in the frequency components of the separated signals, or a combination of such methods, details of which can be found in Patent Reference 1 and Non-Patent Reference 2. Furthermore, a requirement of ICA is that the number of signal sources N and the number of sensors M obey the relationship M≧N.

Conventional Method 2: The Sparsity Method

In cases where the number of signal sources N and the number of sensors M obey the relationship M<N, separation can be achieved by methods based on the signal sparsity (e.g., Non-Patent Reference 3).

By assuming the signals to be sparse and mutually independent, even when a plurality of signals are present at the same time, it can be assumed that in the sample levels there is a low probability of observing overlapping signals at the same timing. That is, it can be assumed that there is no more than one signal contained in the observed signal at any one time. Accordingly, the signals can be separated by using a separation system $W(f,m)$ consisting of a function that uses some method to estimate which signal source emitted the signal observed at each timing and only extracts signals at this timing (binary mask). This is the sparsity method.

FIG. 28 (conventional method 2) shows a block diagram to illustrate this sparsity method.

The following method is generally used to estimate the signal source at each timing. If each signal source is assumed to be spatially separate, then between the signals observed by the plurality of sensors there will exist phase difference and amplitude ratios determined by the relative positions of the signal sources and sensors. From the assumption that there is at most one signal contained in the observed signal at each timing, the phase differences and amplitude ratios of the observed signal at this timing correspond to the phase difference and amplitude ratio of the one signal contained in the observed signal at this timing. Accordingly, the phase differences and amplitude ratios of the observed signal in each sample can be subjected to a clustering process, and we can estimate each source signal by reconstituting the signals belonging to each cluster.

This is described in more specific detail as follows. First, observed signal relative value calculation unit 751 calculates the phase differences and/or amplitude ratios between the observed signals $X(f,m)$ to obtain relative values $z(f,m)$ as follows:

FORMULA 2

$$\text{Phase difference } z_1(f, m) = \angle \frac{X_i(f, m)}{X_j(f, m)} (i \neq j)$$

$$\text{Amplitude ratio } z_2(f, m) = \frac{|X_i(f, m)|}{|X_j(f, m)|} (i \neq j).$$

Alternatively, instead of using the phase difference itself, it is also possible to use the signal arrival directions derived from the phase differences as relative values $z(f,m)$.

Next, the distribution of the relative values $z(f,m)$ is checked and clustered into N clusters by clustering unit 752. An example of such a distribution is shown in FIG. 29. In this example, a mixed signal comprising three signals (N=3) is observed by sensor 1 (j=1) and sensor 2 (j=2) FIG. 29A shows the distribution obtained using the phase difference alone, and FIG. 2B shows the distribution obtained using both the phase difference and the amplitude ratio. As this figure shows, sparsity allows these distributions to be classified into N=3 clusters 801-803 or 811-813.

Next, the representative values (peak, mean, median, etc.) of these N clusters are obtained in representative value calculation unit 753. In the following discussion, for the sake of convenience, these are numbered $a_1, a_2, \ldots, a_N$ in ascending order (in FIG. 29 they are numbered $a_1, a_2$ and $a_3$).

Next, in binary mask preparation unit 754, a binary mask $M_k(f,m)$ is prepared as follows:

FORMULA 3 (3)

$$M_k(f,m) = \begin{cases} 1 & a_k - \varepsilon \le z(f,m) \le a_k + \varepsilon \\ 0 & \text{otherwise} \end{cases} \quad (k=1,\ldots,N)$$

Here, $\varepsilon$ is a parameter that determines the width of the binary mask. Next, in signal extraction unit 755, the k-th separated signal is obtained by performing the calculation $Y_k(f,m)=M_k(f,m)X_j(f,m)$, where j is an arbitrary sensor number.

That is, the method based on sparsity described in this example results in a nonlinear system with a time-varying separation matrix $W(f,m)$:

$$W_{jk}(f,m)=M_k(f,m) \text{ for } j \in \{1,\ldots,M\}$$

$$W_{kl}(f,m)=0 \text{ for } l \ne j \ (l=1,\ldots,M)$$

Conventional Method 3: Estimating the Mixing Matrix Based on Sparsity

In this method, as a signal separation technique for cases where the number of signal sources N and the number of sensors M obey the relationship M=N, the sparsity of the signals is used to estimate the mixing matrix $H(f)$, and the inverse matrix thereof is used to separate the signals (see, e.g., Non-Patent Reference 4 and Non-Patent Reference 5).

FIG. 28 (conventional method 3) shows a block diagram illustrating this method for estimating the mixing matrix based on sparsity.

The mixed signal $X(f,m)$ is expressed in terms of the mixing matrix $H(f)$ as follows:

FORMULA 4 (4)

$$\begin{bmatrix} X_1(f,m) \\ X_2(f,m) \\ \vdots \\ X_N(f,m) \end{bmatrix} = \begin{bmatrix} H_{11}(f) & \ldots & H_{1N}(f) \\ H_{21}(f) & \ldots & H_{2N}(f) \\ \vdots & \ddots & \vdots \\ H_{NI}(f) & \ldots & H_{NN}(f) \end{bmatrix} \begin{bmatrix} S_1(f,m) \\ S_2(f,m) \\ \vdots \\ S_N(f,m) \end{bmatrix}$$

$$= \begin{bmatrix} 1 & \ldots & 1 \\ H_{21}(f)/H_{11}(f) & \ldots & H_{2N}(f)/H_{1N}(f) \\ \vdots & \ddots & \vdots \\ H_{NI}(f)/H_{11}(f) & \ldots & H_{NN}(f)/H_{1N}(f) \end{bmatrix} \begin{bmatrix} H_{11}(f)S_1(f,m) \\ H_{12}(f)S_2(f,m) \\ \vdots \\ H_{1N}(f)S_N(f,m) \end{bmatrix} \quad (5)$$

$$\equiv \hat{H}(f)\hat{S}(f,m) \quad (6)$$

Thus, if $\hat{H}(f)$ can be estimated, then the separated signals $Y(f,m)$ can be estimated from $$Y(f,m)=\hat{S}(f,m)=\hat{H}(f)^{-1}X(f,m) \quad (7)$$

This procedure for obtaining the separated signals $Y(f,m)$ from the estimated $\hat{H}(f)$ is described below. In the following, the notation $\alpha\hat{}$ is equivalent to the notation $\hat{\alpha}$.

First, signals at timings where only one signal is present are obtained by applying the same procedure as in [Conventional method 2] in observed signal relative value calculation unit 751, clustering unit 752, representative value calculation unit 753, binary mask preparation unit 754 and signal extraction unit 755:

$$\hat{X}(f,m)=M_k(f,m)X(f,m) \quad \text{Formula 5}$$

Here, binary masks $M_k(f,m)$ are applied to the observed signals $X(f,m)=[X_1(f,m),\ldots,X_M(f,m)]^T$ of all the sensors. At this time, the timing $m_i$ at which only source signal $S_i(f,m)$ is active, for example, can be expressed as follows:

Formula 6

$$\hat{X}_j(f,m_i)=M_i(f,m_j)X_j(f,m_i) \approx H_{ji}(f)S_i(f,m_i) \quad (8)$$

The separated signals $\hat{X}_j(f,m_i)$ obtained in this way are sent to mixing process calculation unit 756, where $\hat{H}(f)$ is estimated by performing the following calculation:

$$\hat{H}_{ji}(f) = E\left[\frac{M_k(f,m_i)X_j(f,m_i)}{M_k(f,m_i)X_1(f,m_i)}\right] \quad (9)$$

$$= E\left[\frac{\hat{X}_j(f,m_i)}{\hat{X}_1(f,m_i)}\right] = E\left[\frac{H_{ji}(f)S_i(f,m_i)}{H_{1i}(f)S_i(f,m_i)}\right] = E\left[\frac{H_{ji}(f)}{H_{1i}(f)}\right]$$

where $E[\ldots]$ denotes averaging over $m_i$. The matrix $\hat{H}(f)$ obtained in this way is sent to inverse matrix calculation unit 757, where its inverse matrix $\hat{H}(f)^{-1}$ is obtained. Then, in signal separation unit 758, the calculation shown in Formula (7) above provides estimate the separated signals $Y(f,m)$.

Note that since this procedure uses the inverse matrix of $\hat{H}(f)$, it can only be applied in cases where the number of signal sources N and the number of sensors M obey the relationship M=N.

[Patent Reference 1] Japanese Unexamined Patent Publication No. 2004-145172

[Non-Patent Reference 1] A. Hyvaerinen, J. Karhunen and E. Oja, "Independent Component Analysis," John Wiley & Sons, 2001, ISBN 0-471-40540

[Non-Patent Reference 2] H. Sawada, R. Mukai, S. Araki and S. Makino, "A Robust and Precise Method for Solving the Permutation Problem of Frequency-Domain Blind Source Separation,", in Proc. the 4th International Symposium on Independent Component Analysis and Blind Signal Separation (ICA 2003), 2003, pp. 505-510

[Non-Patent Reference 3] S. Rickard, R. Balan, and J. Rosca, "Real-Time Time-Frequency Based Blind Source Separation," 3rd International Conference on Independent Component Analysis and Blind Source Separation (ICA2001), San Diego, December, 2001, pp. 651-656

[Non-Patent Reference 4] F. Abrard, Y. Deville, P. White, "From blind source separation to blind source cancellation in the underdetermined case: a new approach based on time-frequency analysis," Proceedings of the 3rd International Conference on Independent Component Analysis and Signal Separation (ICA2001), pp. 734-739, San Diego, Calif., December 2001

[Non-Patent Reference 5] Y. Deville, "Temporal and time-frequency correlation-based blind source separation methods," in Proc., ICASSP2003, April 2003, pp. 1059-1064

DISCLOSURE OF THE INVENTION

Problem Addressed by the Invention

In conventional signal separation methods, when the number of signal sources N and the number of sensors M obey the relationship N>M, it has been difficult to achieve high-quality separation of the mixed signals.

Specifically, as mentioned above, when the number of signal sources N and the number of sensors M obey the relationship N>M, it is not possible to use methods based on independent component analysis or methods in which the mixing matrix is estimated based on sparsity.

Also, although it is possible to use methods that exploit the sparsity of signals, with these methods it is difficult to achieve signal separation with good separation performance and low distortion. Specifically, when creating a binary mask as shown in Formula (3) above, it is possible to achieve good separation performance if $\epsilon$ is made small enough, but on the other hand this increases the number of samples eliminated by this binary mask and degrades the separated signal. In other words, when the signals are completely sparse so that the observed signal contains at most one signal at each timing, then the relative values $z(f,m)$ at each timing should converge around the vicinity of one of the representative values $a_1, \ldots, a_N$. However, since real signals are not completely sparse, there will also be cases where two or more observed signals are present at the same timing and frequency. In such cases, the relative values $z(f,m)$ at this timing will be receded from the representative values $a_1, \ldots, a_N$ that would otherwise be expected, thus yielding a value of $\epsilon$ that causes the signals to be excluded by binary masking. As a result, the observed signal corresponding to this sample is treated as being zero, and a zero component is padded into the separated signal. Since the proportion of samples excluded in this way increases as the value of $\epsilon$ gets smaller, the amount of samples padded with a zero component also increases as $\epsilon$ gets smaller. When there are many zero components padded into each separated signal, this causes the distortion of the separated signals to increase, resulting in the generation of a perceptually uncomfortable type of noise called "musical noise". On the other hand, if the value of $\epsilon$ used for binary masking is made large, then fewer zero components are padded into the separated signals and the occurrence of musical noise decreases, but instead the separation performance deteriorates.

The present invention has been made in the light of such problems, and aims to provide a technique that can perform high-quality separation of mixed signals even in cases where the relationship between the number of signal sources N and the number of sensors M is such that N>M.

Means of Solving the Problem

In the first present invention, the abovementioned problem is solved as follows:

First, the values of the observed signal—which is a mixture of N (N≧2) signals observed by M sensors—are transformed into frequency domain values, and these frequency domain values are used to calculate the relative values of the observed values between the sensors (including the mapping of relative values) at each frequency. These relative values are clustered into N clusters, and the representative value of each cluster is calculated. Then, using these representative values, a mask is produced to extract the values of the signals emitted by V (V≦M) signal sources from the frequency domain values, and this mask is used to extract the values of a limited signal comprising the signals emitted from these V signal sources. When V≧2, this limited signal is a mixed signal comprising the signals emitted by V signal sources, so this limited signal is further separated to yield each of the separated signal values. On the other hand, when V=1, the values of this limited signal are regarded as the separated signal values.

To separate limited signals consisting of signals emitted from V signal sources extracted in this way in which less samples are zero padded, it is possible to employ methods such as an independent component analysis method or a method in which the mixing matrix is estimated based on sparsity, for example. Consequently, it is possible to extract source signals with high quality even in cases where N>M. However, with this approach alone it is only possible to extract V source signals. Therefore, all the source signals are extracted by, for example, repeating the same processing while using a plurality of different types of mask to change the combinations of extracted signals.

In the second present invention, the abovementioned problem is solved as follows:

First of all, the observed signal values $x_1(t), \ldots, x_M(t)$ are transformed into frequency domain values $X_1(f,m), \ldots, X_M(f,m)$. First vectors $X(f,m)=[X_1(f,m), \ldots, X_M(f,m)]$ consisting of the frequency domain values $X_1(f,m), \ldots, X_M(f,m)$ are then clustered into N clusters $C_i(f)$ (i=1, \ldots, N) for each frequency f, a second vector $a_i(f)$ representative of each cluster $C_i(F)$ is extracted, and V (V≦M) third vectors $a_p(f)$ (p=1, \ldots, V) are extracted therefrom. A mask $M(f,m)$ is then produced according to the following formula, where $G_k$ is the set of third vectors $a_p(f)$, $G_k^c$ is the complementary set of $G_k$, and the notation $D(\alpha,\beta)$ represents the Mahanalobis square distance of vectors $\alpha$ and $\beta$:

FORMULA 7

$$M(f, m) = \begin{cases} 1 & \max_{a_p(f) \in G_k} D(X(f, m), a_p(f)) < \min_{a_q(f) \in G_k^c} D(X(f, m), a_q(f)) \\ 0 & \text{otherwise} \end{cases}$$

and the products of mask $M(f,m)$ with the first vectors $X(f,m)$ are calculated to extract the values of the limited signal consisting of the signals emitted from V signal sources.

To separate limited signals consisting of signals emitted from V signal sources extracted in this way in which less samples are zero-padded, it is possible to employ a method such as independent component analysis or a method in which the mixing matrix is estimated based on sparsity, for example. Consequently, it is possible to extract source signals with high quality even in cases where N>M. However, with this approach alone it is only possible to extract V source signals. Therefore, for example, the same processing is repeated while using a plurality of different types of mask on a plurality of different types of set $G_k$ to change the combinations of extracted signals. In this way, all the source signals are extracted. Therefore, for example, the same processing is repeated while using a plurality of different types of mask on a plurality of different types of set $G_k$ to change the combinations of extracted signals. In this way, all the source signals are extracted.

In the third present invention, the abovementioned problem is solved as follows:

First, the observed signal values $x_1(t), \ldots, x_M(t)$ are transformed into frequency domain values $X_1(f,m), \ldots, X_M(f,m)$, and first vectors $X(f,m)=[X_1(f,m), \ldots, X_M(f,m)]^T$ consisting of these values are clustered into N clusters $C_i(f)$ (i=1, ..., N) for each frequency f. If the source signals are sparse, then even in situations where there is an insufficient number of sensors (N>M), it is still possible to cluster these vectors into N clusters and to calculate representative vectors $a_i(f)$ for each of these N clusters.

Second vectors $a_i(f)$ are then calculated to represent each of these clusters $C_i(f)$, and an N-row×M-column separation matrix $W(f,m)$ is calculated as the Moore-Penrose pseudo-inverse matrix of an M-row×N-column matrix A' in which 0 or more of the N said second vectors $a_i(f)$ are substituted with zero vectors (this matrix is denoted by $A'^+(f)$, and is identical to the inverse matrix $A'^{-1}$ when N=M). The separation matrix $W(f,m)$ generated here is a matrix that depends on time m in cases where the number of sensors in insufficient (N>M), and is independent of time m in cases where the number of sensors is sufficient (N≦M).

After that, the calculation $Y(f,m)=W(f,m)X(f,m)$ is performed to calculate a separated signal vector $Y(f,m)=[Y_1(f,m), \ldots, Y_N(f,m)]^T$, which is performed to transformed into time-domain signal values $y_1(t), \ldots, y_N(t)$.

Here, due to the sparsity of the source signals, even if the number of signal sources N is greater than the number of sensors M (N>M), it is still highly probable that there are no more than M signal sources having values that affect the observation result in any given discrete time interval m. Consequently, for each discrete time interval m, the separation matrix $W(f,m)$ generated as described above is able to separate these M or fewer signals. Then, in cases where N>M, since the separation matrix $W(f,m)$ is time-dependent, the resulting combinations of separated signals are liable to differ between different discrete time intervals. Consequently, by obtaining separated signals for a plurality of discrete time intervals m, it is possible to obtain all the separated signals.

Advantages of the Invention

As described above, with the present invention it is possible to perform high-quality separation of mixed signals even when the relationship between the number of signal sources N and the number of sensors M is such that N>M.

Figure 1:
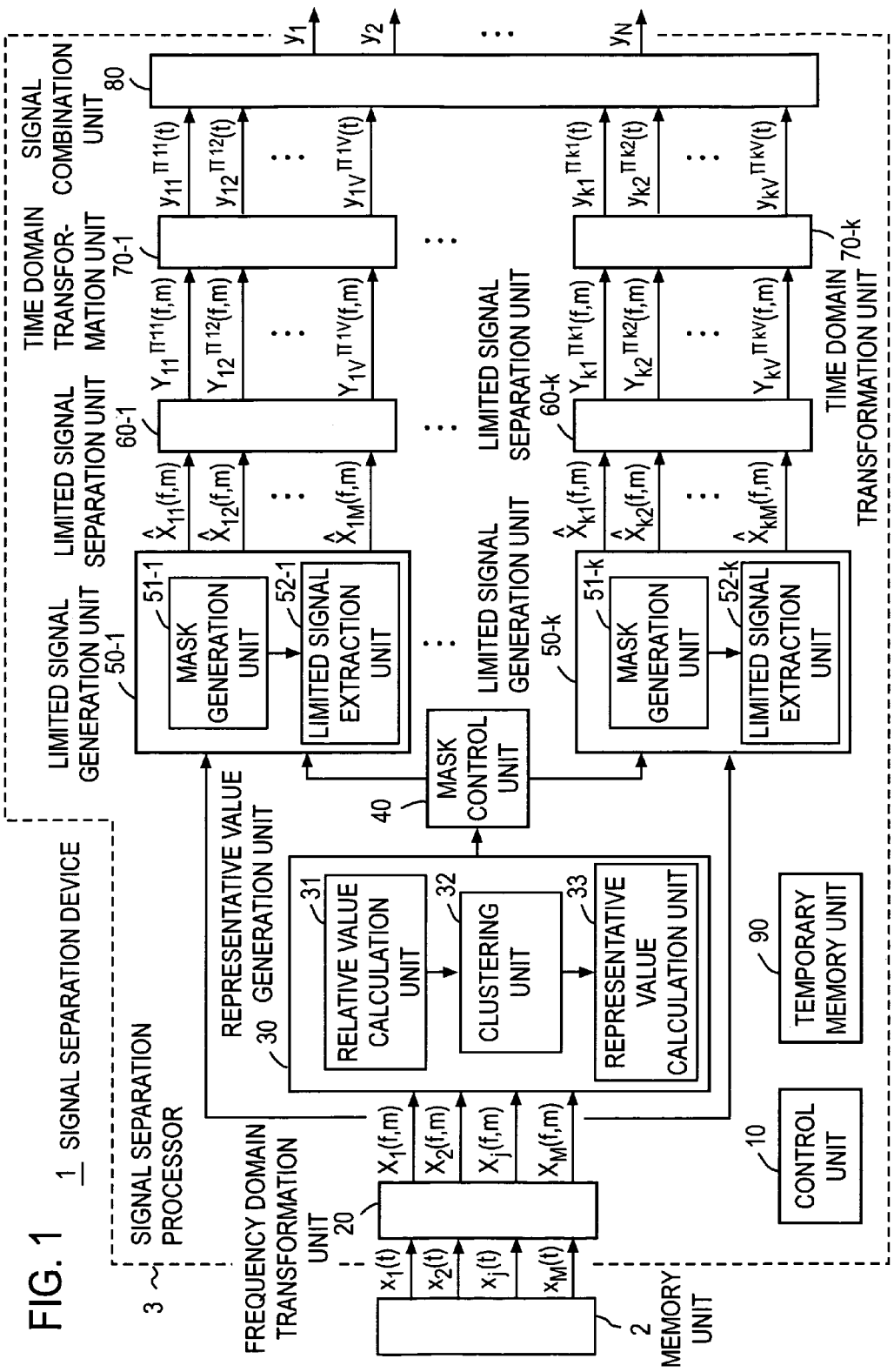
[FIG. 1] A block diagram showing an example of the overall configuration of a signal separation device according to a first embodiment.

LIST OF REFERENCE NUMERALS 1, 500: Signal separation device
2, 501: Memory unit
3, 502: Signal separation processor

BEST MODES FOR IMPLEMENTING THE INVENTION

Embodiments of the present invention are described below with reference to the figures.

First Embodiment

This embodiment is an embodiment relating to the first present invention; in this example, the values of a mixed signal comprising the signals emitted from V ($2 \leq V \leq M$) sources (referred to as a "limited signal" in this embodiment) are extracted from the observed signal values by using a mask with a smooth profile that uses the directional characteristics of a null beam former, and ICA is used to perform signal separation on the extracted limited signal values.

Figure 2:
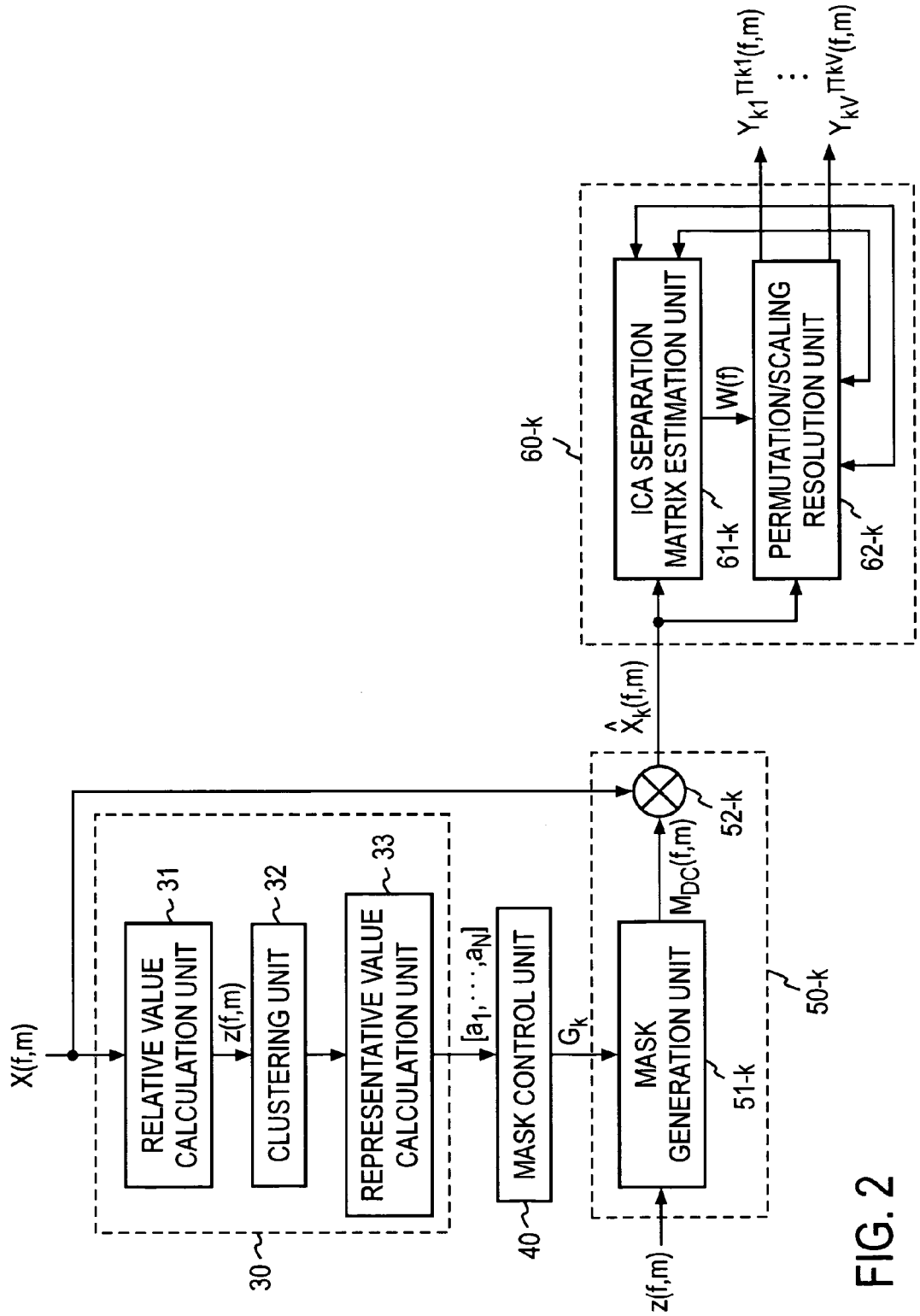
[FIG. 2] A block diagram showing examples of the detailed configuration of the representative value generation unit, mask control unit, limited signal generation unit and limited signal separation unit in FIG. 1.
Figure 3:
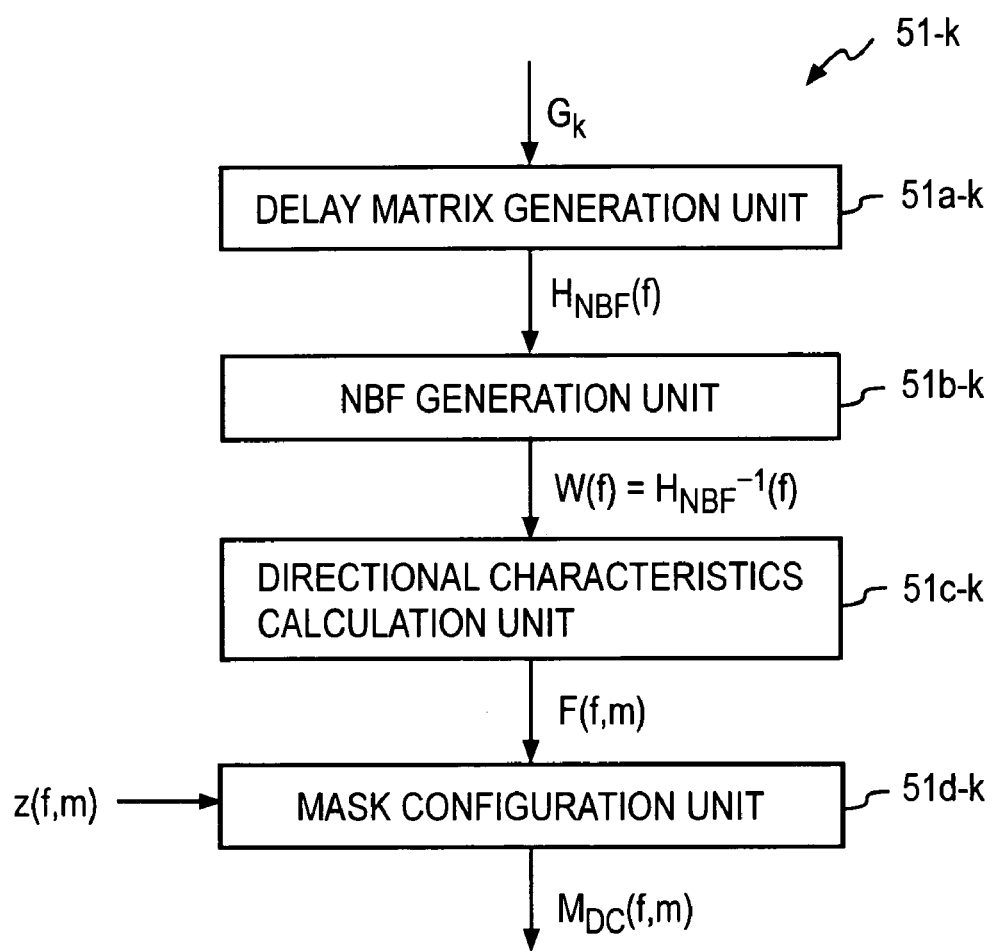
[FIG. 3] A block diagram showing an example of the detailed configuration of the mask generation unit in FIG. 1 and FIG. 2.
Figure 4:
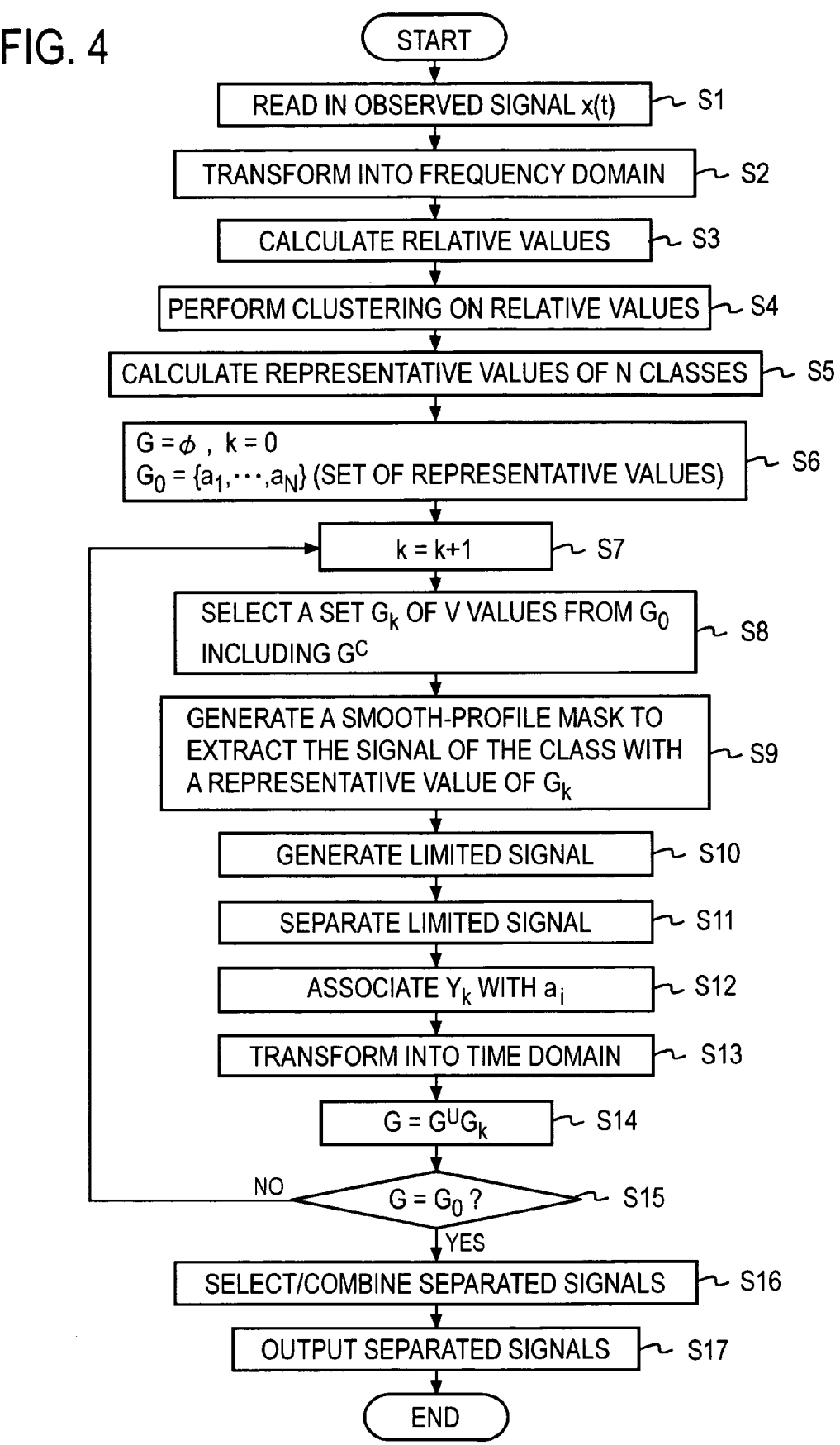
[FIG. 4] A flowchart illustrating the processing performed by a signal separation device according to the first embodiment.

FIG. 1 shows a block diagram of an example of the overall configuration of a signal separation device 1 according to this embodiment. FIG. 2 shows block diagrams of examples of the detailed configuration of representative value generation unit 30, mask control unit 40, limited signal generation unit 50-$k$ ($k=1, \ldots, u$; where u is the number of systems as described below), and limited signal separation unit 60-$k$. FIG. 3 shows a block diagram of an example of the detailed configuration of mask generation unit 51-$k$ in FIG. 1 and FIG. 2. The arrows in these figures indicate the flow of data, but the flow of data into and out from control unit 10 and temporary memory unit 90 is not shown. Specifically, even when data passes through control unit 10 or temporary memory unit 90, the associated process is not shown. FIG. 4 shows a flowchart illustrating the processing performed by signal separation device 1 in this embodiment. In the following, these figures are used to describe the configuration of signal separation device 1 in this example, and the processing performed by this device.

Overall Configuration

First, the overall configuration of the signal separation device of this embodiment is described.

As FIG. 1 shows, the signal separation device 1 of this embodiment includes a memory unit 2 and a signal separation processor 3 that is electrically connected thereto by a hardwired or wireless connection.

Memory unit 2 might be, for example, a hard disk device, a magnetic recording device such as a flexible disk or magnetic tape device, an optical disk device such as a DVD-RAM (random access memory) or CD-R (recordable)/RW (rewritable) device, a magneto-optical recording device such as an MO (magneto-optical) disc device, or a semiconductor memory such as an EEP-ROM (electronically erasable programmable read-only memory) or flash memory. Memory unit 2 may be situated inside the same enclosure as signal separation processor 3, or it may be housed separately.

This signal separation processor 3 consists of hardware configured from elements such as a processor and RAM, for example, and incorporates the processing blocks described below.

Summary of the Signal Separation Process

Next, the signal separation processing performed by signal separation device 1 is summarized.

In this embodiment, it is assumed that the signals emitted from the N signal sources are statistically independent of each other, and that each signal is sufficiently sparse. Here, "sparse" refers to the property of a signal that is zero or close to zero at almost all times t, and rarely takes a large value. This sort of sparsity is found to occur in speech signals, for example. Note that when speech signals and other signals that do not consist of white noise are converted into time-series data at different frequencies by performing a transformation such as a short time discrete Fourier transform, the proportion of timings at which the signals are close to zero becomes even larger, thereby accentuating their sparsity. Also, although Gaussian distributions are generally used to model signals, sparse signals are modeled not with Gaussian distributions but with other forms of distribution such as a Laplace distribution.

First, the M observed signal values $x_j(t)$ are converted into frequency domain observed signal values $X_j(f,m)$ by a frequency domain transformation unit 20, and then a representative value generation unit 30 calculates N representative values $a_1, a_2, \ldots, a_N$ corresponding to each source signal.

Next, V ($2 \leq V \leq M$) of the representative values $a_1, a_2, \ldots, a_N$ are suitably selected by mask control unit 40, and in limited signal generation unit 50-$k$, the values $X\hat{}(f,m)$ of a limited signal consisting only of V source signals are estimated from the observer signal values $X_j(f,m)$. Note that when V=1, the method described under [Third embodiment] below is used. Here, a mask with a smooth profile is produced in mask generation unit 51-$k$ to extract V signals, and in limited signal extraction unit 52-$k$ this mask is applied to the observed signal values $X_j(f,m)$ to estimate the limited signal values $X\hat{}(f,m)$.

Next, in limited signal separation unit 60-$k$, a separation system is estimated for obtaining V separated signals. Here, M limited signal values $X\hat{}(f,m)$ are provided as inputs, and V separated signal values $Y(f,m)$ are obtained as outputs. With regard to the number of inputs M and outputs V in the separation system, since $V \leq M$ it is possible to use [Conventional method 1] or [Conventional method 3] to perform the estimation in this separation system.

Finally, in time domain transformation unit 70-$k$, the separated signal values $Y(f,m)$ obtained in the time-frequency domain are transformed into time-domain signal values.

However, with the above processing alone, it is only possible to obtain V separated signals. Therefore, to obtain the other separated signals, the configuration of the V representative values selected in mask control unit 40 is changed, and the processing from limited signal generation unit 50-$k$ to time domain transformation unit 70-$k$ is performed in multiple systems (u systems).

Finally, the outputs from each system are combined in signal combination unit 80 to yield all N separated signals.

Detailed Configuration and Processing

Next, the configuration and processing of this example are described in detail.

This example relates to a device that separates and extracts source signals from observed signals in situations where the signals emitted from N ($N \geq 2$) signal sources are mixed together and observed by M sensors. Note that, as mentioned above, the signals in this example are signals that can be assumed to be sparse, such as speech signals, and the number of audio sources N is either known or can be estimated. Also, in this example it is assumed that the sensors are microphones or the like that are capable of observing these signals and are arranged on a straight line.

First, as a preliminary process, the time-domain observed signals $x_j(t)$ ($j=1, \ldots, M$) observed by each sensor are stored in memory unit 2. Then, when the signal separation process is started, signal separation processor 3 performs the following processing under the control of control unit 10.

First, signal separation processor 3 accesses memory unit 2, from where it sequentially reads in the observed signal values $x_j(t)$, which it sends to frequency domain transformation unit 20 (Step S1). Frequency domain transformation unit 20 uses a transformation such as a short time discrete Fourier transform to transform these signal values into a series of frequency-domain observed signal values $X_j(f,m)$ for each time interval, which it stores in temporary memory unit 90 (Step S2). The frequency-domain observed signal values $X_j(f,m)$ stored in temporary memory unit 90 are sent to a representative value generation unit 30, and the relative value calculation unit 31 of representative value generation unit 30 uses these frequency-domain observed signal values $X_j(f,m)$ to calculate the relative values $z(f,m)$ of the observed values between each sensor at each frequency (Step S3).

The relative values $z(f,m)$ may be obtained by using one or more parameters such as the phase difference or amplitude ratio, which are expressed as follows:

FORMULA 8

$$\text{Phase difference } z_1(f, m) = \angle \frac{X_i(f, m)}{X_j(f, m)} (i \neq j)$$

$$\text{Amplitude ratio } z_2(f, m) = \frac{|X_i(f, m)|}{|X_j(f, m)|} (i \neq j)$$

Alternatively, instead of using the phase difference itself, it is also possible to use a mapping thereof (e.g., the signal arrival directions derived from the phase differences).

In this example, these relative values $z(f,m)$ are based on the arrival directions of the signals obtained from the phase differences $z_1(f,m)$ between the observed signals from any two sensors (sensors j1 and j2) as follows:

FORMULA 9

$$z_3(f, m) = \cos^{-1} \frac{z_1(f, m) v_e}{2\pi f d}$$

and these values of $z_3(f,m)$ are calculated by relative value calculation unit 31. Here, v is the velocity of the signal, and d is the spacing between sensor j1 and sensor j2.

The relative values $z_3(f,m)$ calculated in this way are stored in temporary memory unit 90. Next, clustering unit 32 sequentially reads out the relative values $z_3(f,m)$ from temporary memory unit 90, and clusters these relative values $z_3(f,m)$ into N clusters (Step S4). In this example, clustering unit 32 produces a histogram of the relative values $z_3(f,m)$ sent to it.

Figure 5:
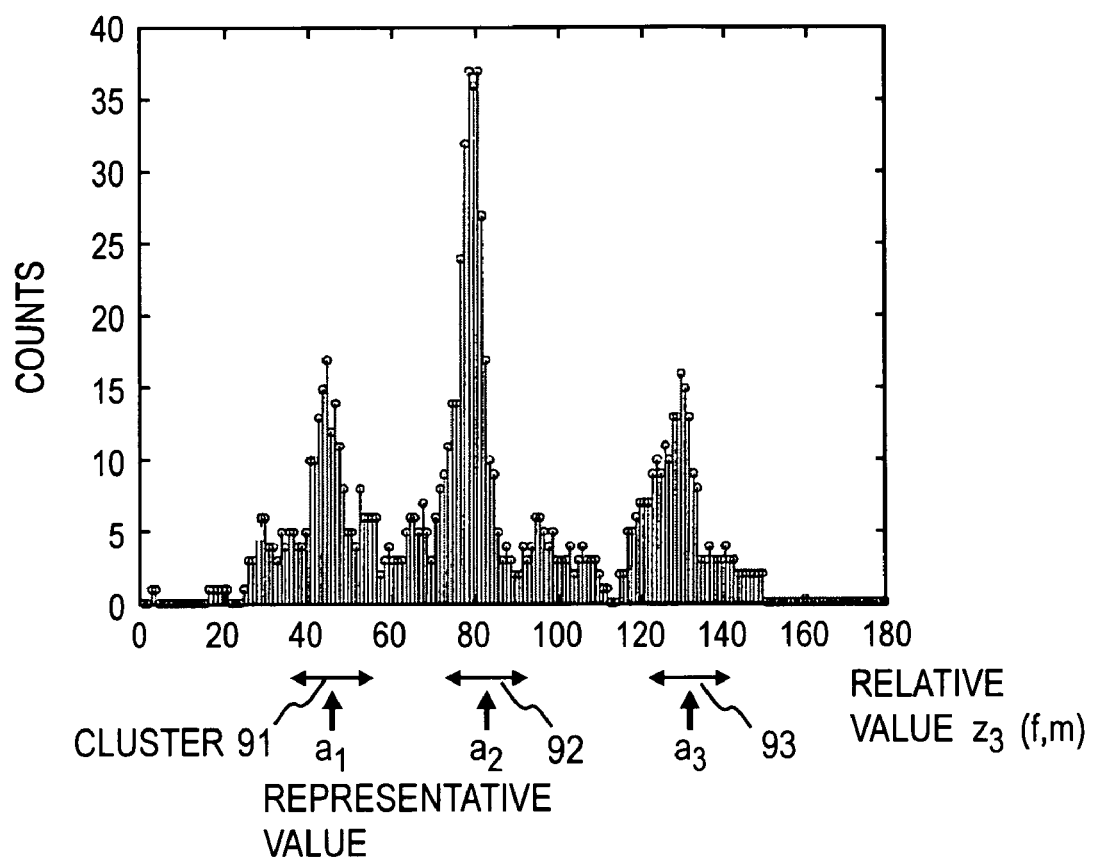
[FIG. 5] An example of a histogram produced by the clustering unit.

FIG. 5 shows an example of a histogram produced in this way. Note that this example corresponds to a situation where the number of source signals is N=3.

As illustrated in this figure, this histogram consists of a distribution with N (=3) peaks. In this example, clustering unit 32 clusters this distribution into N (=3) clusters (clusters 91-93 in this example). This could, for example, be performed by clustering based on a suitable threshold value, or by using methods described in many textbooks such as the k-means method or hierarchical clustering—see, e.g., Richard O. Duda, "Pattern Classification ($2^{nd}$ ed.)", John Wiley & Sons, Inc., ISBN 0-471-05669-3, chapter 10. Here, each of the resulting clusters $C_i$ (i=1, 2, ..., N) is a set of relative values $z_3(f,m)$, and can be expressed as $C_i(f)=\{z_3(f,m)|m\epsilon T_i\}$ using the set Ti of discrete time intervals.

The clustering information (clusters $C_1, C_2, \ldots, C_N$) generated by clustering unit 32 are stored in temporary memory unit 90. Representative value calculation unit 33 reads in this information and calculates the representative values $a_1, a_2, \ldots, a_N$ of each of these N clusters $C_1, C_2, \ldots, C_N$ (Step S5). Specifically, it might obtain the representative values from the peak of each cluster in the histogram, or it might obtain the representative values from the mean of each cluster. For the sake of convenience, it is assumed that these N representative values are then, for example, arranged in ascending order $a_1, a_2, \ldots, a_N$ (see FIG. 5). Note that these representative values $a_1, a_2, \ldots, a_N$ are the estimated values of the arrival directions of each of the N signals.

In this example, the information on representative values $a_1, a_2, \ldots, a_N$ is sent to mask control unit 40 after being stored in temporary memory unit 90. In mask control unit 40, the data specifying a set $G_0$ whose elements are these representative values $a_1, a_2, \ldots, a_N$ is substituted into a variable $SG_0$, and this variable $SG_0$ is stored in temporary memory unit 90. Mask control unit 40 also initializes a variable SG specifying a set G to G=Ø (the empty set), and a variable k is set to zero; these are stored in temporary memory unit 90 (Step S6).

Next, under the control of mask control unit 40, processing is performed in a plurality of systems (u systems) in limited signal generation unit 50-$k$ (k=1, ..., u), limited signal separation unit 60-$k$ and time domain transformation unit 70-$k$ until all N separated signals have been obtained.

First, mask control unit 40 adds 1 to the value of variable k stored in temporary memory unit 90 to obtain a new value for variable k which is stored back in temporary memory unit 90 (Step S7). Next, mask control unit 40 retrieves the variables $SG_0$ and SG from temporary memory unit 90. Then, in mask control unit 40, a set $G_k$ is selected consisting of V ($\leq$M) suitable representative values including the members of the complementary set $G_c$ of the set G specified by SG (the notation $\alpha^c$ represents the complementary set of $\alpha$), the data specifying this set $G_k$ is assigned to variable $SG_k$, and this variable $SG_k$ is stored in temporary memory unit 90 (Step S8).

The mask generation unit 51-$k$ of limited signal generation unit 50-$k$ reads out the variable $SG_k$ stored in temporary memory unit 90, and produces a "smooth-profile mask" that extracts signals in the clusters whose representative values are in the set $G_k$ specified by this variable $SG_k$ (Step S9). Here, a "smooth-profile mask" means a function that takes high level values with respect to relative values in a prescribed range including V ($2\leq V\leq M$) representative values, and takes low level values with respect to representative values that are not inside this limited range, and where the transitions from the high level to the low level that accompany changes of the relative value occur in a continuous fashion. Note that in this example a "high level value" means a numerical value that is sufficiently greater then zero (e.g., 1 or more), and a "low level value" means a value that is sufficiently close to zero (e.g., at least 60 dB lower than the high level value), although no particular restrictions are placed on these values.

In this embodiment, a "smooth profile mask" is produced using the directional characteristics of a null beamformer formed by N−V+1 sensors. This mask is a mask with a smooth profile that is sufficiently sensitive in the direction ($G_k$) of the V signals included in the limited signal, and has a low sensitivity characteristic (a null) in the direction ($G_0 \cap G_k^c$) of the N−V signals to be eliminated.

The procedure for creating the "smooth profile mask" of this embodiment is described below.

First, mask generation unit 51-$k$ reads out the variables $SG_k$, $SG_0$ and $SG_k^c$ from temporary memory unit 90. Mask generation unit 51-$k$ then extracts any one of the elements (a representative value within the limited range) of set $G_k$ representing variable $SG_k$; this element is referred to as $\theta_1$. Mask generation unit 51-$k$ also extracts all the elements $G_0 \cap G_k^c$ (the representative values not inside the limited range) determined by variables $SG_0$ and $SG_k^c$, and these elements are referred to as $\theta_i$ (i=2, ..., N−V+1). Mask generation unit 51-$k$ then stores $\theta_1$ and $\theta_i$ in temporary memory unit 90. Next, mask generation unit 51-$k$ extracts $\theta_1$ and $\theta_i$ from temporary memory 90, and calculates $\tau_{ji}=(d_j/v_e)\cos\theta_i$ (j=1, ..., N−V+1). Mask generation unit 51-$k$ also calculates the elements ji of a delay matrix $H_{NBF}(f)$ from the formula $H_{NBFji}(f)=\exp(j2\pi f\tau_{ji})$ and stores them in temporary memory unit 90. In these formulae, $d_j$ is the distance between sensor 1 and sensor j ($d_1$=0), f is a frequency variable, and $V_e$ is the signal velocity. These parameters could, for example, be pre-stored in temporary memory unit 90 and sequentially read out for use. The above process results in the generation of an ((N−V+1)×(N−V+1)) delay matrix $H_{NBF}(f)$ (FIG. 3: 51$a$-$k$).

Figure 6:
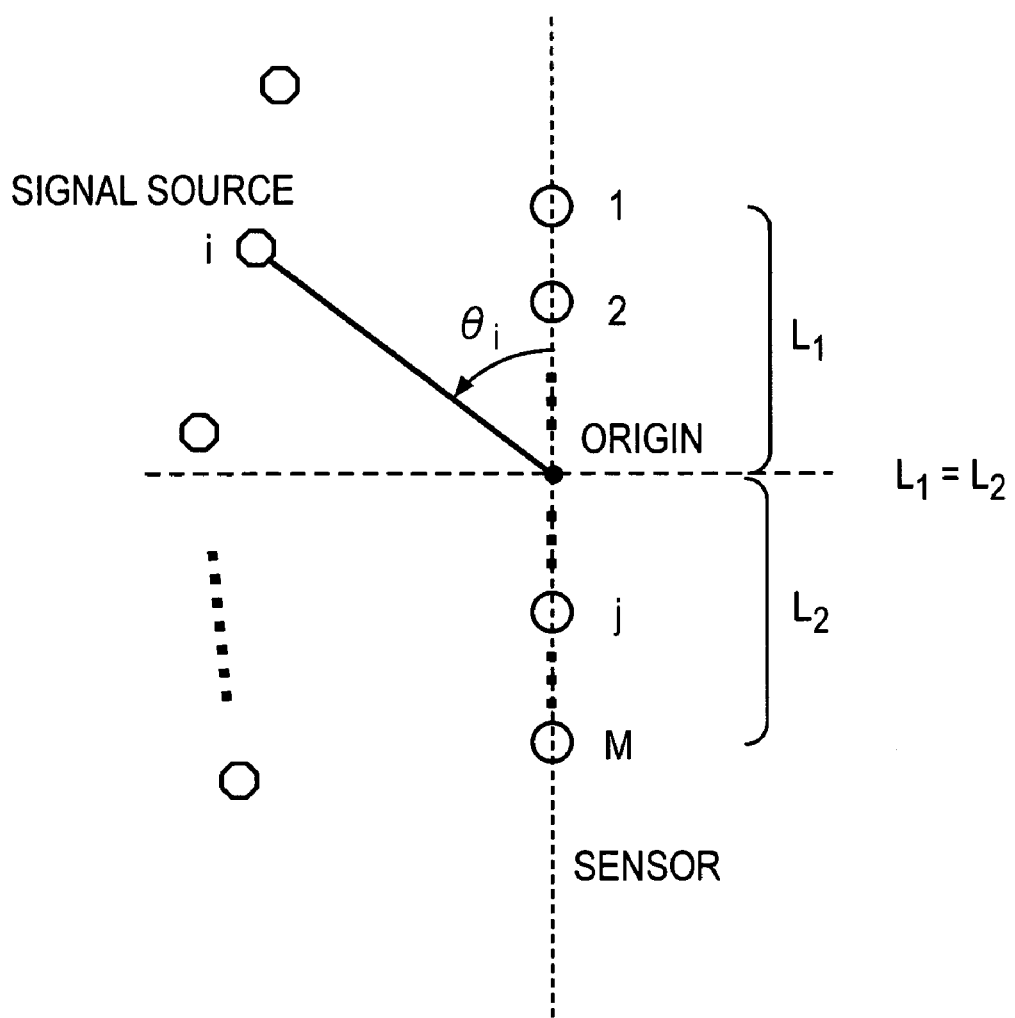
[FIG. 6] A figure illustrating the method used to define the estimated arrival direction $\theta_i$ of signals used when generating a mask with a smooth profile in the first embodiment.

In this embodiment, since the relative values are taken to be the arrival directions $z_3(f,m)$ of the signals obtained from the phase difference $z_1(f,m)$ between the signals observed by two sensors, the abovementioned $\theta_1$ represents the arrival direction of a signal corresponding to a representative value inside the limited range, and $\theta_i$ represents the arrival direction of a signal corresponding to a representative value outside the limited range. These values of $\theta_i$ (i=1, 2, ..., N−V+1) are defined as shown in FIG. 6. First, an origin is set in the middle of M sensors arranged on a straight line (where $L_1$ is the distance from the first sensor to the origin, and $L_2$ is the distance from the origin to the M-th sensor and $L_1=L_2$). The angle subtended between the line connecting this origin to the i-th signal source and the line connecting the origin to the first sensor is the angle $\theta_i$ corresponding to the i-th signal source. source.

The resulting delay matrix $H_{NBF}(f)$ is sent from temporary memory unit 90 (FIG. 1) to NBF generation unit 51$b$-$k$ (FIG. 3), and NBF generation unit 51$b$-$k$ uses this delay matrix $H_{NBF}(f)$ to generate an NBF matrix W(f) having null beamformer (NBF) characteristics. This is obtained by calculating the inverse matrix W(f) of the delay matrix $H_{NBF}(f)$ using the formula $W(f)=H_{NBF}^{-1}(f)$.

This NBF matrix W(f) is stored in temporary memory unit 90 (FIG. 1). A directional characteristics calculation unit 51$c$-$k$ extracts the first row elements $W_{1k}(f)$ of this NBF matrix W(f) together with the values of $d_k$ and $v_e$ from temporary memory unit 90, and generates the following directional characteristics function for the case where $\theta$ is a variable expressing the arrival direction of the signal:

FORMULA 10 (10)

$$F(f,\theta) = \sum_{k=1}^{N-V+1} W_{1k}(f)\exp(j2\pi fd_k\cos\theta/v_e)$$

where $\theta$ is defined in the same way as $\theta_i$ as described above.

The resulting directional characteristics function $F(f,\theta)$ is sent to mask configuration unit 51$d$-$k$. Mask configuration unit 51$d$-$k$ uses this directional characteristics function $F(f,\theta)$ and the relative values z(f,m) (in this example, $z_3(f,m)$) read out from temporary memory unit 90 to generate a mask $M_{DC}(f,m)$ with a smooth profile.

This mask $M_{DC}(f,m)$ could, for example, be generated by using the directional characteristics $F(f,\theta)$ directly as follows:

[Mask 1] $M_{DC}(f,m)=F(f,z_3(f,m))$ (11)

Or alternatively, the mask $M_{DC}(f,m)$ could be generated by using the absolute values of the directional characteristics $F(f,\theta)$ as follows:

[Mask 2] $M_{DC}(f,m)=|F(f,z_3(f,m))|$ (12)

Figure 7A:
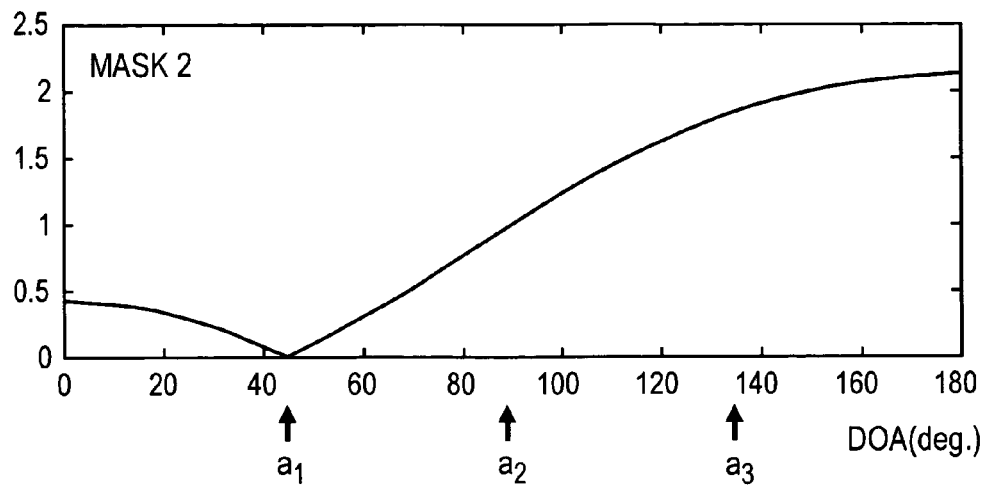
[FIG. 7] An example of a mask in the first embodiment.

FIG. 7A shows an example of [Mask 2] (for the case where the number of signals is N=3 and the number of sensors is M=2). The "smooth profile mask" of this example is one that eliminates N−M=1 signal, and has a small gain in one direction $a_1$. Note that the purpose of this "smooth profile mask" is to extract M(=V)=2 signals (in this case, the two signals arriving from directions $a_2$ and $a_3$) as limited signals (the same applies to FIG. 7B and FIG. 7C below).

Or as another example, the mask $M_{DC}(f,m)$ could be generated by transforming the directional characteristics $F(f,\theta)$ as follows. Note that in the following, all the region of the relative values $z_3(f,m)$ between two neighboring values of $a_i$ in the elements of $G_k$ are referred to as a limited signal region. When $a_1$ or $a_N$ is included in $G_k$, the region $0°\leq z_3(f,m)\leq a_1$ or $180°\geq z_3(f,m)\geq a_N$ is also included in the limited signal region. Furthermore, the regions of relative values $z_3(f,m)$ between two neighboring values of $a_i$ in the elements of $G_0 \cap G_k^c$ are all referred to as elimination signal regions. When $a_1$ or $a_N$ is included in $G_0 \cap G_k^c$, the region $0°\leq z_3(f,m)\leq a_1$ or $180°\geq z$ also included in the elimination signal region. Regions that do not belong to either the limited signal region or the elimination signal region are referred to as transitional regions.

FORMULA 11 (13)
[Mask 3]

$$M_{DC}(f,m) = \begin{cases} F(f, z_3(f,m)) & z_3(f,m) \in \text{Region outside the elimination signal region} \\ F(f, \theta_r) & z_3(f,m) \in \text{Elimination signal region} \end{cases}$$

[Mask 4] (14)

$$M_{DC}(f,m) = \begin{cases} |F(f, z_3(f,m))| & z_3(f,m) \in \text{Region outside the elimination signal region} \\ |F(f, \theta_r)| & z_3(f,m) \in \text{Elimination signal region} \end{cases}$$

Figure 7B:
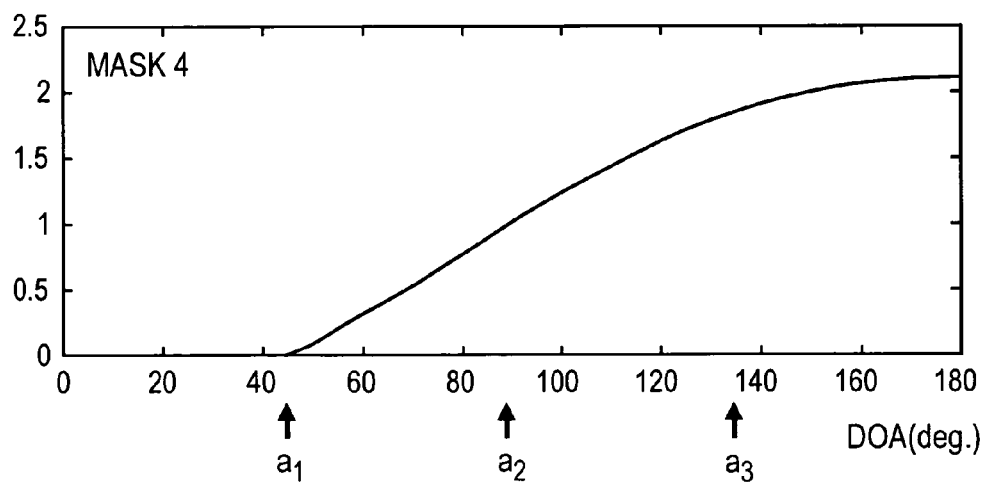

These mask functions $M_{DC}(f,m)$ have masking properties that uniformly reduce the gain in the elimination signal region. Here, $\theta_r$ represents the end of the elimination signal region that is closest to the end of the neighboring limited signal region. FIG. 7B shows an example of this [Mask 4] (for the case where the number of signals is N=3 and the number of sensors is M=2).

It is also possible to use a mask $M_{DC}(f,m)$ with uniform directional characteristics in the limited signal region, for example:

FORMULA 12 (15)
[Mask 5]
$$M_{DC}(f, m) = \begin{cases} a & z_3(f, m) \in \text{Limited signal region} \\ b & z_3(f, m) \in \text{Elimination signal region} \\ F(f, z_3(f, m)) & z_3(f, m) \in \text{Transitional region} \end{cases}$$

Furthermore, it is possible to use the absolute value of a mask with uniform directional characteristics in the limited signal region, such as:

[Mask 6] (16)
$$M_{DC}(f, m) = \begin{cases} a & z_3(f, m) \in \text{Limited signal region} \\ b & z_3(f, m) \in \text{Elimination signal region} \\ |F(f, z_3(f, m))| & z_3(f, m) \in \text{Transitional region} \end{cases}$$

Figure 7C:
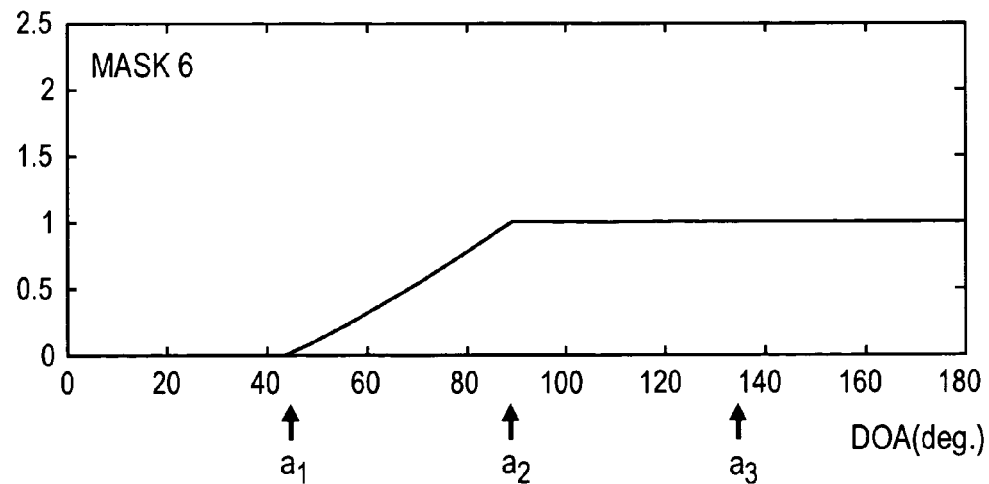

Here, a is set to a value sufficiently greater than zero, such as the maximum value of $|F(f,\theta)|$ in the elimination signal region, for example, and b is set to a small value such as the minimum value of the gain of the directional characteristics, for example. FIG. 7C shows an example of [Mask 6] (for the case where the number of signals is N=3 and the number of sensors is M=2). (This ends the description of mask generation unit 51-$k$/Step S9.)

The mask $M_{DC}(f,m)$ generated by mask generation unit 51-$k$ in this way is stored in temporary memory unit 90 and is then sent to limited signal extraction unit 52-$k$. Limited signal extraction unit 52-$k$ also reads out the frequency domain observed signal values X(f,m) from temporary memory unit 90. Then, limited signal extraction unit 52-$k$ (FIG. 2) uses this mask $M_{DC}(f,m)$ and the frequency domain observed signal values X(f,m) to generate the limited signal values $X_k\hat{}(f,m)$ by calculating the product $X_k\hat{}(f,m)=M_{DC}(f,m)X(f,m)$ (Step S10).

These limited signal values $X_k\hat{}(f,m)$ are stored in temporary memory unit 90, and limited signal separation unit 60-$k$ reads out these limited signal values $X_k\hat{}(f,m)$ and performs signal separation on the limited signals (Step S11). Here, an approximation is made by assuming that the limited signal values $X_k\hat{}(f,m)=M_{DC}(f,m)X(f,m)$ are similar to the values of the mixed signal consisting of the signals emitted from V ($2 \leq V \leq M$) signal sources. Therefore, to estimate this separation matrix it is possible to use a method based on independent component analysis as discussed in [Conventional method 1]. Specifically, separation is performed using Formula (2) mentioned in [Conventional method 1], for example, using the limited signal values $X_k\hat{}(f,m)$ as the input values for independent component analysis instead of the observed signal values X.

To perform the ICA separation in this embodiment, the limited signal values $X_k\hat{}(f,m)$ are first used to generate a separation matrix W(f,m) in ICA separation matrix estimation unit 61-$k$ according to the abovementioned learning rule of Formula (2), and this separation matrix W(f,m) is stored in temporary memory unit 90. This separation matrix W(f,m) is for example generated using feedback from the output values $Y_k(f,m)$ from permutation/scaling resolution unit 62-$k$, which is described below. The resulting separation matrix W(f,m) is sent to permutation/scaling resolution unit 62-$k$. Permutation/scaling resolution unit 62-$k$ uses this separation matrix W(f,m) and the limited signal values $X_k(f,m)$ to generate the respective separated signal values $Y_k(f,m)= [Y_{k1}^{\Pi k1}(f,m), \ldots, Y_{kV}^{\Pi kV}(f,m)]^T$ by performing the calculation $Y_k(f,m)=W(f,m)X_k\hat{}(f,m)$, and stores them in temporary memory unit 90. Permutation/scaling resolution unit 62-$k$ then, for example, feeds back these separated signal values $Y_k(f,m)$ to resolve the permutation problem with the method mentioned in [Conventional method 1]. After resolving the permutation problem, permutation/scaling resolution unit 62-$k$ then applies tags $\Pi_{kq}$ to the separated signal values $Y_{kq}$ (q=1, . . . , V) to show which source signal the separated signal values $Y_{kq}$ (q=1, . . . , V) correspond to, and these are stored together in temporary memory unit 90. Here, these tags $\Pi_{kq}$ are represented by adding the superscript $\Pi kq$ to the separated signal values $Y_{kq}$.

For example permutation/scaling resolution unit 62-$k$ might compare the estimated arrival direction $\theta_q$ of the signal, which is obtained using the inverse matrix of separation matrix W(f) extracted from temporary memory unit 90 (or the Moore-Penrose pseudo-inverse matrix when N≠M) by the following formula:

FORMULA 13 (17)
$$\theta_q = \arccos \frac{\arg([W_{jq}^{-1}]/[W_{j'q}^{-1}])}{2\pi f v_e^{-1} d}$$

(where $v_e$ is the signal velocity and d is the distance between sensor j and sensor j')

with the representative value included in set $G_k$ indicating the variables $SG_k$ extracted from temporary memory unit 90, and associates the representative value $a_i$ closest to $\theta_q$ with the q-th separated signal $Y_{kq}$ (Step S12). In other words, permutation/scaling resolution unit 62-$k$ applies tags $\Pi_{kq}$ to the separated signals $Y_{kq}$ representing the representative values $a_i$ (thereby associating them with these representative values).

After that, permutation/scaling resolution unit 62-$k$ extracts the separation matrix W(f) from temporary memory unit 90 and resolves the ICA scaling problem by updating each row $W_q(f)$ thereof as follows:

$$w_q(f) \leftarrow [W^{-1}(f)]_{jq} w_q(f)$$

and then stores the updated separation matrix W(f) in temporary memory unit 90. For the subsequent processing in signal combination unit 80, it is desirable that the same value of j is used for the entire series k in this process.

The separated signal values $Y_{kq}$ and their appended tags $\Pi_{kq}$ are sent to time domain transformation unit 70-$k$. Time domain transformation unit 70-$k$ uses, for example, a short time inverse discrete Fourier transform or the like to transform each of the separated signal values $Y_{kq}$ (which are obtained in the time-frequency domain) into time-domain signal values, and stores these transformed values in temporary memory unit 90 (Step S13). Note that these time-domain signal values $y_k(t)=[y_{k1}{}^{\Pi k1}(t), \ldots y_{kV}{}^{\Pi kV}(t)]^T$ are also associated with the abovementioned tags $\Pi_{kq}$. When these associations are made, time domain transformation unit 70-$k$ first extracts the tags $\Pi_{kq}$ associated with the frequency-domain signal values $Y_{kq}$ from temporary memory unit 90 for each frequency. Next, time domain transformation unit 70-$k$ judges whether or not the tags $\Pi_{kq}$ at each frequency are all the same. If they are all the same, the time-domain signal values $y_{kq}$ are tagged by associating them with the tags $\Pi_{kq}$ applied to the frequency-domain signal values $Y_{kq}$. On the other hand, if they are not all the same then the tags of the time-domain signal values $y_{kq}$ are determined based on a majority decision.

Next, in mask control unit 40, the variables SG and $SG_k$ are extracted from temporary memory unit 90, and the union set $G^\cup G_k$ of the sets G and $G_k$ represented by these variables is taken as a new set G; this set G is substituted into variable SG, and this variable SG is stored in temporary memory unit 90 (Step S14). Also, mask control unit 40 reads out variables SG and $SG_0$ from temporary memory unit 90, and judges whether or not this new set G is equal to set $G_0$ (Step S15). Here, unless $G=G_0$, the processing returns to Step S7.

On the other hand, if $G=G_0$, then in signal combination unit 80, the separated signals $y_{kp}(t)$ output from each system k (time domain transformation unit 70-$k$/$k=1, \ldots$, u) are read out from temporary memory unit 90, and these are selected and combined to yield all N separated signals (Step S16). For example, signal combination unit 80 might first compare the tags $\Pi_{kq}$ of each separated signal $y_{kp}(t)$ read out from temporary memory unit 90. Here, when it is judged that there are no separated signal values $y_{kp}(t)$ that have the same tag in a plurality of systems k, signal combination unit 80 outputs all the separated signal values $y_{kq}(t)$ as the final separated signal values $y_i(t)$ ($i=1, \ldots, N$) (Step S17). On the other hand, when it is judged that there are separated signal values having the same tag in a plurality of systems, signal combination unit 80 either appropriately selects one of these separated signal values with the same tag and outputs it as a final separated signal value $y_i(t)$, or calculates the mean of the separated signal values with the same tag and uses this mean value as the output signal (Step S17).

Here, in the process whereby one of the separated signal values $y_{kq}(t)$ is appropriately selected and output as the final separated signal value $y_i(t)$, signal combination unit 80 could, for example, determine which of the separated signal values $y_{kq}(t)$ having the same tag $a_i$ contains the greatest power, and output it as the final separated signal value $y_i(t)$. Also, in the process whereby the mean of the separated signal values having the same tag is output as the final separated signal value $y_i(t)$, signal combination unit 80 could, for example, use the following formula:

FORMULA 14

$$y_i(t) = \frac{1}{K}\sum\nolimits_{\Pi_{kq}=a_i} y_{kq}^{\Pi_{kq}}(t)$$

(where K is the number of separated signals having the same tag $a_i$)

In this way, the N signals are separated with low distortion.

Characteristics of this Embodiment

In the conventional method described in [Conventional method 2: The sparsity method], the distortion of the separated signals increases when the separation performance is increased because when $\epsilon$ in the abovementioned Formula (3) is made sufficiently small to increase the separation performance, the signal components extracted by this binary mask become more restricted and most of the samples that should be extracted as components of the original signals are not extracted. In other words, many zero components are padded into each separated signal, making the separated signals discontinues and generating musical noise.

On the other hand, in this embodiment mixed signals (limited signals) consisting of any number between 2 and M original signals are extracted by a mask having a smooth profile. Consequently, it is possible to extract limited signals of signals (samples) over a wider range of relative values $z(f,m)$ than with the binary mask of [Conventional method 2] which only extracts the values of one signal.

Therefore, even when there are two or more observed signals at the same frequency at the same timing and the sample values are far away from the representative values that they should basically correspond to, there is still a high likelihood of extracting these sample values. As a result, it is possible to suppress the degradation of quality (generation of musical noise) caused by padding zero components into separated signals discontinuously.

Also, in this embodiment, in situations where N ($N \geq 2$) signals are mixed together and observed with M sensors, a smooth-profile mask is used to separate and extract the signals. Unlike the masks used in [Conventional method 2] (a binary mask with a value of 0 or 1), a mask with this smooth profile has a profile that extends smoothly at the edges. Consequently, if this smooth-profile mask is used, then even if there are two or more observed signals at the same frequency at a certain timing and the sample relative values are separated from the representative values $a_1, \ldots, a_N$ that the sample ought to correspond to, the mask for this position may have a nonzero value, and thus it is possible to extract more signals than with a binary mask whose value changes abruptly. As a result, it is possible to suppress quality degradation resulting from zero components being padded discontinuously into the separated signals.

Also, since the smooth-profile mask has values that become smaller with increasing proximity to the edge parts, there is less degradation of the separation performance than in cases where a conventional binary mask is simply used with a greater value of $\epsilon$.

Furthermore, since the extracted limited signals are thought to consist only of V ($\leq M$) source signals, the separation problem becomes much simpler. Accordingly, signal separation can easily be performed on the limited signals by using [Conventional method 1] and/or [Conventional method 3]. Also, as described in the third embodiment discussed below, when V=1, it is not even necessary to use [Conventional method 1] or [Conventional method 3].

Performance Comparison

In the following, the performance of signal separation performed according to [Conventional method 2] is compared in tabular form with the performance of signal separation performed using [Mask 2] according to the method of this embodiment.

TABLE 1

|  | SIR1 | SIR2 | SIR3 | SDR1 | SDR2 | SDR3 |
| --- | --- | --- | --- | --- | --- | --- |
| Conventional method 2 | 17.3 | 11.6 | 17.6 | 8.1 | 7.4 | 7.1 |
| This embodiment | — | 5.9 | 17.6 | — | 13.4 | 17.4 |
|  | 18.5 | 7.0 | — | 16.2 | 13.0 | — |

In this example, using speech signals from three speakers (two male and one female) as the source signals, mixtures of these signals were produced to simulate the results of observing them in a reverberation-free environment with two omni directional microphones. In the table, SIR stands for "signal to interference noise ratio" (dB), which is an indicator of the separation performance. Also, SDR stands for "signal to distortion ratio" (dB), which is an indicator of the level of distortion in the signal. For both indicators, higher values indicate better performance. Also, SIR1 and SDR1 correspond to speaker 1, SIR2 and SDR2 correspond to speaker 2, and SIR3 and SDR3 correspond to speaker 3. The data for this embodiment is divided vertically into two rows corresponding to the separation results of the k=1 system and the separation results of the k=2 system respectively.

As this table shows, with the method of this embodiment it was possible to obtain SDR values substantially higher than with conventional method 2 with almost no degrading in separation performance SIR. This shows that the separation could be performed with low signal distortion. It can thus be seen that the method of this embodiment is an effective way of separating signals with low distortion in cases where the number of signal sources N is greater than the number of sensors M.

Second Embodiment

This embodiment also relates to the first present invention. This embodiment is an example in which a "smooth-profile mask" is used in the limited signal generation unit, and a separation method based on the estimation of a mixing matrix is used in the limited signal separation unit. Note that in this embodiment, the description of items that are the same as in the first embodiment is omitted.

Figure 8:
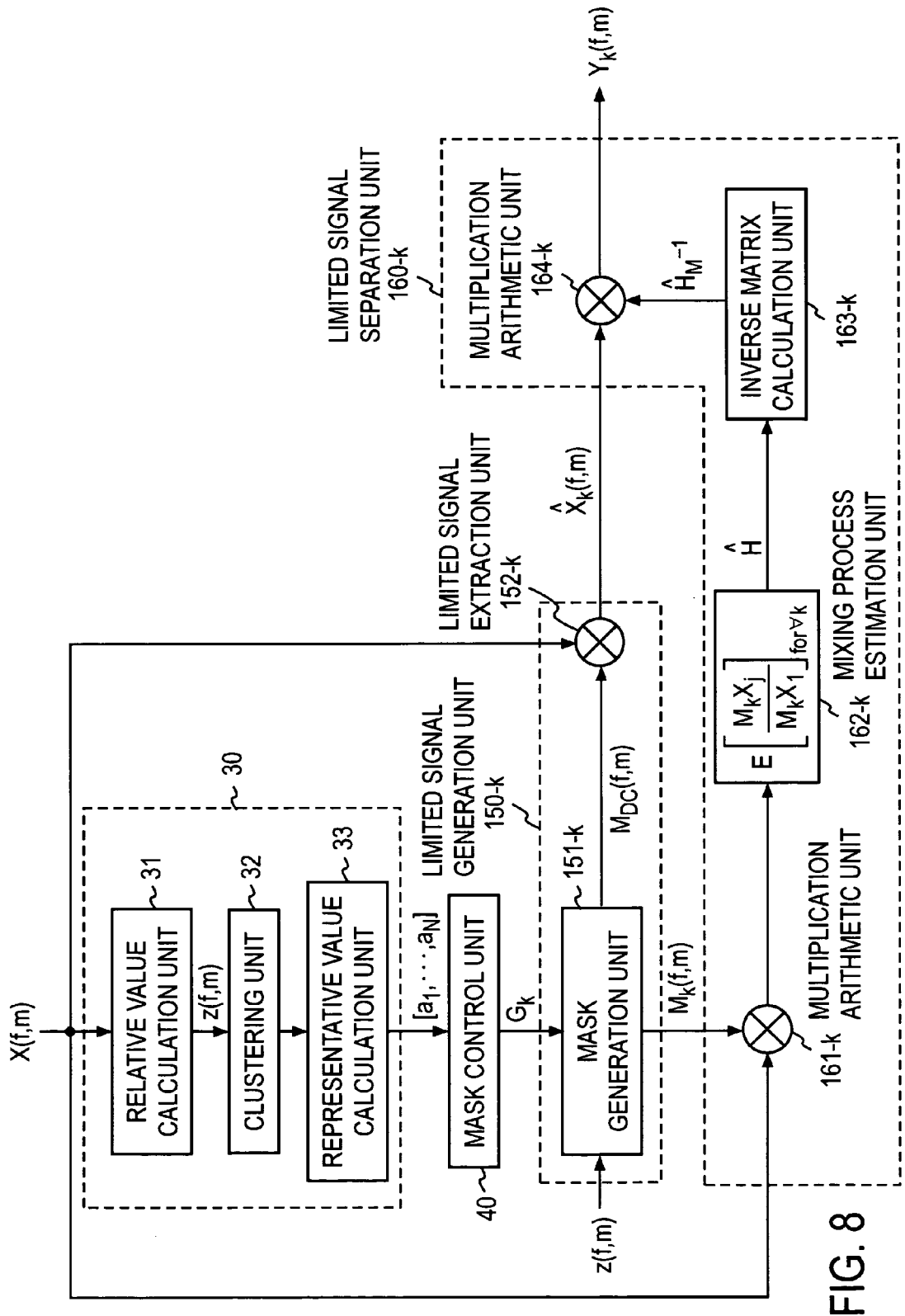
[FIG. 8] A block diagram showing an example of one system of a signal separation device according to a second embodiment.

FIG. 8 shows a block diagram illustrating just one of the systems used to obtain V separated signal values in a signal separation device according to this embodiment.

In FIG. 8, configurations that are the same as in the first embodiment are labeled with the same reference numerals as in the first embodiment. As shown by the example in FIG. 8, the signal separation device of this embodiment differs from the signal separation device 1 of the first embodiment in that limited signal generation unit 50-$k$ is replaced with limited signal generation unit 150-$k$, and limited signal separation unit 60-$k$ is replaced with limited signal separation unit 160-$k$. It also differs in that mask generation unit 151-$k$ produces two types of mask, and in that the restriction V=M is imposed. The configuration and processing of this embodiment are described below.

First, representative value generation unit 30 (FIG. 8) extracts the frequency domain observed signal values $X_j(f,m)$ generated by frequency domain transformation unit 20 (FIG. 1) from temporary memory unit 90. Next, representative value generation unit 30 (FIG. 8) calculates the relative values $z(f,m)$ of the observed values in relative value calculation unit 31 in the same way as in the first embodiment, clustering is performed in clustering unit 32, and the representative values $a_1, a_2, \ldots, a_N$ are calculated in representative value calculation unit 33. Note that in this embodiment, for the relative values $z(f,m)$ it is preferable to use the arrival directions of signals obtained from the phase differences $z_1(f,m)$ between the observed signals at any two sensors (the i-th and j-th sensors) as follows:

FORMULA 15

$$z_3(f, m) = \cos^{-1} \frac{z_1(f, m) v_e}{2\pi f d}$$

These representative values $a_1, a_2, \ldots, a_N$ are stored in temporary memory unit 90 (FIG. 1), and are then sent via mask control unit 40 (FIG. 8) to the mask generation unit 151-$k$ of limited signal generation unit 150-$k$, whereby mask generation unit 151-$k$ produces two types of mask. One is a mask for extracting the limited signal values $X\hat{}(f,m)$ containing a mixture of V (=M) signals corresponding to V (=M) representative values included in $G_k$; this is the smooth-profile mask $M_{DC}(f,m)$ shown in the first embodiment. The other is a binary mask $M_k(f,m)$ that extracts signals including only one signal; this is the same sort of mask as the one shown in [Conventional method 2] and is defined as follows:

FORMULA 16 (18)

$$M_k(f, m) = \begin{cases} 1 & a_k - \varepsilon \leq z(f, m) \leq a_k + \varepsilon \\ 0 & \text{otherwise} \end{cases} \quad (k = 1, \ldots, N)$$

These masks are stored in temporary memory unit 90 (FIG. 1).

Next, limited signal extraction unit 152-$k$ (FIG. 8) reads out the smooth-profile mask $M_{DC}(f,m)$ and the frequency-domain observed signal values $X(f,m)$ from temporary memory unit 90 (FIG. 1). Limited signal extraction unit 152-$k$ (FIG. 8) then calculates the limited signal values $X\hat{}(f,m)=M_{DC}(f,m)X(f,m)$ by multiplying the frequency-domain observed signal values $X(f,m)$ by this mask $M_{DC}(f,m)$, and stores the results in temporary memory unit 90 (FIG. 1). Here, since these limited signal values $X\hat{}(f,m)$ are approximated by a mixture of V signals, the separation of signals in limited signal separation unit 160-$k$ can be performed by applying the mixing matrix estimation method discussed in [Conventional method 3].

Therefore, in multiplication arithmetic unit 161-$k$ of limited signal separation unit 160-$k$ (FIG. 8), the binary mask $M_k(f,m)$ and frequency-domain observed signal values $X(f,m)$ are first read out from temporary memory unit 90 (FIG. 1). Then, multiplication arithmetic unit 161-$k$ (FIG. 8) determines the separated signal values $X_k\hat{}(f,m)$ including just one signal by performing the calculation $X_k\hat{}(f,m)=M_k(f,m)X(f,m)$, and stores it in temporary memory unit 90 (FIG. 1). Next, mixing process estimation unit 162-$k$ (FIG. 8) reads out $X_k\hat{}(f,m)$ from temporary memory unit 90 (FIG. 1) and calculates the estimated mixing matrix $H\hat{}$ in the same way as in [Conventional method 3] as follows:

FORMULA 17

$$\hat{H}_{ji}(f) = E\left[\frac{M_i(f, m_i)X_j(f, m_i)}{M_i(f, m_i)X_1(f, m_i)}\right]$$

$$= E\left[\frac{\hat{X}_j(f, m_i)}{\hat{X}_1(f, m_i)}\right] = E\left[\frac{H_{ji}(f)S_i(f, m_i)}{H_{1i}(f)S_i(f, m_i)}\right] = E\left[\frac{H_{ji}(f)}{H_{1i}(f)}\right]$$

This mixing matrix $H\hat{}$ is an N×M matrix. It is not necessary to determine this mixing matrix for every series k, and instead the matrix $H\hat{}$ estimated for one series may be used by storing it in temporary memory unit 90 and sequentially reading it out.

This mixing matrix $H\hat{}$ is sent to inverse matrix calculation unit 163-$k$, and inverse matrix calculation unit 163-$k$ first drops ranks from this mixing matrix. Specifically, V×V square matrix $H\hat{}_M$ is produced by only reading out the V columns of the mixing matrix $H\hat{}$ that correspond to the limited signals $X\hat{}(f,m)$ consisting of V signals (i.e., the columns corresponding to the V representative values $a_i$ included in $G_k$). This is done in order to separate the limited signals $X\hat{\ }(f,m)$ approximated by a mixture of V signals.

Next, inverse matrix calculation unit 163-$k$ calculates the inverse matrix $H\hat{\ }_M^{-1}(f)$ of this square matrix $H\hat{\ }(m)$, and stores it in temporary memory unit 90 (FIG. 1). Multiplication arithmetic unit 164-$k$ (FIG. 8) reads out the limited signal values $X\hat{\ }(f,m)$ and inverse matrix $H\hat{\ }_M^{-1}(f)$ from temporary memory unit 90 (FIG. 1), and performs the calculation $Y_k(f,m) = H\hat{\ }_M^{-1}(f)X\hat{\ }(f,m)$ to calculate the estimated values of the V separated signals $Y_k(f,m) = [Y_{k1}^{\Pi k1}(f,m), \ldots, Y_{kV}^{\Pi kV}(f,m)]^T$. Note that the appending of tag information to indicate which source signals the separated signals $Y_{kq}$ (q=1, ..., V) correspond to is performed by using $H\hat{\ }_M$ instead of $W^{-1}$ in the abovementioned Formula (17) to determine the estimated arrival direction of the signal, and then judging which of the representative values $a_i$ this direction is close to.

Third Embodiment

This embodiment is also an embodiment relating to the first present invention. In this embodiment, a "smooth-profile mask" is used to extract only a signal consisting of the signal emitted from any one signal source (called a "limited signal" in this embodiment) from the observed signals, and the extracted limited signal is taken to be the separated signal. Note that in this embodiment, the description of items that are the same as in the first embodiment is omitted.

Figure 9:
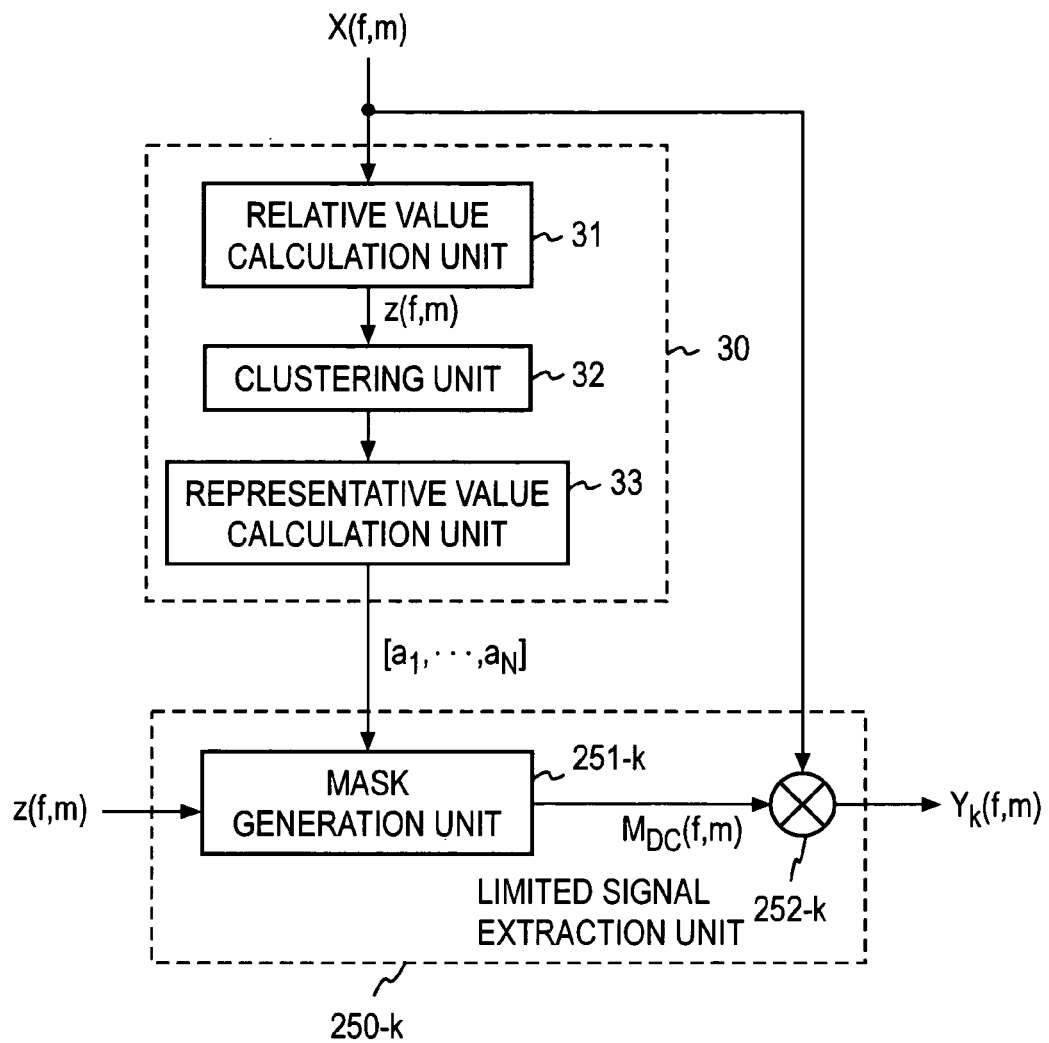
[FIG. 9] A block diagram showing an example of a single system of a signal separation device according to a third embodiment.

FIG. 9 is a block diagram showing an example of one system part of a signal separation device according to this embodiment, whereby one separated signal is obtained. Note that in FIG. 9, configurations that are the same as in the first embodiment are labeled with the same reference numerals as in the first embodiment.

As shown by the example in FIG. 9, the signal separation device of this embodiment differs from the signal separation device 1 of the first embodiment in that limited signal generation unit 50-$k$ is replaced with limited signal generation unit 250-$k$, and in that there is no limited signal separation unit 60-$k$ in the signal separation device of this embodiment. The configuration and processing of this embodiment are described below.

First, representative value generation unit 30 (FIG. 9) extracts the frequency-domain observed signal values $X_j(f,m)$ generated by frequency domain transformation unit 20 from temporary memory unit 90 (FIG. 1). Representative value generation unit 30 (FIG. 9) calculates the relative values $z(f,m)$ of the observed values in relative value calculation unit 31 in the same way as in the first embodiment, clustering is performed in clustering unit 32, and the representative values $a_1, a_2, \ldots, a_N$ are calculated in representative value calculation unit 33. For the relative values $z(f,m)$, it is possible to use the phase differences and/or amplitude ratios, or a mapping thereof (e.g., the arrival directions of signals as determined from the phase differences). The relative values used in this embodiment are the arrival directions of signals as determined from the phase differences between the observed signals as follows:

FORMULA 18

$$z_3(f,m) = \cos^{-1}\frac{z_1(f,m)v_e}{2\pi fd}$$

These representative values $a_1, a_2, \ldots, a_N$ are stored in temporary memory unit 90 (FIG. 1), and these representative values $a_1, a_2, \ldots, a_N$ are then read out by mask generation unit 251-$k$ of limited signal generation unit 250-$k$ (FIG. 9), whereby mask generation unit 251-$k$ produces a "smooth-profile mask" for extracting any one of these representative values $a_i$. Note that the "smooth-profile mask" of this embodiment is a function that takes a high level value for relative values in a limited range including V (V=1) representative values, and takes a low level value for representative values that are not inside this limited range, and where the transitions from the high level value to the low level value that accompany changes of the relative value occur in a continuous fashion.

A technique for generating a "smooth-profile mask" according to this embodiment is described below.

First, mask generation unit 251-$k$ generates an (N×N) delay matrix $H_{NBF}(f)$. Specifically, mask generation unit 251-$k$ extracts one of the representative values $a_1, a_2, \ldots, a_N$ (estimated values of the arrival directions of extracted signals) stored in temporary memory unit 90 (FIG. 1), which is denoted as $\theta_1$. Mask generation unit 251-$k$ also extracts the other N–1 representative values (the estimated values of the arrival directions of the signals that are not extracted) from temporary memory unit 90 (FIG. 1), which are denoted as $\theta_i$ (i=2, ..., N). These values of $\theta_1$ and $\theta_i$ are stored in temporary memory unit 90 (FIG. 1). Mask generation unit 251-$k$ sequentially extracts $\theta_1$ and $\theta_i$ from temporary memory unit 90, calculates $\tau_{ji} = (d_j/v_e)\cos\theta_i$ (j=1, ..., N) and the elements at (j,i) in delay matrix HNBF(f) $H_{NBFji}(f) = \exp(j2\pi f\tau_{ji})$, and sequentially stores the results in temporary memory unit 90. Here, $d_j$ is the distance between sensor 1 and sensor j ($d_1$=0), f is a frequency variable, and $v_e$ is the signal velocity. These parameters could, for example, be pre-stored in temporary memory unit 90 and sequentially read out when required. The above process results in the generation of an (N×N) delay matrix $H_{NBF}(f)$.

Next, mask generation unit 251-$k$ uses this delay matrix $H_{NBF}(f)$ to produce an NBF matrix W(f) with null beamformer (NBF) characteristics. This is obtained by calculating the inverse matrix W(f) of the delay matrix $H_{NBF}(f)$ using the formula $W(f) = H_{NBF}^{-1}(f)$. This NBF matrix $W(f) = H_{NBF}^{-1}(f)$ is stored in temporary memory unit 90. Then, mask generation unit 251-$k$ sequentially extracts the first row elements $W_{1k}(f)$ of NBF matrix W(f) and the values of $d_k$ and $v_e$ from temporary memory unit 90, and generates the directional characteristics function $F(f,\theta)$ shown in Formula (10) above. After that, mask generation unit 251-$k$ uses this directional characteristics function $F(f,\theta)$ to generate a smooth-profile mask $M_{DC}(f,m)$.

For example, a mask represented by Formula (11) (referred to as [Mask 7]) or a mask represented by Formula (12) (referred to as [Mask 8]) in the first embodiment might be generated as the smooth-profile mask $M_{DC}(f,m)$ of this embodiment.

Also, for example, it is possible to generate a [smooth-profile mask] having characteristics whereby the gain in the elimination signal region is made uniformly small as follows:

FORMULA 19 (19)
Mask 9
$M_{DC}(f, m) =$
$$\begin{cases} F(f, z_3(f, m)) & z_3(f, m) \in \text{Region outside the elimination signal} \\ F(f, \theta_r) & z_3(f, m) \in \text{Elimination signal region} \end{cases}$$

Mask 10 (20)
$M_{DC}(f, m) =$
$$\begin{cases} |F(f, z_3(f, m))| & z_3(f, m) \in \text{Region outside the elimination signal} \\ |F(f, \theta_r)| & z_3(f, m) \in \text{Elimination signal region} \end{cases}$$

Here, of the estimated values of the arrival directions of the N−1 signals that are to be eliminated (i.e., the N−1 representative values other than the representative value $a_i$ to be extracted), $\theta_r$ is the one closest to the estimated value of the arrival direction of the signal that is not eliminated (the extracted representative value $a_i$), for example.

It is also possible to use a mask $M_{DC}(f,m)$ with uniform directional characteristics in the extracted direction such as, for example:

FORMULA 20 (21)
Mask 11
$M_{DC}(f, m) =$
$$\begin{cases} |F(f, \theta_1)| & z_3(f, m) \in \text{Limited signal region} \\ |F(f, \theta_r)| & z_3(f, m) \in \text{Elimination signal region} \\ F(f, z_3(f, m)) & z_3(f, m) \in \text{Transitional region} \end{cases}$$

It is also possible to use $M_{DC}(f,m)=|F(f,z_3(f,m))|$ in the transitional region ([Mask 12]).

Figure 10:
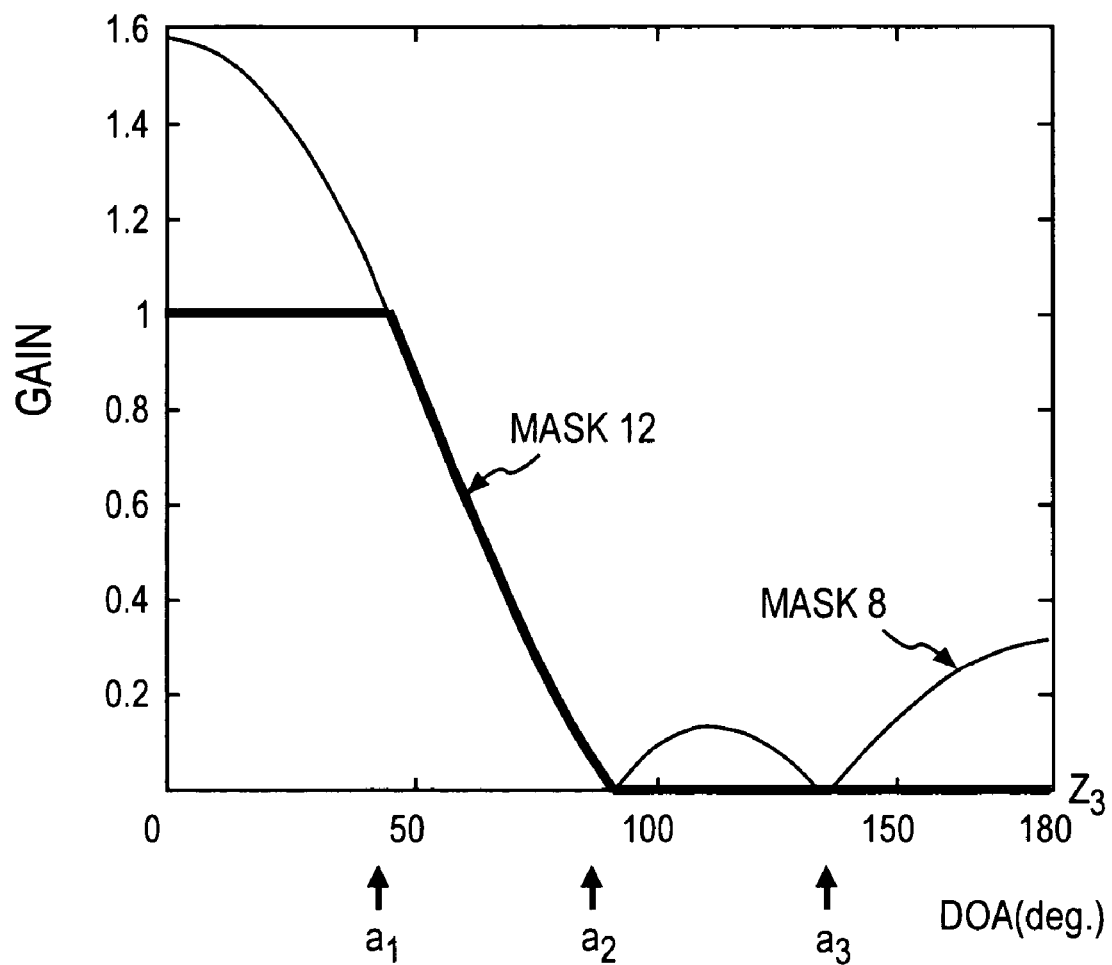
[FIG. 10] An example of a mask in the third embodiment.

Examples of the abovementioned [Mask 8] and [Mask 12] are shown in FIG. 10. These are examples of "smooth-profile masks" that extract signals arriving from direction $a_i$ and suppress signals arriving from directions $a_2$ and $a_3$ when the number of signals is N=3 and the number of sensors is M=2.

The smooth-profile mask $M_{DC}(f,m)$ generated in mask generation unit 251-$k$ is sent to limited signal extraction unit 252-$k$, and limited signal extraction unit 252-$k$ extracts the separated signal $Y_k(f,m)$ according to the formula $Y_k(f,m)= M_{DC}(f,m)X_j(f,m)$.

The above process is performed in a plurality of systems until all the separated signals have been extracted, finally yielding all the separated signals Y(f,m). The signal separation device then restores these separated signals Y(f,m) to the time domain in the time domain transformation unit, and these signals are output by passing them straight through the signal combination unit.

Performance Comparison

In the following, the performance of signal separation performed according to [Conventional method 2] is compared in tabular form with the performance of signal separation performed using [Mask 8] and [Mask 11] according to the method of this embodiment.

TABLE 2

|  | SIR1 | SDR1 | SIR2 | SDR2 | SIR3 | SDR3 |
|---|---|---|---|---|---|---|
| Conventional method 2 | 15.0 | 7.9 | 10.3 | 11.1 | 17.3 | 9.0 |
| This embodiment (Mask 8) | 14.8 | 12.1 | 5.9 | 17.2 | 14.6 | 11.1 |
| This embodiment (Mask 11) | 15.4 | 13.0 | 8.3 | 16.1 | 16.1 | 11.4 |

In this example, using speech signals from three speakers (two male and one female) as the source signals, mixtures of these signals were produced to simulate the results of observing them in a reverberation-free environment with two non-directional microphones.

TABLE 3

|  | SIR1 | SDR1 | SIR2 | SDR2 | SIR3 | SDR3 |
|---|---|---|---|---|---|---|
| Conventional method 2 | 15.1 | 11.3 | 9.0 | 13.3 | 13.4 | 9.2 |
| This embodiment (Mask 8) | 14.6 | 11.4 | 5.5 | 17.2 | 14.3 | 11.6 |
| This embodiment (Mask 11) | 15.5 | 12.2 | 7.9 | 16.0 | 15.4 | 11.7 |

This example shows the simulated results obtained under the same conditions as in Table 2 except that the signals were mixed differently (specifically, the positional arrangement of the speakers was changed).

TABLE 4

|  | SIR1 | SDR1 | SIR2 | SDR2 | SIR3 | SDR3 |
|---|---|---|---|---|---|---|
| Conventional method 2 | 11.0 | 7.7 | 4.3 | 10.8 | 13.4 | 6.4 |
| This embodiment (Mask 8) | 10.8 | 7.8 | 2.7 | 16.5 | 12.9 | 7.6 |
| This embodiment (Mask 11) | 12.0 | 8.7 | 3.5 | 15.7 | 14.9 | 7.1 |

This example shows the simulated results obtained under the same conditions as in Table 2 except for the member of speakers(three male).

As these tables show, with the method of this embodiment it was possible to obtain SDR values substantially higher than with conventional method 2 with almost no degrading in separation performance SIR. This shows that separation could be performed with low signal distortion. It can thus be seen that the method of this embodiment is an effective way of separating signals with low distortion in cases where the number of signal sources N is greater than the number of sensors M.

Fourth Embodiment

This embodiment also relates to the first present invention. In this embodiment, a smooth-profile mask is generated by convolving a binary mask with a smooth profile function. In the following, only the processing performed in the mask generation unit (equivalent to mask generation unit 51-$k$ in FIG. 1) is described. The other configurations and processes are the same as in the first through third embodiments. In this embodiment, the relative values z(f,m), could be derived from the parameters described in the first embodiment, such as the phase differences $z_1(f,m)$, amplitude ratios $z_2(f,m)$, or the arrival directions $z_3(f,m)$ obtained from the phase differences $z_1(f,m)$.

Figure 11:
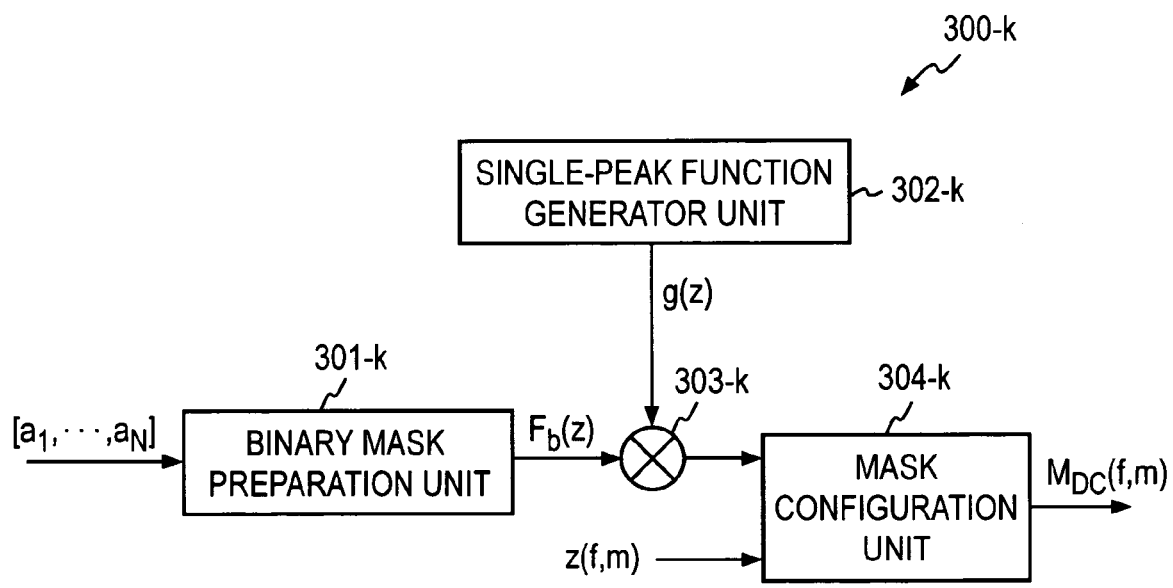
[FIG. 11] A block diagram showing an example of the configuration of a mask generation unit according to a fourth embodiment.

FIG. 11 shows a block diagram of an example of the configuration of mask generation unit 300-$k$ in this embodiment.

When the processing of mask generation unit 300-$k$ is started, binary mask preparation unit 301-$k$ first generates a binary mask which is a function that takes a high level value for relative values inside a prescribed range including V representative values and a low level value for relative values that are not inside this range, and where the transitions from the high level value to the low level value that accompany changes of the relative value occur in a discontinues fashion. For example, mask generation unit 300-$k$ might generate a binary mask for extracting signals consisting of V mixed signals according to the following formula:

FORMULA 21

$$F_b(z) = \begin{cases} 1 & a_{min} \leq z \leq a_{max} \\ 0 & \text{otherwise} \end{cases}$$

When extracting a signal that includes V representative values from $a_{k+1}$ to $a_{k+V}$, the parameters $a_{min}$ and $a_{max}$ could, for example, be set in the ranges $a_k < a_{min} < a_{k+1}$ and $a_{k+V} < a_{max} < a_{k+V+1}$. These parameters may be set appropriately, but more specifically $a_{min}$ and $a_{max}$ can be calculated by the following process, for example.

First, mask generation unit 300-$k$ reads in the relative values z(f,m), clusters $C_i$ and representative values $a_i$ (i=1, ..., N) from temporary memory unit 90 (FIG. 1) (see Steps S3-5 of the first embodiment), and calculates the variance value of each cluster C1 from the following calculation:

FORMULA 22

$$\sigma^2(f)_i = (1/|C_1|) \sum_{m \in T_i} (z(f,m) - a_i(f))^2 \qquad (22)$$

where $|C_i|$ is the number of relative values z(f,m) that belong to cluster $C_i$. This variance value can also be obtained by using, for example, an EM algorithm (see, e.g., Richard O. Duda, "Pattern Classification ($2^{nd}$ ed.)," John Wiley & Sons, Inc., ISBN 0-471-05669-3) or the like, and fitting the data to a Gaussian model.

The calculated variance values $\sigma^2_i$ are stored in temporary memory unit 90 (FIG. 1), and then mask generation unit 301-$k$ (FIG. 1) reads in the variance values $\sigma^2_i$ and representative values $a_i$ (in this example, the mean values of the clusters $C_i$) stored in temporary memory unit 90, and uses them to perform the following calculation:

FORMULA 23

$$a_{min} = \frac{\sigma_{k+1} \cdot a_k + \sigma_k \cdot a_{k+1}}{\sigma_{k+1} + \sigma_k}$$

$$a_{max} = \frac{\sigma_{k+V} \cdot a_{k+V+1} + \sigma_{k+V+1} \cdot a_{k+V}}{\sigma_{k+V} + \sigma_{k+V+1}}$$

(23)

(This ends the description of the specific calculation example of $a_{min}$ and $a_{max}$.)

The binary mask $F_b(z)$ generated in this way is stored in temporary memory unit 90 (FIG. 1).

Next, a single-peak function generator unit 302-$k$ (FIG. 11) generates a single-peak function g(z) whose value changes continuously with changes in z, and stores it in temporary memory unit 90 (FIG. 1). As an example of single-peak function g(z), it is possible to use a function with a smooth profile such as the following Gaussian function:

FORMULA 24

$$g(z) = \frac{1}{\sqrt{2\pi\sigma^2}} \exp\left\{-\frac{1}{2}\left(\frac{z}{\sigma}\right)^2\right\}$$

Here, σ represents the standard deviation of g(z). For example, when extracting the range $a_{k+1}$ through $a_{k+V}$, it is preferable to set σ to a suitable value so that $a_{min} - \sigma > a_k + \sigma_k$ and $a_{max} + \sigma < a_{k+V+1} - \sigma_{k+V+1}$, e.g., by choosing σ so that $\sigma = \min(\sigma_k, \sigma_{k+V+1})$. Here, $\sigma_k$ and $\sigma_{k+V+1}$ are given by Formula (22). Also, the notation min(α,β) represents the operation of extracting the smaller of the values α and β.

Next, a convolutional mixing unit 303-$k$ (FIG. 11) reads in binary mask $F_b(z)$ and single-peak function g(z) from temporary memory unit 90 (FIG. 1), calculates the convolution of this binary mask $F_b(z)$ with the single-peak function g(z) with the function $F(z) = F_b(z) * g(z)$, and stores it in temporary memory unit 90 (FIG. 1). Here, the symbol * is a convolution operator for the variable z.

After that, mask configuration unit 304-$k$ (FIG. 11) reads in the relative values z(f,m) and function F(z) from temporary memory unit 90 (FIG. 1), generates a mask by substituting the relative values z(f,m) into function F(z) as follows:

$$M_{DC}(f,m) = F(z(f,m)) \qquad (24)$$

and stores this mask in temporary memory unit 90 (FIG. 1).

Alternatively, the mask of Formula (24) could be obtained using a smooth-profile function F(z) that produces a mask profile where the ends of a binary mask $F_b(z)$ have straight-line (or curved) segments with a given gradient.

The mask of Formula (24) could also be obtained by using a mask configuration unit 304-$k$ (FIG. 11) to read in the representative values $a_i$ (in this example, the mean values of clusters $C_i$) and the values of $a_{min}$, $a_{max}$ and variance values ($\sigma^2_i$ obtained as shown in Formula (22) and Formula (23), calculate a Gaussian function with a mean of $a_i(f)$ and a variance of $\sigma^2_i(f)$:

FORMULA 25

$$g_i(z) = \frac{1}{\sqrt{2\pi\sigma_i^2}} \exp\left\{-\frac{1}{2}\left(\frac{z - a_i}{\sigma_i}\right)^2\right\}$$

normalize this Gaussian function by replacing $g_i(z)$ with $g_i(z)/g_i(a_i)$ so that the value at $a_i$ becomes 1, and then perform the following calculation:

$$F(z) = \begin{cases} g_k(z) & a_{\min} > z \\ 1 & a_{\min} \leq z \leq a_{\max} \\ g_{k+V} & a_{\max} < z \end{cases}$$

Fifth Embodiment

This embodiment also relates to the first present invention. In this embodiment, a smooth-profile mask is generated from the differences between odd functions. In the following, only the processing performed in the mask generation unit (equivalent to mask generation unit 51-$k$ in FIG. 1) is described. Note that the other configurations and processes are the same as in the first through third embodiments.

The mask generation unit of this embodiment generates a smooth-profile mask from a single-peak function obtained by mapping the differences between a first odd function that is zero when the relative value is the lower limit value $a_{min}$ of a limited range and a second odd function that is zero when the relative value is the upper limit value $a_{max}$ of a limited range. For example, a "smooth-profile mask" could be made using the following function:

$$M_{DC}(f,m) = \{\tan h(z(f,m) - a_{min}) - \tan h(z(f,m) - a_{max})\}^\alpha$$

Note that for the relative values $z(f,m)$, this embodiment uses the phase differences $z_1(f,m)$ and/or amplitude ratios $z_2(f,m)$ shown in the first embodiment and the like, or a mapping thereof (e.g., the arrival directions $z_3(f,m)$ of signals as determined from the phase differences, or the like). Also, $\alpha$ is any positive number, and the values of $a_{min}$ and $a_{max}$ are obtained in the same way as in the fourth embodiment. If necessary normalization may also be performed using a formula such as the following:

$$M_{DC}(f,m) = M_{DC}(f,m) / \max(M_{DC}(f,m))$$

Sixth Embodiment

This embodiment also relates to the first present invention. A mask according to this embodiment is generated in mask generation unit 51-$k$ shown in FIG. 1 and FIG. 2, and is a function (binary mask) that takes a high level value for relative values inside a prescribed range including V representative values and a low level value for representative values that are not inside this prescribed range, and where the transitions from the high level value to the low level value occur in a discontinues fashion. Here, $2 \leq V \leq M$. As a specific example, a mask could be generated according to the following formula:

FORMULA 26 (25)

$$B(f, m) = \begin{cases} 1 & a_{\min} \leq z(f,m) \leq a_{\max} \\ 0 & \text{otherwise} \end{cases}$$

Note that when extracting a signal including V representative values from $a_{k+1}$ to $a_{k+V}$, the parameters $a_{min}$ and $a_{max}$ could, for example, be set in the ranges $a_k < a_{min} < a_{k+1}$ and $a_{k+V} < a_{max} < a_{k+V+1}$. More specifically, $a_{min}$ and $a_{max}$ could, for example, be generated according to the same procedure as the method discussed in the fourth embodiment. In this embodiment, the relative values $z(f,m)$ could be derived from parameters such as the phase differences $z_1(f,m)$, amplitude ratios $z_2(f,m)$, or the arrival directions $z_3(f,m)$ obtained from the phase differences $z_1(f,m)$.

Furthermore, the number of relative values $z(f,m)$ included in the range from $a_{min}$ to $a_{max}$ should be at least as much as 2 and no greater than the number of sensors M, and should preferably be equal to the number of sensors M. As in the first embodiment, a plurality of binary masks $B(f,m)$ are generated in this embodiment.

As a specific example, mask control unit 40 (FIG. 1, FIG. 2) reads out the representative values $a_1, a_2, \ldots, a_N$ from temporary memory unit 90, substitutes the data specifying a set $G_0$ whose elements are these representative values $a_1, a_2, \ldots, a_N$ into a variable $SG_0$, and stores this variable $SG_0$ in temporary memory unit 90. Mask control unit 40 also initializes a variable SG specifying a set G to $G = \emptyset$ (the empty set), and a variable k is set to zero; these are stored in temporary memory unit 90 (FIG. 4; Step S6). Next, under the control of mask control unit 40, processing is performed in a plurality of systems (u systems) in limited signal generation unit 50-$k$ (k=1, ..., u), limited signal separation unit 60-$k$ and time domain transformation unit 70-$k$ until all N separated signals have been obtained. First, mask control unit 40 adds 1 to the value of variable k stored in temporary memory unit 90 to obtain a new value for variable k which is stored back in temporary memory unit 90 (FIG. 4; Step S7). Next, mask control unit 40 retrieves the variables $SG_0$ and SG from temporary memory unit 90. Then, in mask control unit 40, a set $G_k$ is selected consisting of V ($\leq M$) suitable representative values including the members of the complementary set $G^c$ of the set G specified by SG (the notation $\alpha^c$ represents the complementary set of $\alpha$), the data specifying this set $G_k$ is substituted into variable $SG_k$, and this variable $SG_k$ is stored in temporary memory unit 90 (FIG. 4; Step S8). The mask generation unit 51-$k$ of limited signal generation unit 50-$k$ reads out the variable $SG_k$ stored in temporary memory unit 90, and produces a binary mask that extracts signals in the clusters whose representative values are in the set $G_k$ specified by this variable $SG_k$ (FIG. 4; Step S9).

Figure 12A:
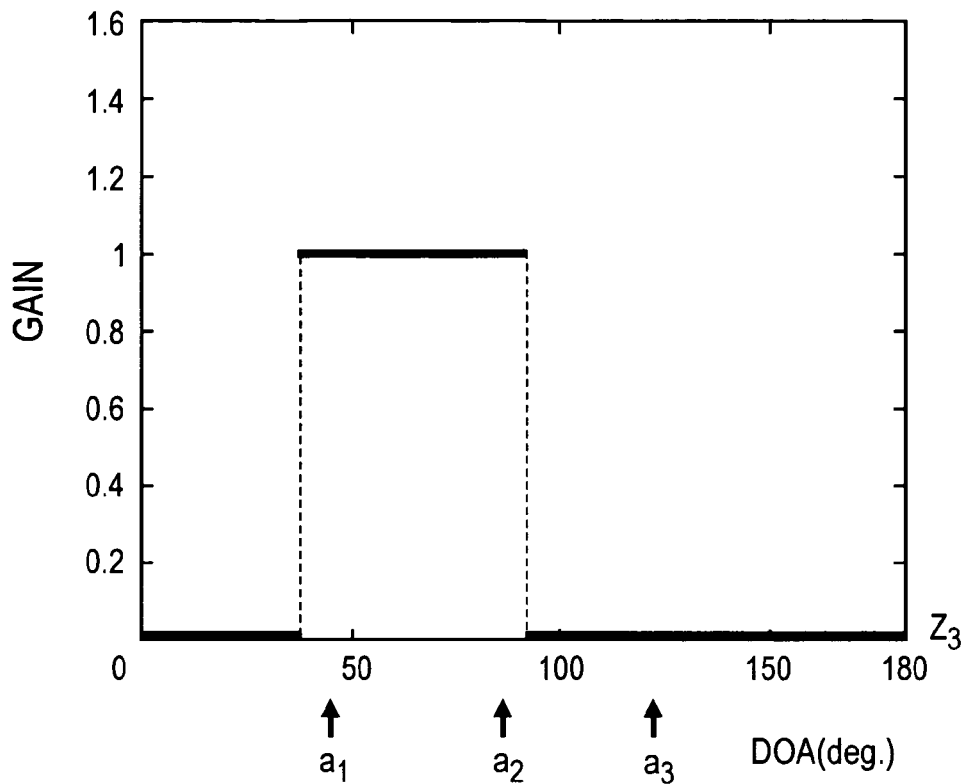
[FIG. 12] An example of a binary mask in a sixth embodiment (A), and an example of a binary mask in a seventh embodiment (B).

FIG. 12A shows an example of a binary mask in this embodiment. This is an example of a binary mask that takes a high level value (e.g., 1) for relative values $z_3(f,m)$ inside a prescribed range that includes two representative values $a_1$ and $a_2$, and takes a low level value (e.g., 0) for representative value $a_3$ which is not inside this prescribed range. The vertical axis of this figure represents the gain of the binary mask, and the horizontal axis represents the relative value $z_3(f,m)$ (the DOA (direction of arrival) of the signal in degrees). As this figure shows, the high level values of this binary mask are flat, and the transitions between the high level value and the low level value are discontinues.

Note that the other configurations and processes are the same as in the first and second embodiments. Specifically, this embodiment extracts the values of a mixed signal (called a "limited signal" in this embodiment) comprising the signals emitted by V signal sources from the frequency domain values by using a binary mask $B(f,m)$ instead of the smooth-profile mask $M_{DC}(f,m)$ used in the first and second embodiments, and then performs the processing of the first or second embodiment.

Also, the processing whereby binary mask $B(f,m)$ is used to extract the values of a mixed signal comprising the signals emitted by V signal sources from the frequency domain signal values is performed by multiplying the frequency domain observed signal values $X_j(f,m)$ by the binary mask $B(f,m)$ ($X^\hat{}(f,m) = B(f,m) X(f,m)$).

Characteristics of this Embodiment

In the conventional method described in "Conventional method 2: The sparsity method", the distortion of the separated signals increases when the separation performance is increased because when ε in the abovementioned Formula (3) is made sufficiently small to increase the separation performance, the signal components extracted by this binary mask become more restricted and most of the samples that should be extracted as components of the original source signal are not extracted. In other words, many zero components are padded into each separated signal, making the separated signals discontinues and generating musical noise.

On the other hand, in this embodiment mixed signals (limited signals) consisting of any number between 2 and M source signals are extracted by a binary mask B(f,m). Consequently, it is possible to extract limited signals of signals (samples) over a wider range of relative values z(f,m) than with the binary mask of [Conventional method 2] which only extracts the values of one signal. For example, in the example shown in FIG. 12A, it is possible to extract not only sample values whose relative value z(f,m) lies in the vicinity of representative values $a_1$ and $a_2$, but also sample values whose relative value z(f,m) is positioned between $a_1$ and $a_2$. Also, a sample that is positioned between $a_1$ and $a_2$, for example, is highly likely to be a sample that corresponds to the representative value of $a_1$ or $a_2$.

Therefore, even when there are two or more observed signals at the same frequency at the same timing and the sample values are separated from the representative values that they should basically correspond to, there is still a high likelihood of extracting these sample values. As a result, it is possible to suppress the degradation of quality (generation of musical noise) that occurs due to padding zero components into discontinues separated signals.

Verification of the Effects of Zero-Padding with a Binary Mask

In the following the effects of zero-padding with a binary mask are discussed with regard to the case where the speech signals $s_1$, $s_2$ and $s_3$ of three speakers are observed with two omni directional microphones (i.e., N=3, M=2).

If the proportion of the signal power lost as a result of zero-padding by using the binary mask is defined as follows:

FORMULA 27 (26)

$$\frac{\sum_t |s_i(t)|^2 - \sum_t |y_i(t)|^2}{\sum_t |s_i(t)|^2} \times 100$$

then the proportion of the signal power lost by the binary mask in the conventional method of "Conventional method 2: the sparsity method" was as follows: $s_1$: 17%, $s_2$: 14%, $s_3$: 23%.

On the other hand, the signal power degradation of the binary mask B(f,m) according to this embodiment was $s_1$: 2.5%, $s_2$: 5.7% for the case where the two signals $s_1$ and $s_2$ were mixed together, and $s_2$: 8.1%, $s_3$: 0.7% for the case where the two signals $s_2$ and $s_3$ were mixed together.

Thus, in this embodiment the degradation of the signals by the binary mask B(f,m) is less than in the conventional method. This indicates that musical noise is less likely to be generated in this embodiment.

Performance Comparison

The simulation results obtained with this embodiment are shown below.

TABLE 5

| | SIR1 | SIR2 | SIR3 | SDR1 | SDR2 | SDR3 |
|---|---|---|---|---|---|---|
| Conventional method 2 | 15.4 | 10.3 | 14.6 | 9.8 | 11.9 | 9.2 |
| This embodiment | — | 8.4 | 16.4 | — | 15.0 | 20.9 |
| | 13.1 | 8.2 | — | 17.4 | 13.8 | — |

In this example, limited signals are extracted with a binary mask according to this embodiment, and signal separation is performed on these limited signals by supplying them to an ICA process. Also, in this example, using speech signals from three speakers (two male and one female) as the source signals, mixtures of these signals were produced to simulate the results of observing them in an anechoic environment with two omni-directional microphones. As this tables shows, with the method of this embodiment it was possible to obtain SDR values substantially higher than with conventional method 2 with almost no degrading in separation performance SIR. This shows that the separation could be performed with much lower distortion in the method of this embodiment.

Seventh Embodiment

This embodiment also relates to the first present invention, and is a variant of the abovementioned sixth embodiment. That is, this embodiment also uses a binary mask to extract a limited signal in cases where $2 \leq V \leq M$, but it differs in terms of the method used to produce the binary mask B(f,m) and the limited signal calculation processing. In the following, only the method used to produce the binary mask B(f,m) and the limited signal calculation processing are described; the other aspects of the processing and functional configuration are the same as in the first embodiment or second embodiment, so their description is omitted.

The purpose of a binary mask B(f,m) according to this embodiment is to extract observed signal components other than the abovementioned limited signal. That is, a binary mask B(f,m) produced by a mask generation unit according to this embodiment is a function that takes a low level value for relative values inside a prescribed range including V representative values (this set is referred to as $G_k$) and a high level value for representative values that are not inside this prescribed range ($G_k^c$), and where the transitions from the high level value to the low level value occur in a discontinues fashion. Here, $2 \leq V \leq M$.

Figure 12B:
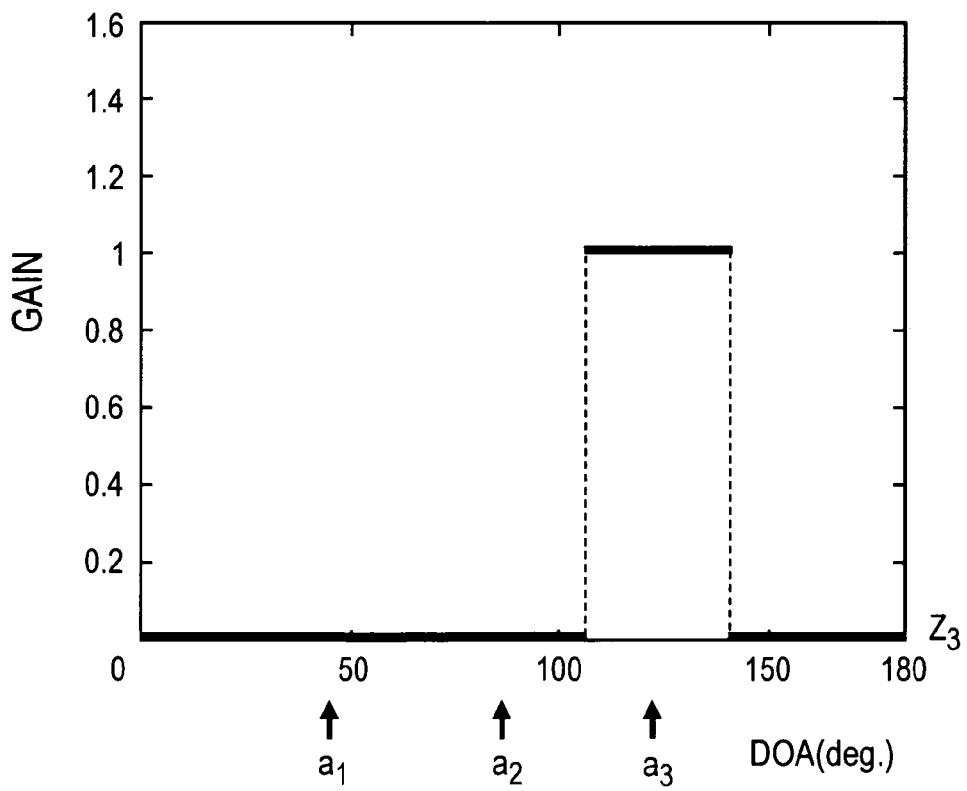

Specifically, a mask generation unit 51-$k$ according to this embodiment generates a binary mask as shown by Formula (3) above for the representative values included in set $G_k^c$, for example. In this embodiment, the relative values z(f,m) could be derived from parameters such as the phase differences $z_1$(f,m), amplitude ratios $z_2$(f,m), or the arrival directions $z_3$(f,m) obtained from the phase differences $z_1$(f,m). FIG. 12B shows an example of a binary mask B(f,m) according to this embodiment. This is an example of a binary mask that takes a low level value (e.g., 0) for relative values $z_3$(f,m) inside a prescribed range that includes V=2 representative values $a_1$, and $a_2$, and takes a high level value (e.g., 1) for representative value $a_3$ which is not inside this prescribed range. The vertical axis of this figure represents the gain of the binary mask, and the horizontal axis represents the relative value $z_3$(f,m) (the arrival direction of the signal in degrees). As this figure shows, the high level values of this binary mask are flat, and the transitions between the high level value and the low level value are discontinues.

The limited signal extraction unit of this embodiment extracts limited signal values X^(f,m) by subtracting the product of this binary mask B(f,m) and the frequency domain signal values $X_j$(f,m) from the frequency domain signal values $X_j$(f,m). For example, by producing binary masks $M_i$(f,m) as shown in Formula (3) above for N–M representative values included in set $G_k^c$, the values X^(f,m) of a limited signal consisting only of M source signals can be calculated by performing the following calculation:

FORMULA 28 (27)
$$\hat{X}(f,m) = X(f,m) - \sum_{G_k^c} \{M_i(f,m)X(f,m)\}$$

Although the abovementioned binary masks $M_i$(f,m) of Formula (3) are binary masks that take a high level value for only one representative value each, the processing of this embodiment can also be implemented using binary masks that take a high level value for 2 or more representative values. Also, instead of a binary mask, the processing of this embodiment may be implemented using a smooth-profile mask as described above.

When a limited signal X^(f,m) has been calculated, the subsequent limited signal separation, time domain transformation and signal combination processes can be performed in the same way as in the first embodiment or second embodiment.

Eighth Embodiment

This embodiment relates to the second present invention, in which masks are defined by clustering the observed values in M-dimensional domains when the signals are observed with M sensors. The following description focuses on the differences between this embodiment and the first embodiment, and the description of items that are the same as in the first embodiment is omitted.

Figure 13:
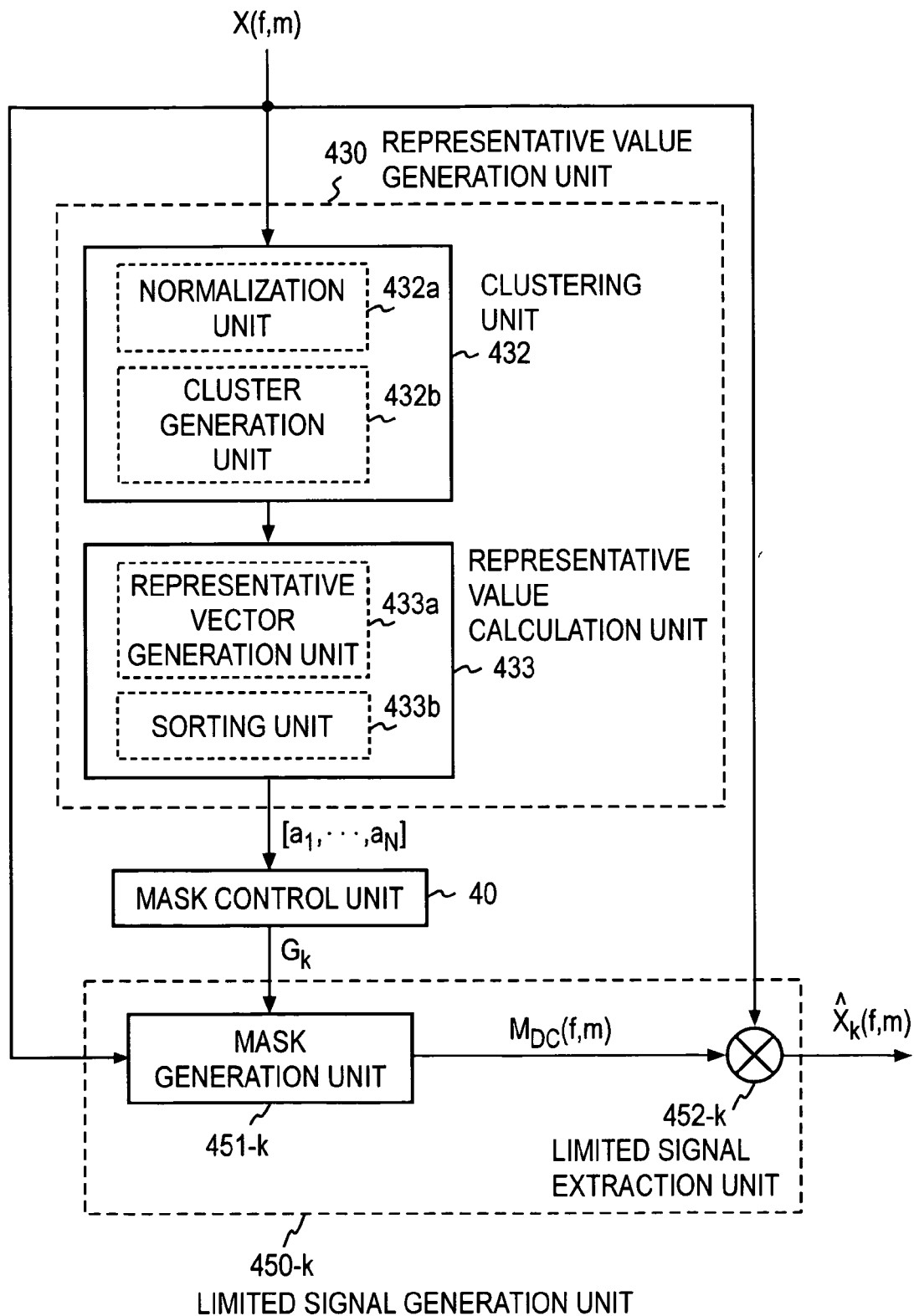
[FIG. 13] A block diagram showing examples of the configuration of the representative value generation unit, mask control unit and limited signal generation unit according to an eighth embodiment.

FIG. 13 shows a block diagram of an example of the configuration of representative value generation unit 430, mask control unit 40 and limited signal generation unit 450-k in this embodiment. This figure only shows one system that obtains V separated signals. In this embodiment, $1 \leq V \leq M$.

The signal separation device of this embodiment differs structurally from signal separation device 1 of the first embodiment in the representative value generation unit and limited signal generation unit. Specifically, this embodiment is provided with a representative value generation unit 430 (FIG. 13) instead of the representative value generation unit 30 of signal separation device 1 of the first embodiment (FIG. 1), and is provided with a limited signal generation unit 450-k (FIG. 13) instead of the limited signal generation unit 50-k of signal separation device 1 (FIG. 1). The other aspects of the configuration are the same as in the first embodiment.

Figure 14:
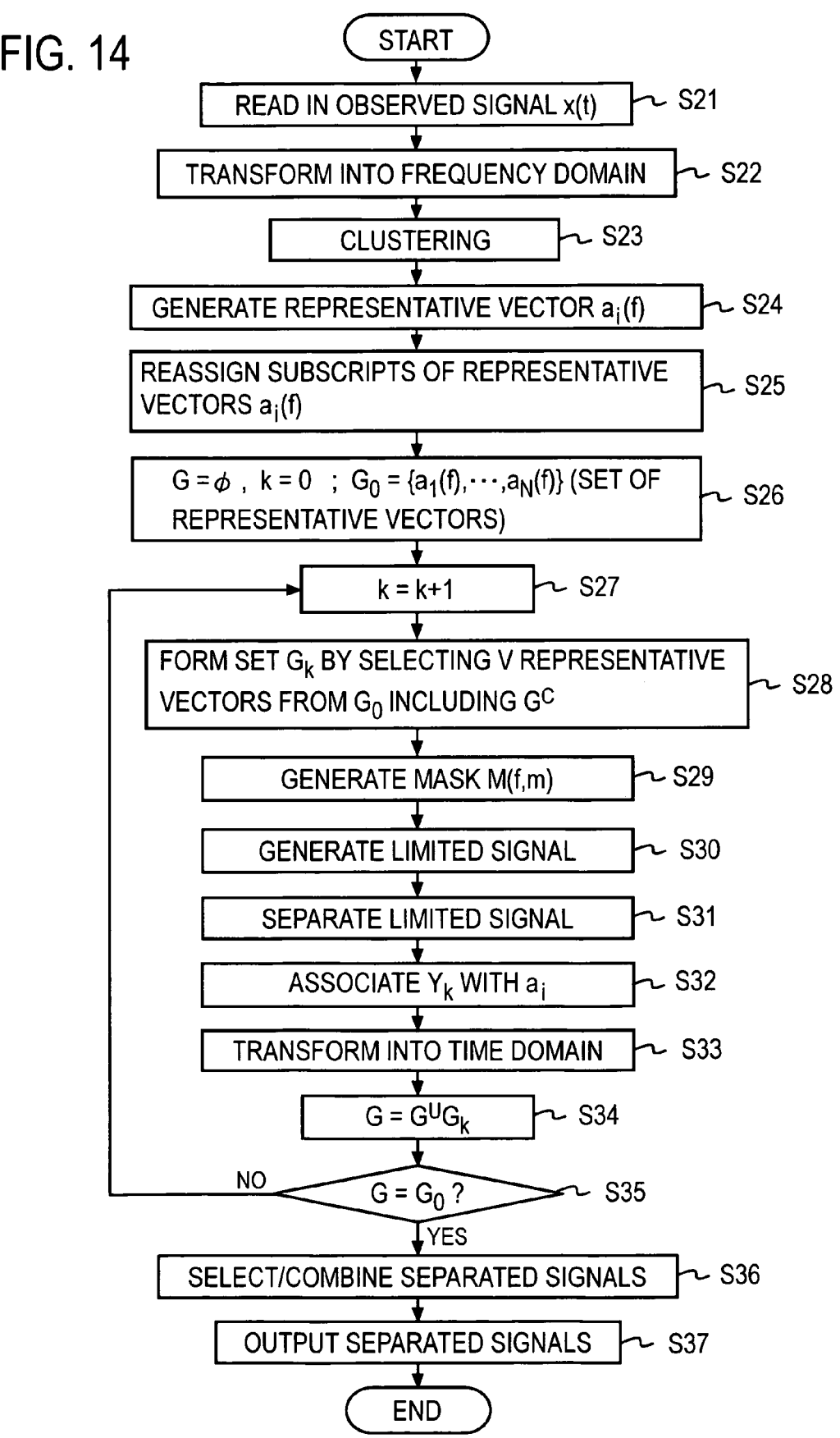
[FIG. 14] A flowchart illustrating the signal separation process in the eighth embodiment.

FIG. 14 shows a flowchart that illustrates the signal separation process in this embodiment. In the following, the signal separation process of this embodiment is described with reference to this flowchart.

First, as a preliminary process, the time-domain observed signals $x_j$(t) (=1, . . . , M) observed by each sensor are stored in memory unit 2 (FIG. 1). Then, when the signal separation process is started, signal separation processor 3 performs the following processing under the control of control unit 10.

First, signal separation processor 3 accesses memory unit 2 under the control of control unit 10 and sequentially reads out each of the observed signal values $x_j$(t), which it sends to frequency domain transformation unit 20 (Step S21). Frequency domain transformation unit 20 uses a transformation such as a short time discrete Fourier transform to transform these signal values into a series of frequency-domain observed signal values $X_j$(f,m) for each time interval, which it stores in temporary memory unit 90 (Step S22).

Next, clustering unit 432 (FIG. 13) reads out the frequency-domain observed signal values $X_1$(f,m), . . . , $X_M$(f,m) stored in temporary memory unit 90 (FIG. 1). Clustering unit 432 (FIG. 13) then clusters the observed signal vectors X(f,m)= [$X_1$(f,m), . . . , $X_M$(f,m)] (called the "first vectors") consisting of the frequency-domain signal values $X_j$(f,m), . . . , $X_M$(f,m) into N clusters each $C_i$(f) (i=1, . . . , N), and generates N clusters $C_i$ (i=1,2, . . . , N) equal to the number of signal sources N (Step S23). These N clusters $C_i$ are stored in temporary memory unit 90 (FIG. 1).

In this embodiment a cluster is a set of observed signal vectors X(f,m), and is expressed using the set $T_i$ of discrete time intervals in the form $C_i(f)=\{X(f,m)|m \in T_i\}$. Also, the aim of clustering is to classify samples (observed signal vectors X(f,m)) in which the same signal source is predominant (i.e., a main component) into the same cluster. Note that the resulting N clusters $C_1$(f), . . . , $C_N$(f) do not necessarily need to be disjoint ($C_i(f) \cap C_j(f)=\emptyset$; $i \neq j$), and there may be some elements that do not belong to any cluster:

FORMULA 29
$$X(f,m) \notin \bigcup_{i=1}^{N} C_i$$

Detailed Description of the Processing in Clustering Unit 432

The processing performed by clustering unit 432 is described in greater detail here.

The clustering unit 432 of this example performs clustering after normalizing each sample so that clustering can be suitably achieved—i.e., so that samples (observed signal vectors X(f,m)) in which the same signal source is dominant are classified into the same clusters.

For example a normalization unit 432a (FIG. 13) could read in the observed signal vectors X(f,m) from temporary memory unit 90 (FIG. 1), perform the following calculation:

FORMULA 30 (28)
$$\text{sign}(X_j(f,m)) = \begin{cases} X_j(f,m)/|X_j(f,m)| & (|X_j(f,m)| \neq 0) \\ 0 & (|X_j(f,m)| = 0) \end{cases}$$

and normalize it as follows:

$$X(f,m) \leftarrow \begin{cases} X(f,m)/\text{sign}(X_j(f,m)) & (|X_j(f,m)| \neq 0) \\ X(f,m) & (|X_j(f,m)| = 0) \end{cases} \quad (29)$$

and then a cluster generation unit 432b could cluster the results of this normalization.

If it is also necessary, the normalization unit 432a of this example follows the normalization of Formula (28) and Formula (29) with additional normalization as follows:

FORMULA 31

$$X(f, m) \leftarrow \begin{cases} X(f, m)/\|X(f, m)\| & (\|X(f, m)\| \neq 0) \\ X(f, m) & (\|X(f, m)\| = 0) \end{cases} \quad (30)$$

and cluster generation unit 432b performs clustering on the results of this normalization. Here, the vector length $\|X(f,m)\|$ is the norm of $X(f,m)$, which can, for example, be obtained from the $L_2$ norm $\|X(f,m)\|=L_2(X(f,m))$ defined as follows:

FORMULA 32

$$L_k(X(f, m)) = \left( \sum_{j=1}^{M} |X_j|^k (f, m) \right)^{1/k} \quad (31)$$

Also, as the clustering method performed by cluster generation unit 432b, it is possible to use a method described in many textbooks, such as hierarchical clustering or k-means clustering (see, e.g., Richard O. Duda, "Pattern Classification ($2^{nd}$ ed.)", John Wiley & Sons, Inc., ISBN 0-471-05669-3, chapter 10). Note that in any clustering method, the distance between two samples $X(f,m)$ and $X'(f,m)$ is defined as a means of measuring the proximity between samples, and clustering is performed so that every effort is made to include samples that are close to each other in the same clusters.

For example, when the samples are normalized only by Formula (29) above, cluster generation unit 432b performs clustering using the cosine distance between two normalized observed signal vectors $X(f,m)$ as a measure of the distance between them. The cosine distance between two samples $X(f,m)$ and $X'(f,m)$ is defined as follows:

$$1 - X^H(f,m) \cdot X'(f,m)/(\|X(f,m)\| \cdot \|X'(f,m)\|) \quad (32)$$

Also, when the samples have been normalized according to the abovementioned Formula (29) and Formula (30), cluster generation unit 432b performs clustering using the $L_2$ norm $\|X(f,m)-X'(f,m)\|=L_2(X(f,m)-X'(f,m))$ of the difference between two normalized observed signal vectors $X(f,m)-X'(f,m)$, or an $L_k$ norm with any value of k, or the cosinedistance (Formula (32)) as a measure of the distance ends the [Detailed description of the processing in clustering unit 432].)

Next, representative value calculation unit 433 sequentially extracts each cluster $C_i(f)$ stored in temporary memory unit 90 (FIG. 1), and calculates a representative vectors (we call it to the "second vectors") $a_i(f)$ to represent each cluster $C_i(f)$ (Step S24).

Detailed Description of the Processing in Representative Value Calculation Unit 433

For example, representative vector generation unit 433a of representative value calculation unit 433 (FIG. 13) first sequentially extracts each class $C_i(f)$ stored in temporary memory unit 90 (FIG. 1), and calculates the mean of the sample values $X(f,m)$ belonging to each cluster $C_i(f)$

FORMULA 33

$$a_i(f) = \sum_{X(f,m) \in C_i(f)} X(f, m)/|C_i(f)|$$

as a representative vector $a_i(f)$ relating to each signal source. Alternatively, the samples $X(f,m)$ belonging to each cluster $C_i(f)$ may be suitably quantized and the most frequent values chosen as the representative vectors $a_i(f)$. The representative vectors $a_i(f)$ obtained in this way are stored in temporary memory unit 90 (FIG. 1).

Next, a sorting unit 433b (FIG. 13) reads out these representative vectors $a_1(f), \ldots, a_N(f)$ from temporary memory unit 90 (FIG. 1) and reassigns the subscript i of each representative vector $a_i(f)$ so that the correspondence between these representative vectors $a_1(f), \ldots, a_N(f)$ and each source signal $S_k(t)$ becomes the same at all frequencies f (Step S25).

For example, sorting unit 433b (FIG. 13) might perform the following calculation using the representative vector $a_i(f)$ for each frequency f:

FORMULA 34

$$\theta_i(f) = \arccos \frac{\arg(a_{ji}(f)/a_{j'i}(f))}{2\pi f v_e^{-1}\|d_j - d_{j'}\|} \quad (34)$$

to calculate the estimated value $\theta_i(f)$ of the arrival direction of source signal i at each frequency f. Here, $d_j$ is the position of sensorj, $v_e$ is the velocity of the signal, and $a_{ji}(f)$ is the i-th element of representative vector $a_i(f)$—for the values of $d_j$ and $v_e$, it is assumed that data pre-stored in temporary memory unit 90 is used, for example.

The estimated values $\theta_i(f)$ calculated in this way are, for example, stored in temporary memory unit 90 (FIG. 1) after associating them with the representative vector $a_i(f)$ used to calculate them. Next, sorting unit 433b (FIG. 13), for example, reads in each estimated value $\theta_i(f)$ from temporary memory unit 90, and sorts them into a prescribed ordering (e.g., ascending or descending order) for each frequency f. This sorting could, for example, be performed using a known sorting algorithm. The information representing the order of the sorted representative vectors at each frequency f (j'(f,$a_i$(f))=1, 2, ..., N) is then stored in temporary memory unit 90 (FIG. 1). Next, sorting unit 433b (FIG. 13) reads in this ordering information j'(f,$a_i$(f)) from temporary memory unit 90, for example, and changes the correspondence between the representative vectors and the indices i (i.e., it reassigns the subscripts i of $a_i(f)$) so that each values of $a_i(f)$ is made to correspond to the j'(f,$a_i$(f))-th source signal. These representative vectors $a_i(f)$ with reassigned subscripts i are then stored in temporary memory unit 90 (FIG. 1).

Next, mask control unit 40 substitutes the data specifying a set $G_0$ whose elements are these representative vectors $a_i(f)$ into a variable $SG_0$, and stores this variable $SG_0$ in temporary memory unit 90. Mask control unit 40 also initializes a variable SG specifying a set G to G=Ø (empty set) and sets a variable k to zero, and stores them in temporary memory unit 90 (Step S26).

Next, under the control of mask control unit 40, processing is performed by a plurality of systems (u systems) comprising limited signal generation unit 50-$k$ (k=1, ..., u), limited signal separation unit 60-$k$ and time domain transformation unit 70-$k$ until all N separated signals have been obtained.

First, mask control unit 40 adds 1 to the value of variable k stored in temporary memory unit 90 to obtain a new value for variable k which is stored back in temporary memory unit 90 (Step S27).

Next, mask control unit 40 retrieves the variables $SG_0$ and SG from temporary memory unit 90 (FIG. 1). Then, in mask control unit 40, a set $G_k$ consisting of V ($\leq$M) suitable representative vectors $a_p(f)$ (p=1, . . . , V) (called the "third vectors") including the members of the complementary set $G^c$ of the set G specified by $SG$ (the notation $\alpha^c$ represents the complementary set of $\alpha$), the data specifying this set $G_k$ is assigned to variable $SG_k$ is selected from the set $G_0$ specified by variable $SG_0$, and this variable $SG_k$ is stored in temporary memory unit 90 (Step S28). That is, mask control unit 40 extracts V representative vectors $a_p(f)$ (p=1, . . . , V) corresponding to the V signals extracted as limited signals from each representative vector $a_1(f), \ldots, a_N(f)$.

In this embodiment, sample values X(f,m) that are close to the representative vectors $a_p(f)$ included in this set $G_k$ are extracted, and sample values X(f,m) that are close to representative vectors not included in this set $G_k$ (i.e., the elements of set $G_k^c$, where $*^c$ is the complementary set of $*$) are not extracted, thereby producing a limited signal X^(f,m) consisting of a mixture of V signals.

For this purpose, in this embodiment the mask generation unit 451-$k$ of limited signal generation unit 450-$k$ (FIG. 13) reads in the variables $SG_k$ and $SG_0$ and the observed signal vector X(f,m) from temporary memory unit 90 (FIG. 1) and generates the following mask $M_k(f,m)$ (Step S29):

FORMULA 35

$$M_k(f, m) = \begin{cases} 1 & \max_{a_p(f) \in G_k} D(X(f, m), a_p(f)) < \min_{a_q(f) \in G_k^c} D(X(f, m), a_q(f)) \\ 0 & \text{otherwise} \end{cases}$$

Here, $D(X(f,m), a_i(f))$ represents the Mahanalobis square distance between vector X(f,m) and $a_i(f)$:

$$D(X(f,m)a_i(f)) = (X(f,m) - a_i(f))^H \Sigma^{-1}(X(f,m) - a_i(f))$$

$\Sigma$ represents the covariance matrix of cluster $C_i$:

$$\sum = \frac{1}{|C_i|} \sum (X(f,m) - a_i(f))(X(f,m) - a_i(f))^H$$

and $|C_i|$ represents the number of samples that belong to cluster $C_i$. Alternatively, when it is known that the magnitudes of the source signals are more or less the same, a covariance matrix of $\Sigma = I$ (identity matrix) may be used.

This mask $M_k(f,m)$ is stored in temporary memory unit 90 (FIG. 1), and then limited signal extraction unit 452-$k$ (FIG. 13) reads in mask $M_k(f,m)$ and observed signal vector X(f,m) from temporary memory unit 90, calculates the product of mask $M_k(f,m)$ and observed signal vector X(f,m):

$$X_k\hat{}(f,m) = M_k(f,m) \cdot X(f,m)$$

and extracts the limited signal values $X_k\hat{}(f,m)$ emitted from V signal sources (Step S30).

These limited signal values $X_k\hat{}(f,m)$ are stored in temporary memory unit 90 (FIG. 1) and are then sent to limited signal separation unit 60-$k$, which uses these limited signal values $X_k\hat{}(f,m)$ to perform signal separation on the limited signals (Step S31). Here, the limited signal values $X_k\hat{}(f,m)$ are treated as approximations to the values of mixed signals consisting of the signals emitted from V ($1 \leq V \leq M$) signal sources. A separation matrix for these signals can therefore be estimated using the independent component analysis method described in [Conventional method 1]. Specifically, separation can be performed using Formula (2) mentioned in [Conventional method 1], for example, using limited signal values $X_k\hat{}(f,m)$ as the independent component analysis inputs instead of the observed signal values X. Note that when V=1, the processing of Step 31 is not necessary.

To perform the ICA separation in this embodiment, the limited signal values $X_k\hat{}(f,m)$ are first used to generate a separation matrix W(f,m) in ICA separation matrix estimation unit 61-$k$ according to the abovementioned learning rule of Formula (2), and this separation matrix W(f,m) is stored in temporary memory unit 90. This separation matrix W(f,m) is for example generated using feedback from the output values $Y_k(f,m)$ from permutation/scaling resolution unit 62-$k$, which is described below. The resulting separation matrix W(f,m) is sent to permutation/scaling resolution unit 62-$k$. Permutation/scaling resolution unit 62-$k$ uses this separation matrix W(f,m) and the limited signal values $X_k(f,m)$ to generate the respective separated signal values $Y_k(f,m) = [Y_{k1}^{\Pi k1}(f,m), \ldots, Y_{kV}^{\Pi kV}(f,m)]^T$ by performing the calculation $Y_k(f,m) = W(f,m)X_k\hat{}(f,m)$, and stores them in temporary memory unit 90. Permutation/scaling resolution unit 62-$k$ then, for example, feeds back these separated signal values $Y_k(f,m)$ to resolve the permutation problem with the method mentioned in [Conventional method 1]. After resolving the permutation problem, permutation/scaling resolution unit 62-$k$ then applies tags $\Pi_{kq}$ to the separated signal values $Y_{kq}$ (q=1, . . . , V) to show which source signal the separated signal values $Y_{kq}$ (q=1, . . . , V) correspond to, and these are stored together in temporary memory unit 90. Here, these tags $\Pi_{kq}$ are represented by adding the superscript $\Pi_{kq}$ to the separated signal values $Y_{kq}$.

For example permutation/scaling resolution unit 62-$k$ could compare the estimated arrival direction $\theta_q(f)$ of the signals, which are obtained using the inverse matrix of separation matrix W(f) extracted from temporary memory unit 90 (or the Moore-Penrose pseudo-inverse matrix when N≠M) by the following formula:

FORMULA 36 (36)

$$\theta_q(f) = \arccos \frac{\arg([W_{jq}^{-1}(f)]/[W_{j'q}^{-1}(f)])}{2\pi f v_e^{-1} \|d_j - d_{j'}\|}$$

(where $v_e$ the signal velocity and $d_j$ is the position of sensor j) with the representative vector $a_p(f)$ included in set $G_k$ indicating the variables $SG_k$ extracted from temporary memory unit 90, and could associate the representative vector $a_p(f)$ closest to $\theta_q$ with the q-th separated signal $Y_{kq}$ (Step S32). In other words, permutation/scaling resolution unit 62-$k$ applies tags $\Pi_{kq}$ representing the representative values $a_i$ to the separated signals $Y_{kq}$ (in other words associating the tags $\Pi_{kq}$ with the separated signals $Y_{kq}$).

After that, permutation/scaling resolution unit 62-$k$ extracts the separation matrix W(f) from temporary memory unit 90 and resolves the ICA scaling problem by updating each row $w_q(f)$ thereof as follows:

$$w_q(f) \leftarrow [W^{-1}(f)]_{jq} w_q(f)$$

and then stores the updated separation matrix W(f) in temporary memory unit 90. For the subsequent processing in signal combination unit 80, it is desirable that the same value of j is used for the entire series k in this process.

The separated signal values $Y_{kq}$ appended tags $\Pi_{kq}$ are sent to time domain transformation unit 70-$k$. Time domain transformation unit 70-$k$ uses, for example, a short time inverse discrete Fourier transform or the like to transform each of the separated signal values $Y_{kq}$ (which are obtained in the time-frequency domain) into time-domain signal values, and stores these transformed values in temporary memory unit 90 (Step S33). Note that these time-domain signal values $y_k(t)=[y_{k1}^{\Pi k1}(t), \ldots, y_{kV}^{\Pi kV}(t)]^T$ are also associated with the abovementioned tags $\Pi_{kq}$. When these associations are made, time domain transformation unit 70-$k$ first extracts the tags $\Pi_{kq}$ associated with the frequency-domain signal values $Y_{kq}$ from temporary memory unit 90 for each frequency and time interval. Next, time domain transformation unit 70-$k$ judges whether or not the tags $\Pi_{kq}$ at each frequency and time interval are all the same. If they are all the same, the time-domain signal values $y_{kq}$ are tagged by associating them with the tags $\Pi_{kq}$ applied to the frequency-domain signal values $Y_{kq}$. On the other hand, if they are not all the same then the tags of the time-domain signal values $y_{kq}$ are determined based on a majority decision.

Next, in mask control unit 40, the variables SG and $SG_k$ are extracted from temporary memory unit 90, and the union set $G \cup G_k$ of the sets G and $G_k$ represented by these variables is taken as a new set G; this set G is substituted into variable SG, and this variable SG is stored in temporary memory unit 90 (Step S34). Also, mask control unit 40 reads out variables SG and $SG_0$ from temporary memory unit 90, and judges whether or not this new set G is equal to set $G_0$ (Step S35). Here, unless $G=G_0$, the processing returns to Step S27.

On the other hand, if $G=G_0$, then in signal combination unit 80, the separated signals $y_{kp}(t)$ output from each system k (time domain transformation unit 70-$k$; k=1, . . . , u) are read out from temporary memory unit 90, and these are selected and combined to yield all N separated signals (Step S36). For example, signal combination unit 80 might first compare the tags $\Pi_{kq}$ of each separated signal $y_{kp}(t)$ read out from temporary memory unit 90. Here, when it is judged that there are no separated signal values $y_{kp}(t)$ that have the same tag in a plurality of systems k, signal combination unit 80 outputs all the separated signal values $y_{kq}(t)$ as the final separated signal values $y_i(t)$ (i=1, . . . , N) (Step S37). On the other hand, when it is judged that there are separated signal values having the same tag in a plurality of systems, signal combination unit 80 either appropriately selects one of these separated signal values with the same tag and outputs it as a final separated signal value $y_i(t)$, or calculates the mean of the separated signal values with the same tag and uses this mean value as the output signal (Step S37).

Here, in the process whereby one of the separated signal values $y_{kq}(t)$ is appropriately selected and output as the final separated signal value $y_i(t)$, signal combination unit 80 could, for example, determine which of the separated signal values $y_{kq}(t)$ having the same tag $a_i$ contains the greatest power, and output it as the final separated signal value $y_i(t)$. Also, in the process whereby the mean of the separated signal values having the same tag is output as the final separated signal value $y_i(t)$, signal combination unit 80 could, for example, use the following formula:

FORMULA 37

$$y_i(t) = \frac{1}{K} \sum_{\Pi_{kq}=a_i} y_{kq}^{\Pi_{kq}}(t)$$

(where K is the number of separated signals having the same tag $a_i$)

In this way, the N signals are separated with low distortion.

As a variant of this embodiment, the limited signal values could be generated directly from the formula:

Formula 38

$$\hat{X}_k(f,m) = \begin{cases} X(f,m) & \max_{a_p(f) \in G_k} D(X(f,m), a_p(f)) < \min_{a_q(f) \in G_k^c} D(X(f,m), a_q(f)) \\ 0 & \text{otherwise} \end{cases}$$

without generating a mask M(f,m).

Ninth Embodiment

This embodiment relates to the third present invention.

Configuration

Figure 15:
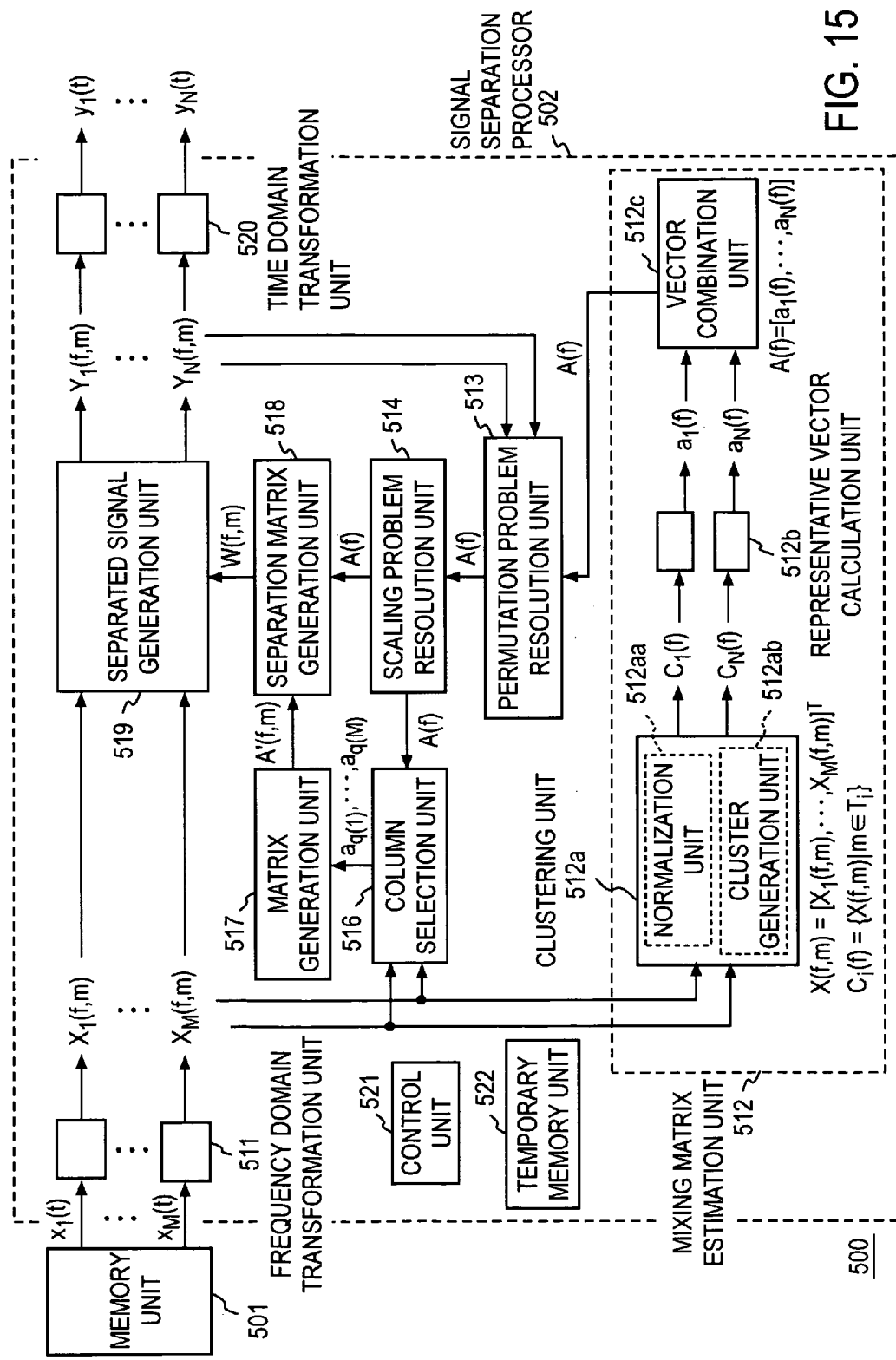
[FIG. 15] A block diagram showing an example of the configuration of a signal separation device according to a ninth embodiment.

FIG. 15 is a block diagram showing an example of the configuration of a signal separation device 500 according to this embodiment. The arrows in this figure indicate the flow of data, but the flow of data into and out from control unit 521 and temporary memory unit 522 is not shown. Specifically, even when data passes through control unit 521 or temporary memory unit 522, the associated process is not shown.

The configuration of this embodiment is described first with reference to this figure.

As shown in the example in FIG. 15, the signal separation device 500 of this embodiment includes a memory unit 501 and a signal separation processor 502 that is electrically connected thereto by a hard-wired or wireless connection.

Memory unit 501 might be, for example, a hard disk device, a magnetic recording device such as a flexible disk or magnetic tape device, an optical disk device such as a DVD-RAM (random access memory) or CD-R (recordable)/RW (rewritable) device, a magneto-optical recording device such as an MO (magneto-optical) disc device, or a semiconductor memory such as an EEPROM (electronically erasable programmable read-only memory) or flash memory. Memory unit 501 may be situated inside the same enclosure as signal separation processor 502, or it may be housed separately.

This signal separation processor 502 consists of hardware configured from elements such as a processor and RAM, for example, and it also incorporates a frequency domain transformation unit 511, a mixing matrix estimation unit 512, a permutation problem resolution unit 513, a scaling problem resolution unit 514, a column selection unit 516, a matrix generation unit 517, a separation matrix generation unit 518, a separated signal generation unit 519, a time domain transformation unit 520, a control unit 521, and a temporary memory unit 522. Also, the mixing matrix estimation unit 512 of this example incorporates a clustering unit 512$a$, a representative vector calculation unit 512$b$, and a vector combination unit 512c. Furthermore, clustering unit 512a incorporates a normalization unit 512aa and a cluster generation unit 512ab.

Processing

Figure 16:
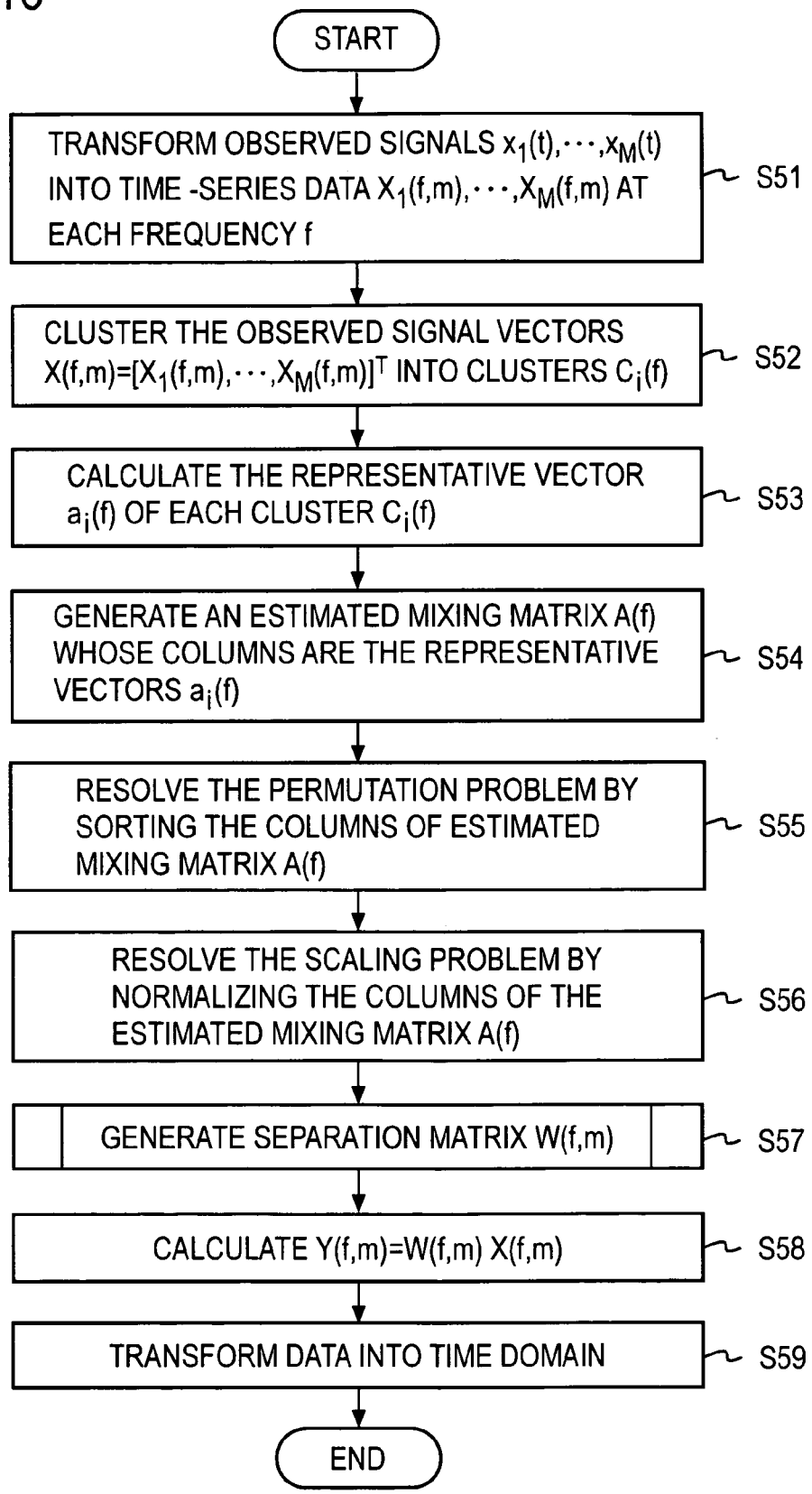
[FIG. 16] A flowchart illustrating the processing performed by a signal separation device according to the ninth embodiment.

FIG. 16 is a flowchart illustrating the overall processing that takes place in signal separation device 500 in this embodiment. In the following, the processing of signal separation device 500 is described with reference to FIG. 15 and FIG. 16. Note that the following description relates to situations where signals emitted from N (N≧2) signal sources are mixed together and observed with M sensors.

Overall Processing

Under the control of control unit 521, signal separation device 500 performs the following processing.

First, the observed signal values $x_1(t), \ldots, x_M(t)$ (where t is time) observed by the M sensors are read in from memory unit 501 and input to frequency domain transformation unit 511 (FIG. 15). Frequency domain transformation unit 511 uses a transformation such as a short time discrete Fourier transform to transform these observed signal values $x_1(t), \ldots, x_M(t)$ into frequency-domain observed signal values $X_1(f,m), \ldots, X_M(f,m)$ (where m is the discrete time interval) (Step S51). These frequency-domain signal values $X_1(f,m), \ldots, X_M(f,m)$ are stored in temporary memory unit 522, and are read in by clustering unit 512a of mixing matrix estimation unit 512. Clustering unit 512a clusters the resulting observed signal vectors $X(,fm)=[X_1(f,m), \ldots, X_M(f,m)]^T$ into N clusters $C_i(f)$ (i=1, . . . , N) for each frequency f (Step S52). Each cluster $C_i(f)$ is sent to representative vector calculation unit 512b, and representative vector calculation unit 512b calculates a representative vector $a_i(f)$ for each cluster $C_i(f)$ (Step S53). Each representative vector $a_i(f)$ is stored in temporary memory unit 522, and is then sequentially read out by vector combination unit 512c which generates an estimated mixing matrix $A(f)=[a_1(f), \ldots, a_N(f)]$ whose columns are the representative vectors $a_i(f)$ (Step S54). The resulting estimated mixing matrix A(f) is stored in temporary memory unit 522.

Permutation problem resolution unit 513 reads in the estimated mixing matrix A(f) from temporary memory unit 522, and resolves the permutation problem by sorting the columns of estimated mixing matrix A(f) (Step S55). In this process it is possible to employ feedback of the separated signal values $Y_1(f,m), \ldots, Y_N(f,m)$ as described below, in which case the permutation problem can be resolved more accurately.

Next, after the scaling problem has been resolved by normalizing the columns of the estimated mixing matrix A(f) in scaling problem resolution unit 514 (Step S56), this estimated mixing matrix A(f) is used by separation matrix generation unit 518 to generate a separation matrix W(f,m) (Step S57). The resulting separation matrix W(f,m) is stored in temporary memory unit 522, from where it is then sent to separated signal generation unit 519, which reads in the frequency-domain signal values $X_1(f,m), \ldots, X_M(f,m)$ from temporary memory unit 522, and calculates the separated signal vectors $Y(f,m)=[Y_1(f,m), \ldots, Y_N(f,m)]^T$ by performing the calculation Y(f,m)=W(f,m)X(f,m) (Step S58). The calculated separated signal values $Y_1(f,m), \ldots, Y_N(f,m)$ are stored in temporary memory unit 522 and fed back to permutation problem resolution unit 513, and are also sent to time domain transformation unit 520. Time domain transformation unit 520 then transforms the separated signal values $Y_1(f,m), \ldots, Y_N(f,m)$ into time-domain signals $y_1(t), \ldots, y_N(t)$ by performing a short time inverse Fourier transform or the like for each subscript i (Step S59), thereby yielding the time-domain separated signal values $y_i(t)$.

Detailed Description of the Processing in Mixing Matrix Estimation Unit 512

Next, the processing performed in mixing matrix estimation unit 512 is described in detail. Note that the following processing is applied to each frequency.

First, clustering unit 512a collects together the observed signal components $X_1(f,m), \ldots, X_M(f,m)$ of all the sensors read in from temporary memory unit 522, and associates them together as an observed signal vector $X(f,m)=[X_1(f,m), \ldots, X_M(f,m)]^T$. Clustering unit 512a then performs clustering to generate N clusters $C_i(f)$ equal in number to the number of signal sources, and stores them in temporary memory unit 522 (Step S52).

Here, a cluster is a set of observed signal vectors X(f,m), and is expressed using the set $T_i$ of discrete time intervals in the form $C_i(f)=\{X(f,m)|m \in T_i\}$. Also, the aim of clustering is to classify samples (observed signal vectors X(f,m)) in which the same signal source is predominant (having the main component) into the same cluster. The resulting N clusters $C_1(f), \ldots, C_N(f)$ do not necessarily need to be mutually prime ($C_i(f) \cap C_j(f)=\emptyset$, i≠j), and there may be some elements that do not belong to any cluster:

FORMULA 40

$$X(f,m) \notin \bigcup_{i=1}^{N} C_i$$

Next, representative vector calculation unit 512b reads in each cluster $C_i(f)$ from temporary memory unit 522, and calculates the mean of the samples X(f,m) belonging to each cluster $C_i(f)$:

FORMULA 41

$$a_i(m) = \sum_{X(f,m) \in C_i(f)} X(f,m)/|C_i(f)|$$

as a representative vector $a_i(f)$ for each signal source (Step S53). Alternatively, the samples X(f,m) belonging to each cluster $C_i(f)$ may be suitably quantized and the most frequent values chosen as the representative vectors $a_i(f)$.

Finally, the N representative vectors are collected together in vector combination unit 12c, which generates and outputs an estimated mixing matrix $A(f)=[a_1(f), \ldots, a_N(f)]$ which is an estimated matrix of the mixing matrix $H(f)=[h_1(f), \ldots, h_N(f)]$ (Step S54). The estimated mixing matrix A(f) is indeterminate with regard to the ordering of each vector (permutation indeterminacy) and indeterminate with regard to the magnitude of each vector (scaling indeterminacy). In other words, a representative vector $a_i(f)$ is estimated as a vector which is $h_{\Pi(i)}(f)$ multiplied by a complex number. Here, Π is a permutation representing the permutation indeterminacy.

Detailed Description of the Processing in Clustering Unit 512a

Next, the processing performed in clustering unit 512a is described in more detail.

The clustering unit 512a in this example performs clustering after each sample has been normalized in normalization unit 512aa so that clustering can be suitably achieved—i.e., so that samples (observed signal vectors X(f,m)) in which the same signal source is dominant are classified into the same clusters.

Specifically, the normalization unit 512aa of this example performs the following calculation:

FORMULA 42

$$\text{sign}(X_j(f, m)) = \begin{cases} X_j(f, m)/|X_j(f, m)| & (|X_j(f, m)| \neq 0) \\ 0 & (|X_j(f, m)| = 0) \end{cases} \quad (35)$$

and normalizes it as follows:

$$X(f, m) \leftarrow \begin{cases} X(f, m)/\text{sign}(X_j(f, m)) & (|X_j(f, m)| \neq 0) \\ X(f, m) & (|X_j(f, m)| = 0) \end{cases} \quad (36)$$

before performing clustering.

If it is also necessary, the normalization unit 512aa of this example may perform clustering after performing additional normalization as follows:

FORMULA 43

$$X(f, m) \leftarrow \begin{cases} X(f, m)/\|(X(f, m)\| & (\|X(f, m)\| \neq 0) \\ X(f, m) & (\|X(f, m)\| = 0) \end{cases} \quad (37)$$

Here, the vector length $\|X(f,m)\|$ is the norm of $X(f,m)$, which can, for example, be obtained from the $L_2$ norm $\|X(f,m)\|=L_2(X(f,m))$ defined as follows:

FORMULA 44

$$L_k(X(f, m)) = \left(\sum_{j=1}^{M} |X_j|^k (f, m)\right)^{1/k} \quad (38)$$

Also, as the clustering method, it is possible to use a method described in many textbooks, such as hierarchical clustering or k means clustering (see, e.g., Richard O. Duda, "Pattern Classification ($2^{nd}$ ed.)," John Wiley & Sons, Inc., ISBN 0-471-05669-3, chapter 10). Note that in any clustering method, the distance between two samples $X(f,m)$ and $X'(f,m)$ is defined as a means of measuring the proximity between samples, and clustering is performed so that every effort is made to include samples that are close to each other in the same clusters.

For example, when the samples are normalized only by Formula (36) above, clustering unit 512a performs clustering using the cosine distance between two normalized observed signal vectors $X(f,m)$ as a measure of the distance between them. The cosine distance between two samples $X(f,m)$ and $X'(f,m)$ is defined as follows:

$$1 - X^H(f,m) \cdot X'(f,m)/(\|X(f,m)\| \cdot \|X'(f,m)\|) \quad (39)$$

When the samples have been normalized according to the abovementioned Formula (36) and Formula (37), clustering unit 512a performs clustering in cluster generation unit 512ab using the $L_2$ norm $\|X(f,m)-X'(f,m)\|=L_2(X(f,m)-X'(f,m))$ of the difference between two normalized observed signal vectors $X(f,m)-X'(f,m)$, or an $L_k$ norm with any value of k, or the cosine distance (Formula (39)) as a measure of the distance between them.

The reason why the above operations result in the representative vector $a_i(f)$ of each cluster $C_i$ becoming an estimate of the mixing vector $h_k(f)$ (including magnitude indeterminacy) is explained below.

A cluster $C_i$ contains a collection of observed signal vectors $X(f,m)$ in which only a certain source signal $S_k$ is predominant and the other source signals are close to zero. This state can be approximated as follows:

$$X(f,m) = h_k(f) S_k(f,m) \quad (40)$$

Normalizing this function by Formula (36) yields the following:

$$X \leftarrow X/\text{sign}(X_j) = h_k S_k/\text{sign}(H_{jk} S_k) = \text{sign}^*(H_{jk})|S_k|h_k \quad (41)$$

This involves using the relationships $\text{sign}(H_{jk}S_k)=\text{sign}(H_{jk})\text{sign}(S_k)$, $1/\text{sign}(H_{jk})=\text{sign}(H_{jk})$ (where * is a complex conjugate operator), and $S_k/\text{sign}(S_k)=|S_k|$. Also, the parameters f and m have been omitted from these formulae.

Normalizing by Formula (37) and applying Formula (40) yields the following:

$$X \leftarrow X/\|X\| = \text{sign}^*(H_{jk})|S_k|h_k/(|S_k| \cdot \|h_k\|) = \text{sign}^*(H_{jk})h_k/\|h_k\| \quad (42)$$

Here, the relationship $\|\text{sign}^*(H_{jk})|S_k|h_k\|=|S_k|\cdot\|h_k\|$ is used. The paramet and m have also been omitted from these formulae.

From Formula (41), it can be seen that the observed signal vectors $X(f,m)$ normalized by Formula (36) will collect together on a straight line corresponding to the mixing vector $h_k(f)$ multiplied by $\text{sign}^*(H_{jk}(f))$. The position of each vector on this straight line depends on the magnitude $|S_k(f,m)|$ of the signal source. Also, from Formula (42), it can be seen that the observed signal vectors $X(f,m)$ normalized by formula (37) will collect together at a single point $\text{sign}^*(H_{jk}(f))h_k(f)/\|h_k(f)\|$ in complex space. This shows that the representative vectors $a_i(f)$ calculated as the mean of the normalized observed signal vectors $X(f,m)$ constitutes an estimate of the mixing vector $h_k(f)$ including the magnitude indeterminacy.

Detailed Description of the Processing in Permutation Problem Resolution Unit 513

Next, the processing performed in permutation problem resolution unit 513 is described in detail.

In permutation problem resolution unit 513, the columns of the estimated mixing matrix $A(f)$ calculated at each frequency f are sorted so that the representative vectors $a_i(f)$ relating to the same signal source $s_k(t)$ are the same at all frequencies f (Step S55). Specifically, the subscripts i are reassigned so that the correspondence between each separated signal $Y_1(f,m), \ldots, Y_N(f,m)$ and each signal source becomes the same at all frequencies f. For this purpose it is possible to use, for example, two types of information based on the procedure of Non-Patent Reference 2, as in the prior art.

The first type of information is positional information such as the signal source arrival directions or the like. In methods that use conventional ICA, the separation matrix W is obtained by ICA, and positional information has been obtained from the Moore-Penrose pseudo-inverse matrix $W^+$ (which corresponds to the inverse matrix $W^{-1}$ when M=N) of this matrix. Here, the Moore-Penrose pseudo-inverse matrix $W^+$ is regarded as an estimate of the mixing matrix $A(f)$. Consequently, in this embodiment, unlike conventional methods where ICA is used, the estimated mixing matrix $A(f)$ is itself regarded as a Moore-Penrose pseudo-inverse matrix $W^+$, and the positional information can be obtained directly from each column of this matrix. Specifically, the positional information can be obtained from the following formula, for example:

FORMULA 45

$$\theta_i = \cos^{-1} \frac{\text{angle}(A_{ji}(f)/A_{j'i}(f))}{2\pi f v_e^{-1} \|d_j - d_{j'}\|} \quad (45)$$

Here, $\theta_i$ is the angle between the straight line connecting sensor j and sensor j' and the straight line from the mid point between sensor j and sensor j' to the location of signal source i. Also, $d_j$ is a vector representing the position of sensor j. To resolve the permutation problem, the columns of the estimated mixing matrix A(f) are sorted so that the correspondence between each subscript i and each value of $\theta_i$ becomes the same at each frequency, for example.

The second type of information is the correlation between frequencies of the absolute values $|Y_i(f,m)|$ of the separated signal components, as used in conventional ICA methods. Specifically, the permutation problem is resolved by, for example, sorting the columns of estimated mixing matrix A(f) so as to maximize the correlation between the absolute values of the separated signal components for the same subscript i at different frequencies f1 and f2:

FORMULA 46

$$\text{cor}(v_i^{f1}, v_i^{f2}) = \frac{\langle v_i^{f1}(m) \cdot v_i^{f2}(m) \rangle_m}{\sqrt{\langle v_i^{f1}(m) \rangle_m} \cdot \sqrt{\langle v_i^{f2}(m) \rangle_m}} \quad (44)$$

(Here, $v_i^f(m) = |Y_i(f,m) - \langle|Y_i(f,m)|\rangle_m|$, and the notation $\langle \bullet \rangle_m$ represents the mean of "•" with respect to time m.)

The separated signals used in this process are obtained by feeding back the outputs $Y_1(f,m), \ldots, Y_N(f,m)$ of separated signal generation unit 519.

Detailed Description of the Processing in Scaling Problem Resolution Unit 514

Next, the processing performed in scaling problem resolution unit 514 is described in detail.

Scaling problem resolution unit 514 receives the estimated mixing matrix A(f) from permutation problem resolution unit 513, and in order to resolve the indeterminacy in the magnitude of each column, it first normalizes each column (representative vector) $a_i(f)$ of the estimated mixing matrix A(f) as follows (Step S56):

$$a_i(f) \leftarrow a_i(f)/a_{ji}(f)$$

where $a_{ji}$ is the element in the j-th row of representative vector $a_i(f)$. Alternatively, a different j could be chosen for each representative vector $a_i(f)$, but it is important to use the same value of j for the same value of i at each frequency f.

Detailed Description of the Separated Signal Generation Process

Next, the separated signal generation process is described in detail.

In this embodiment, the procedure used to generate the separated signals differs depending on whether or not there is a sufficient number of sensors with respect to the number of signal sources.

First, when there is a sufficient number of sensors (M≧N), the separated signals can be generated easily. Specifically, separation matrix generation unit 518 receives the estimated mixing matrix A(f) from scaling problem resolution unit 514, and calculates the Moore-Penrose pseudo-inverse matrix $A(f)^+$ (equivalent to the inverse matrix $A(f)^{-1}$ when M=N) as the separation matrix W(f) (Step S57). The resulting separation matrix W(f) is stored in temporary memory unit 522. Separated signal generation unit 519 reads this separation matrix W(f) and the observed signal vectors X(f,m) from temporary memory unit 522, and uses them to generate the separated signal components $Y_1(f,m), \ldots, Y_N(f,m)$ by performing the calculation Y(f,m)=W(f)X(f,m) (Step S58).

On the other hand, when the number of sensors is insufficient (M<M), the separated signals Y(f,m) cannot be uniquely determined with respect to the estimated mixing matrix A(f) and observed signal vectors X(f,m). This is because there infinitely many values of Y(f,m) that satisfy the following relationship:

FORMULA 47

$$X(f,m) = A(f)Y(f,m) = \sum_{i=1}^{N} a_i(f) Y_i(f,m) \quad (47)$$

However, with regard to the sparsity of the source signal, it is known that the most accurate separated signal components are found at solutions of Y(f,m) that minimize the $L_1$ norm:

FORMULA 48

$$L_1(Y(f,m)) = \sum_{i=1}^{N} |Y_i(f,m)| \quad (48)$$

(Shun-ichi Amari: "How Can Humans and Machines Distinguish Visual and Auditory Signals? (Introduction)", Journal of IEICE, Vol. 87, No. 3, p. 167, March 2004). When separation is performed using this sort of minimizing criterion, the separation matrix W(f,m) varies with time so that separation matrix generation unit 518 calculates a time-dependent separation matrix W(f,m) from the observed signal vector X(f,m) and estimated mixing matrix A(f) at each time interval m (Step S57), and separated signal generation unit 519 calculates the separated signal components $Y_1(f,m), \ldots, Y_N(f,m)$ from the formula Y(f,m)=W(f,m)X(f,m) (Step S58).

However, since the strict minimization of $L_1(Y(f,m))$ involves a large computational load, the separation matrix W(f,m) is generated using an approximate solution in this embodiment. This solution involves sequentially selecting the columns (representative vectors) $a_i(f)$ of estimated mixing matrix A(f) that are oriented closest to the observed signal vectors X(f,m) (or to the residual vector e at a certain point in time), and repeating the process until M selections have been made.

Figure 17:
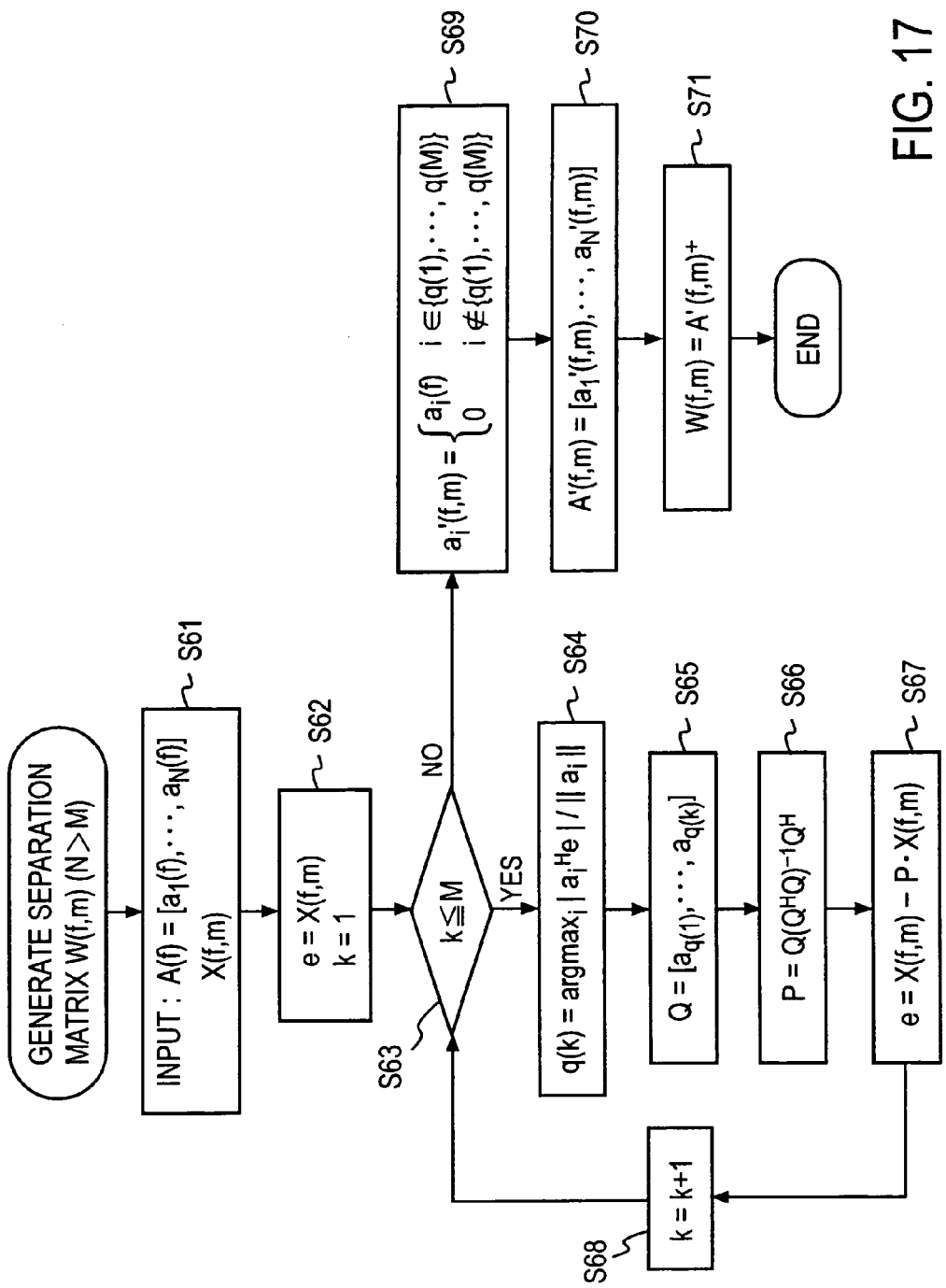
[FIG. 17] A flowchart illustrating the separation matrix generation process performed when there is an insufficient number of sensors (M<N).

FIG. 17 shows a flowchart illustrating the approximate solution method of this embodiment. The process whereby the separation matrix W(f,m) is calculated using the approximate solution method of this flowchart is described below.

First, column selection unit 516 reads in estimated mixing matrix A(f) and observed signal vector X(f,m) from temporary memory unit 522 (Step S61), initializes residual vector e with the observed signal vector X(f,m), assigns a value of 1 to variable k (Step S62), and stores this information in temporary memory unit 522.

Next, column selection unit 516 checks the value of variable k in temporary memory unit 522, and judges whether or not k≦M (Step S63). If k≦M, column selection unit 516 selects q(k) such that $$q(k) = \text{argmax}_i |a_i(f)^H \cdot e| / \|a_i(f)\| \quad (47)$$

and stores the result of this selection in temporary memory unit 522 (Step S64). Here, Formula (47) maximizes the absolute value of the dot product of the residual vector e and the length-normalized column $|a_i(f)^H|/\|a_i(f)\|$—in other words, it represents an operation for selecting the representative vector $a_i(f)$ closest to the direction of the residual vector e. The reason for selecting the representative vector $a_i(f)$ closest to the direction of the residual vector e is that the residual vector e becomes smaller in the next iteration, and thus each subsequent value of $Y_i(f,m)$ becomes smaller so that ultimately it can be expected that the $L_1$ norm of Y(f,m) defined by Formula (46) also becomes smaller.

Next, column selection unit 516 checks the value of variable k in temporary memory unit 522, and judges whether or not k≦M (Step S63). If k≦M column selection unit 516 selects q(k) such that $$q(k) = \text{argmax}_i |a_i(f)^H \cdot e| / \|a_i(f)\| \quad (47)$$

and stores the result of this selection in temporary memory unit 522 (Step S64). Here, Formula (47) maximizes the absolute value of the dot product of the residual vector e and the length-normalized column $a_i(f)^H/\|a_i(f)\|$—in other words, it represents an operation for selecting the representative vector $a_i(f)$ closest to the direction of the residual vector e. The reason for selecting the representative vector $a_i(f)$ closest to the direction of the residual vector e is that the residual vector e becomes smaller in the next iteration, and thus each subsequent value of $Y_i(f,m)$ becomes smaller so that ultimately it can be expected that the $L_1$ norm of Y(f,m) defined by Formula (46) also becomes smaller.

Here, P·X(f,m) is the projection of observed signal vector X(f,m) in subspace Q—specifically, it is represented by a linear combination of the representative vectors $a_{q(1)}(f), \ldots, a_{q(k)}(f)$ that have so far been selected from the observed signal vectors X(f,m). The remainder e=X(f,m)−P·X(f,m) is represented by the other vectors—specifically, it is represented by the column (representative vector) $a_{q(i)}$ selected in the subsequent loop process.

After that, in order to select the next column in turn, column selection unit 516 produces a new value of k by adding 1 to the variable k in temporary memory unit 522, and returns to step S63 (Step S68). Since the residual vector e only includes components that are orthogonal to the representative vectors $a_{q(i)}$ that have already been selected, there is no possibility of representative vectors that have already been selected being selected again on the basis of maximizing the absolute value of the dot product $|a_i(f)^H \cdot e|/\|a_i(f)\|$ (Step S64).

Then, at Step S63, when column selection unit 516 judges that k≦M (equivalent to the selection of min(M,N) representative vectors $a_i(f)$), column selection unit 516 ends the loop process of Steps S64-68. At this point, the M selected representative vectors $a_{q(i)}$ span the full space, so the residual vector e becomes zero. When the loop process of Steps S64-68 ends, matrix generation unit 517 reads these M selected representative vectors $a_{q(i)}$ from temporary memory unit 522, and generates column vectors $a_i'(f,m)$ in which the N−M representative vectors (column vectors) $a_i(f)$ that were not selected in the processing of steps S63-68 are set to zero (Step S69):

FORMULA 49

$$a_i'(f, m) = \begin{cases} a_i(f) & i \in \{q(1), \ldots, q(M)\} \\ 0 & i \notin \{q(1), \ldots, q(M)\} \end{cases} \quad (49)$$

Furthermore, matrix generation unit 517 calculates a matrix A'(f,m)=[$a_1'$(f,m), . . . , $a_N'$(f,m)] whose columns are the column vectors $a_i'$(f,m) of Formula (48) and stores it in temporary memory unit 522 (Step S70). The matrix A'(f,m) calculated in this way is an N×M matrix of which N−M rows are zero vectors.

Separation matrix generation unit 518 reads this matrix A'(f,m) from temporary memory unit 522, and generates its Moore-Penrose pseudo-inverse matrix A'(f,m)$^+$ as separation matrix W(f,m) (Step S71).

The resulting separation matrix W(f,m) is stored in temporary memory unit 522. Separated signal generation unit 519 reads in this separation matrix W(f,m) and the observed signal vectors X(f,m) from temporary memory unit 522, and uses the formula Y(f,m)=W(f,m)X(f,m) to generate the separated signal components $Y_1$(f,m), . . . , $Y_N$(f,m), which it stores in temporary memory unit 52 (Step S58). Note that N−M elements of the separated signal components $Y_1$(f,m), . . . , $Y_N$(f,m) generated in this way will inevitably be zero. That is, by performing the processing of Steps S61-S71 for a certain discrete time interval m, it is only possible to ascertain a maximum of M separated signal components. Consequently, in this embodiment the abovementioned processes of selecting M representative vectors $a_i(f)$, generating matrix A'(f,m), calculating the separation matrix W(f,m), calculating the separated signal vectors Y(f,m), and transforming them into time-domain signal values $y_1(t), \ldots, y_N(t)$ are performed separately in each discrete time interval m. In this way, it is possible to ascertain all the separated signal components.

Advantages of this Embodiment Blind Source Separation with N>M

As described above, with this embodiment it is possible to achieve blind source separation even when there is a small number of sensors (N>M) as long as the source signals exhibit some degree of sparsity. As a result, it allows the number of sensors to be reduced and can contribute to reducing the device costs.

Effects of Normalization

The graphs in FIG. 18-FIG. 23 show some examples of the effects of performing normalization in normalization unit 512aa. These show the observed signal vectors X(f,m) obtained at 2773 Hz when observing 1 or 2 speech sources with 2 microphones in a room with a reverberation time of 130 ms. Although these signals were observed with two microphones, they are plotted in four-dimensional space because the observed signal vectors X(f,m) are complex vectors in the frequency domain. Consequently, in FIG. 4-FIG. 9, these four dimensions are shown projected into a two-dimensional space. In these figures, "image" indicates the imaginary terms of each observed signal, and "Real" indicates the real terms. Also, $X_1$ indicates data relating to the observed signal observed by the first microphone, and $X_2$ indicates data relating to the observed signal observed by the second microphone.

Figure 18:
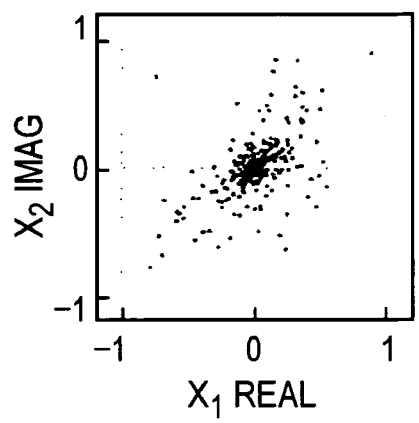
[FIG. 18] A plot of the observed signal vectors $X(f,m)$ from a single audio source before normalization.
Figure 18:
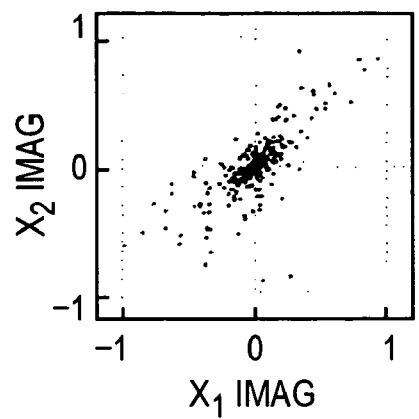
Figure 18:
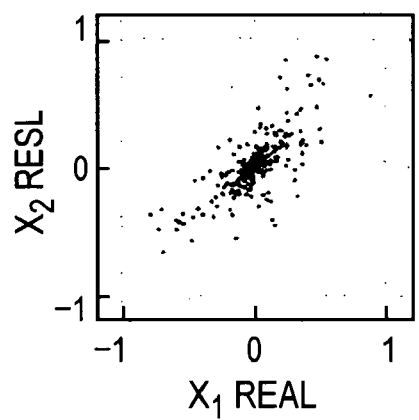
Figure 18:
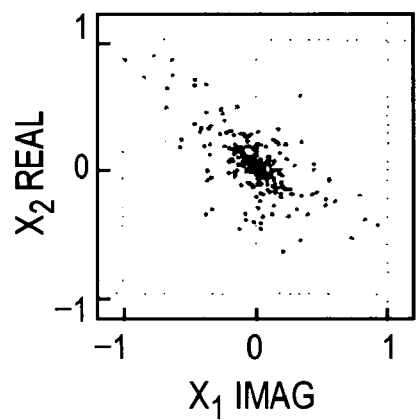
Figure 19:
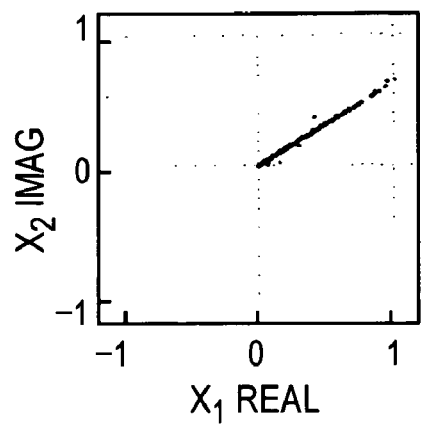
[FIG. 19] A plot of the observed signal vectors $X(f,m)$ from a single audio source normalized by Formula (36).
Figure 19:
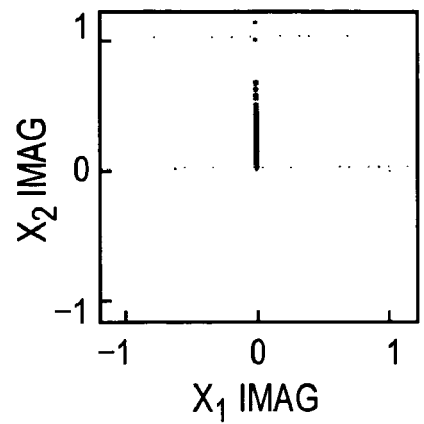
Figure 19:
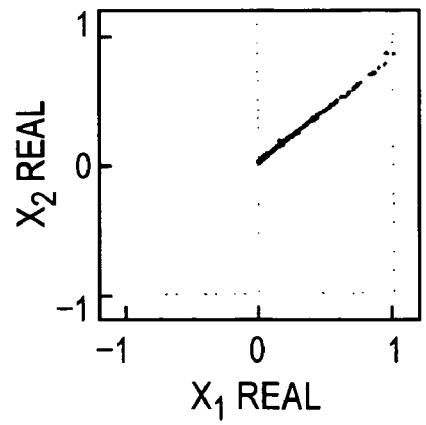
Figure 19:
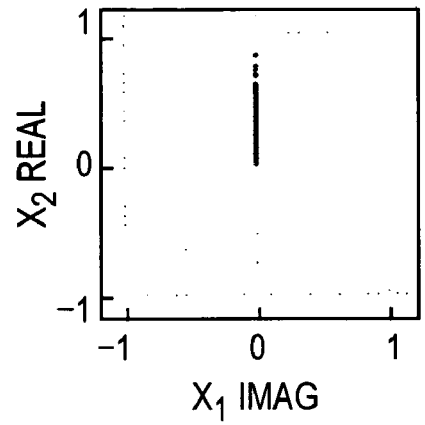
Figure 20:
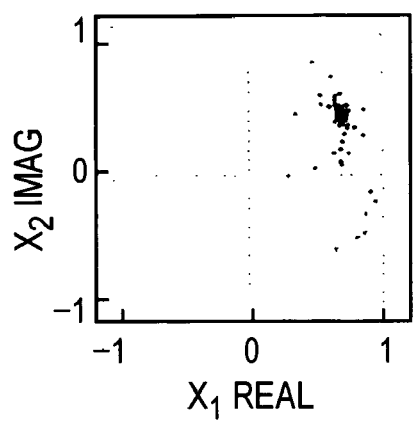
[FIG. 20] A plot of the observed signal vectors $X(f,m)$ from a single audio source normalized by Formula (37).
Figure 20:
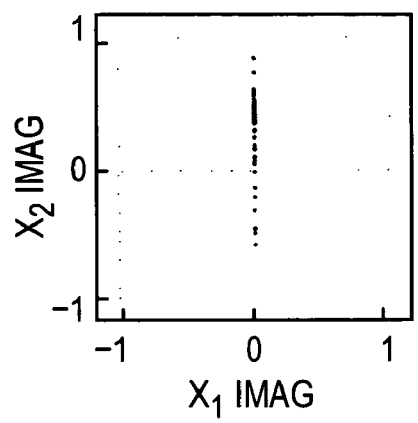
Figure 20:
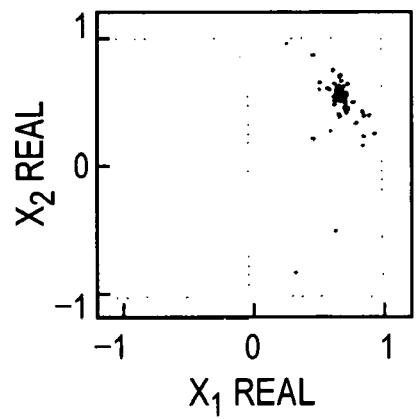
Figure 20:
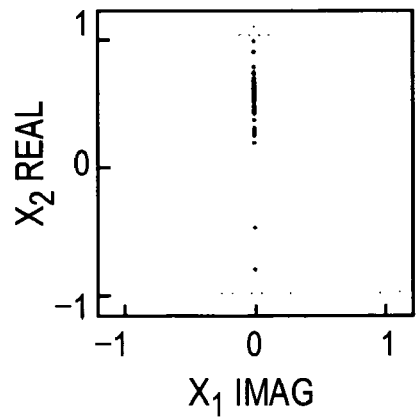

First, FIG. 18-FIG. 20 show the effects of normalization in the case of a single audio source.

FIG. 18 shows a plot of the observed signal vectors X(f,m) before normalization. In this example, the vectors form a cluster around the origin, and it is not possible to obtain useful information from this cluster about representative vector $a_1(f)$ relating to source signal 1. On the other hand, FIG. 19 shows a plot of the observed signal vectors $X(f,m)$ after normalization by Formula (36). In this example, the samples are distributed in a specific direction from the origin. This direction corresponds to the representative vector $a_1(f)$ to be estimated. This provides useful information for determining the representative vector $a_i(f)$. Also, FIG. 20 shows a plot of the observed signal vectors $X(f,m)$ after normalization by Formula (37). In this example, the vectors form a cluster at a location that is separate from the origin. The vector joining the center of this cluster to the origin corresponds to the representative vector $a_1(f)$ to be estimated.

Figure 21:
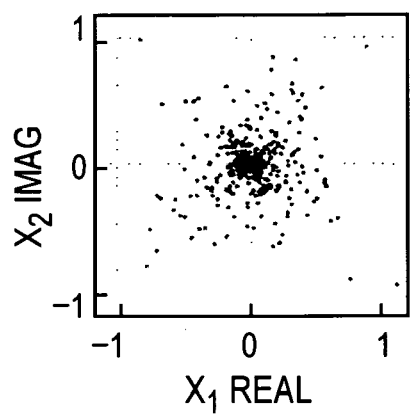
[FIG. 21] A plot of the observed signal vectors $X(f,m)$ from two audio sources before normalization.
Figure 21:
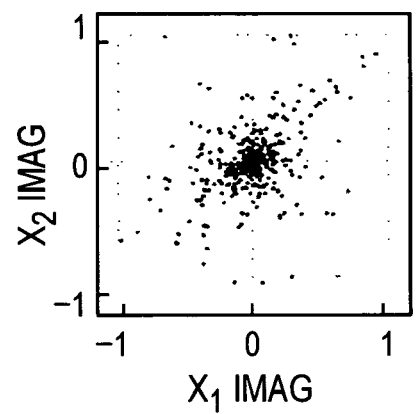
Figure 21:
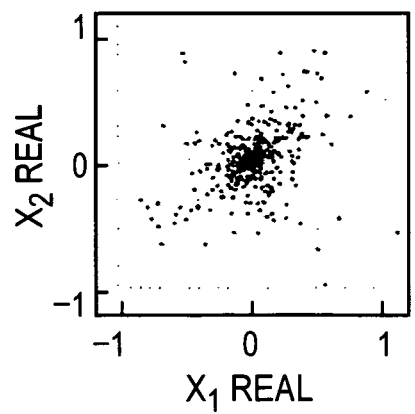
Figure 21:
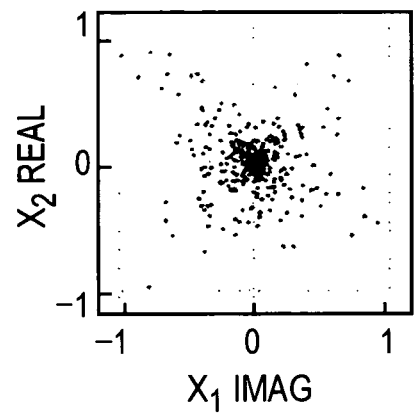
Figure 22:
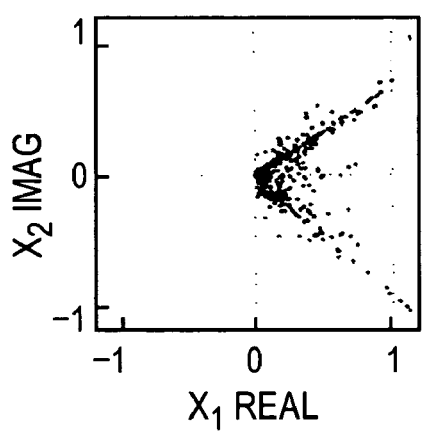
[FIG. 22] A plot of the observed signal vectors $X(f,m)$ from two audio sources normalized by Formula (36).
Figure 22:
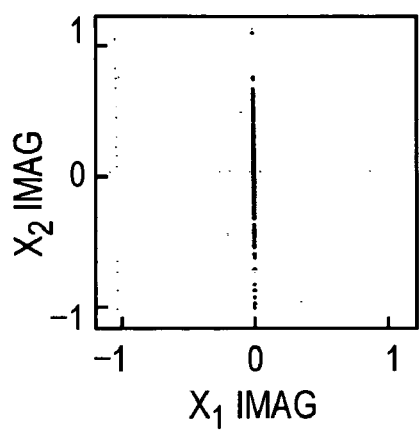
Figure 22:
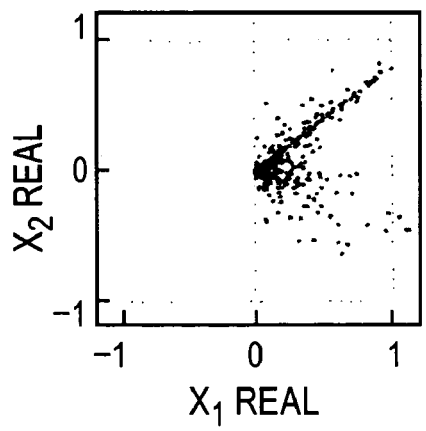
Figure 22:
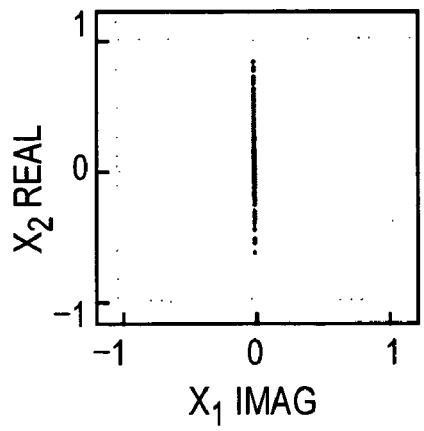
Figure 23:
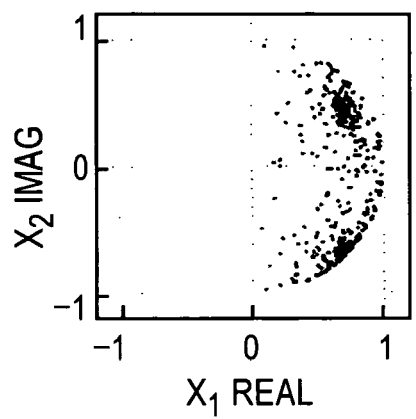
[FIG. 23] A plot of the observed signal vectors $X(f,m)$ from two audio sources normalized by Formula (37).
Figure 23:
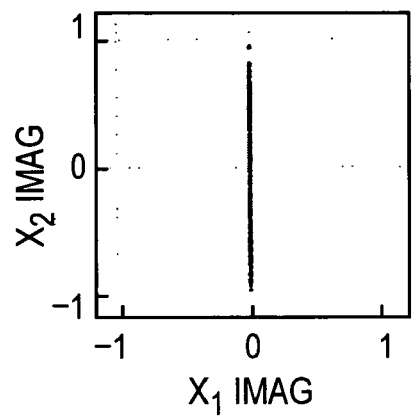
Figure 23:
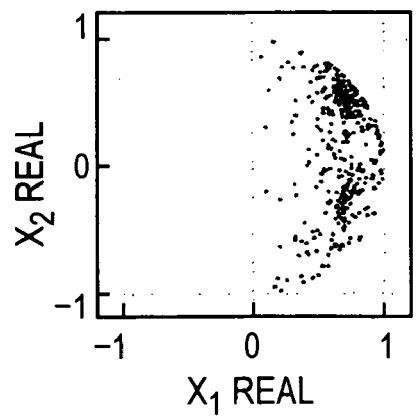
Figure 23:
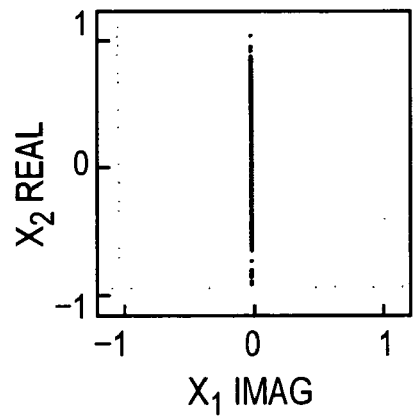

Next, FIG. 21-FIG. 23 show the effects of normalization in the case of two audio sources.

FIG. 21 shows a plot of the observed signal vectors $X(f,m)$ before normalization. As in the case of a single audio source, it is not possible to obtain useful information about the two audio sources in this case. FIG. 22 shows a plot of the observed signal vectors $X(f,m)$ after normalization by Formula (36). In this example, the samples are distributed in two directions from the origin. These directions correspond to the representative vectors $a_1(f)$ and $a_2(f)$ to be estimated. FIG. 23 shows a plot of the observed signal vectors $X(f,m)$ after normalization by Formula (37). In this example, the vectors form two clusters at locations that are separate from the origin. The vectors joining the centers of these clusters to the origin correspond to the representative vectors $a_1(f)$ and $a_2(f)$ to be estimated.

Effects of Generating a Separation Matrix Using an Approximate Solution

As mentioned above, when minimization is strictly performed in the generation of a separation matrix $W(f,m)$ in cases where N>M, the computational load becomes very heavy. For example, since there are NCM ways of making M selections from N representative vectors $a_1(f), \ldots, a_N(f)$, it would take a computational cost proportional to $_NC_M$ in order to strictly find the combination that minimizes the $L_1$ norm (Formula (46)). However, with the approximate solution shown in FIG. 17, it is possible to make do with a lower computational load because the number of loop iterations only needs to correspond to the number of sensors M.

In this embodiment, it is assumed that different procedures are used to generate the separation matrix $W(f,m)$ depending on whether or not there is a sufficient number of sensors with respect to the number of signal sources (i.e., whether or not N≦M). However, it is also possible to use the same routine to generate the separation matrix $W(f,m)$ regardless of whether or not there is a sufficient number of sensors with respect to the number of signal sources.

Figure 24:
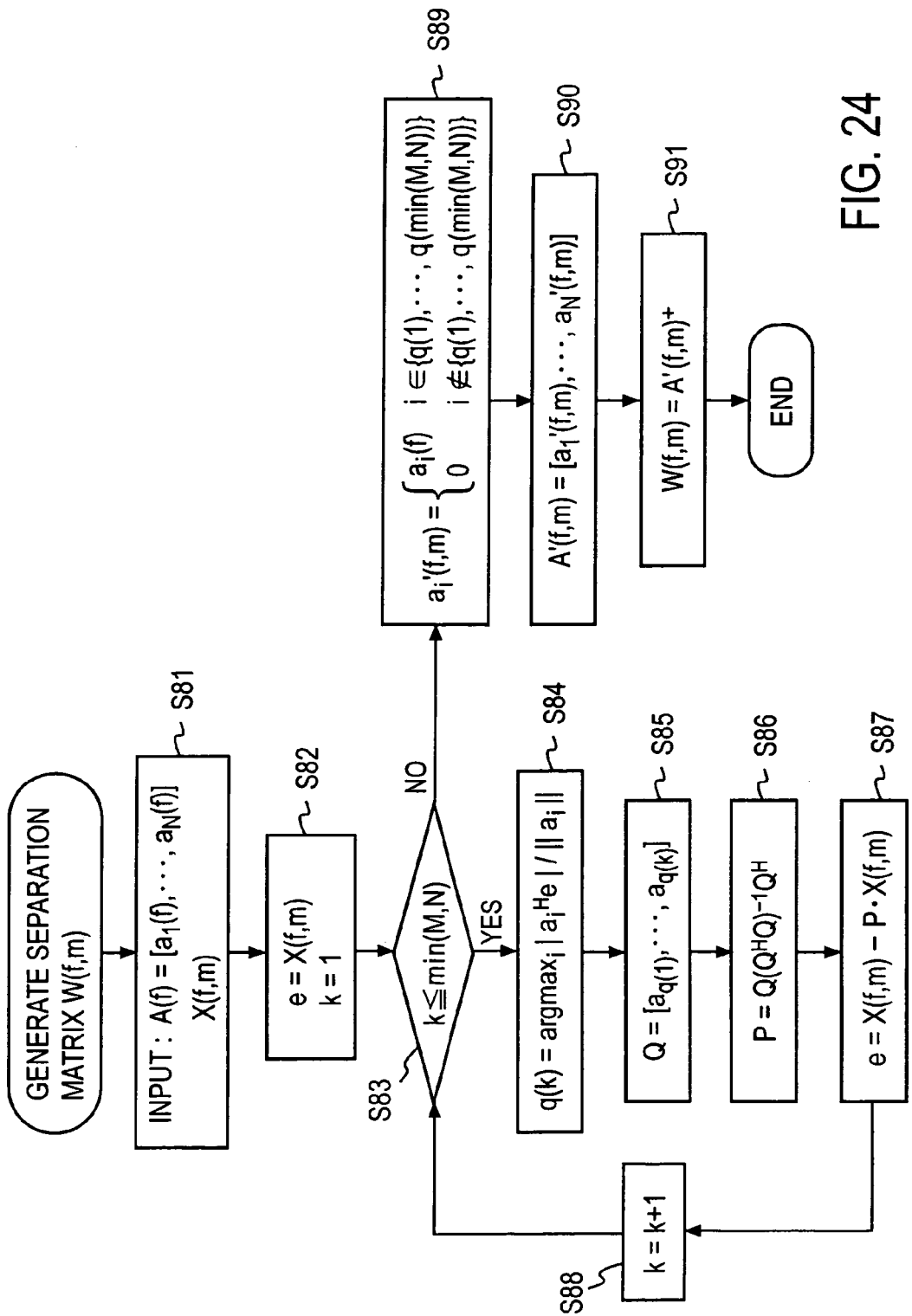
[FIG. 24] A flowchart illustrating a separation matrix generation process that can be applied regardless of whether or not there is a sufficient number of sensors with respect to the number of signal sources.

FIG. 24 shows a flowchart illustrating this example.

In this variant, regardless of whether or not N≦M, column selection unit 516 first reads in estimated mixing matrix A(f) and observed signal vector $X(f,m)$ from temporary memory unit 522 (Step S81), initializes residual vector e with the observed signal vector $X(f,m)$, and assigns a value of 1 to variable k (Step S82). Column selection unit 516 then judges whether or not k≦min(M,N) (Step S83), and if so it selects the column $a_{q(u)}(f)$ that maximizes the expression $|a_{q(u)}(f)^H \cdot e/\|a_{q(u)}(f)\||$ (where $\alpha^H$ is the conjugate transposition matrix of $\alpha$) (Step S84), sets up a matrix $Q=[a_{q(1)}(f), \ldots, a_{q(k)}(f)]$ representing the subspace spanned by all the selected columns $a_{q(u)}(u=1, \ldots, k)$ (Step S85), calculates $p=Q(Q^H Q)^{-1}Q^H$ (Step S86), updates the residual vector e according to the result of calculating $X(f,m)-P \cdot X(f,m)$ (Step S87), updates the value of variable k by adding 1 to it (Step S88), and returns to Step S83. In other words, the processing of Steps S83-88 is repeated min(M,N) times. Here, min(M,N) denotes the smaller of the two values M and N, and max(N−M,0) denotes the value of N−M or zero, whichever is the larger.

Next, matrix generation unit 517 reads in these min(M,N) representative vectors $a_{q(i)}$ from temporary memory unit 522, generates the column vectors $a_i'(f,m)$ as follows (Step S89):

FORMULA 50

$$a_i'(f, m) = \begin{cases} a(f) & i \in \{q(1), \ldots, q(\min(M, N))\} \\ 0 & i \notin \{q(1), \ldots, q(\min(M, N))\} \end{cases} \quad (50)$$

and generates the matrix $A'(f,m)=[a_1'(f,m), \ldots, a_N'(f,m)]$ whose columns consist of min(M,N) representative vectors $a_i(f)$ and max(N−M,0) zero vectors (Step S90). After the resulting matrix $A'(f,m)$ has been stored in temporary memory unit 522, it is read in by separation matrix generation unit 518, which calculates separation matrix $W(f,m)$ as the Moore-Penrose pseudo-inverse matrix $A(f,m)^+$ thereof (equivalent to the inverse matrix $A'(f,m)^{-1}$ when M=N) (Step S91). This is equivalent to an N-row×M-column separation matrix $W(f,m)$ which is the Moore-Penrose pseudo-inverse matrix of an M-row×N-column matrix where 0 or more of the N representative vectors $a_i(f)$ have been substituted with zero vectors.

Variants, Etc.

The present invention is not limited to the embodiments mentioned above. For example, in the first through eighth embodiments, the extracted signals are combined after they have been returned to the time domain, but it is also possible to transform the signals into the time domain after they have been combined in the frequency domain.

Figure 25:
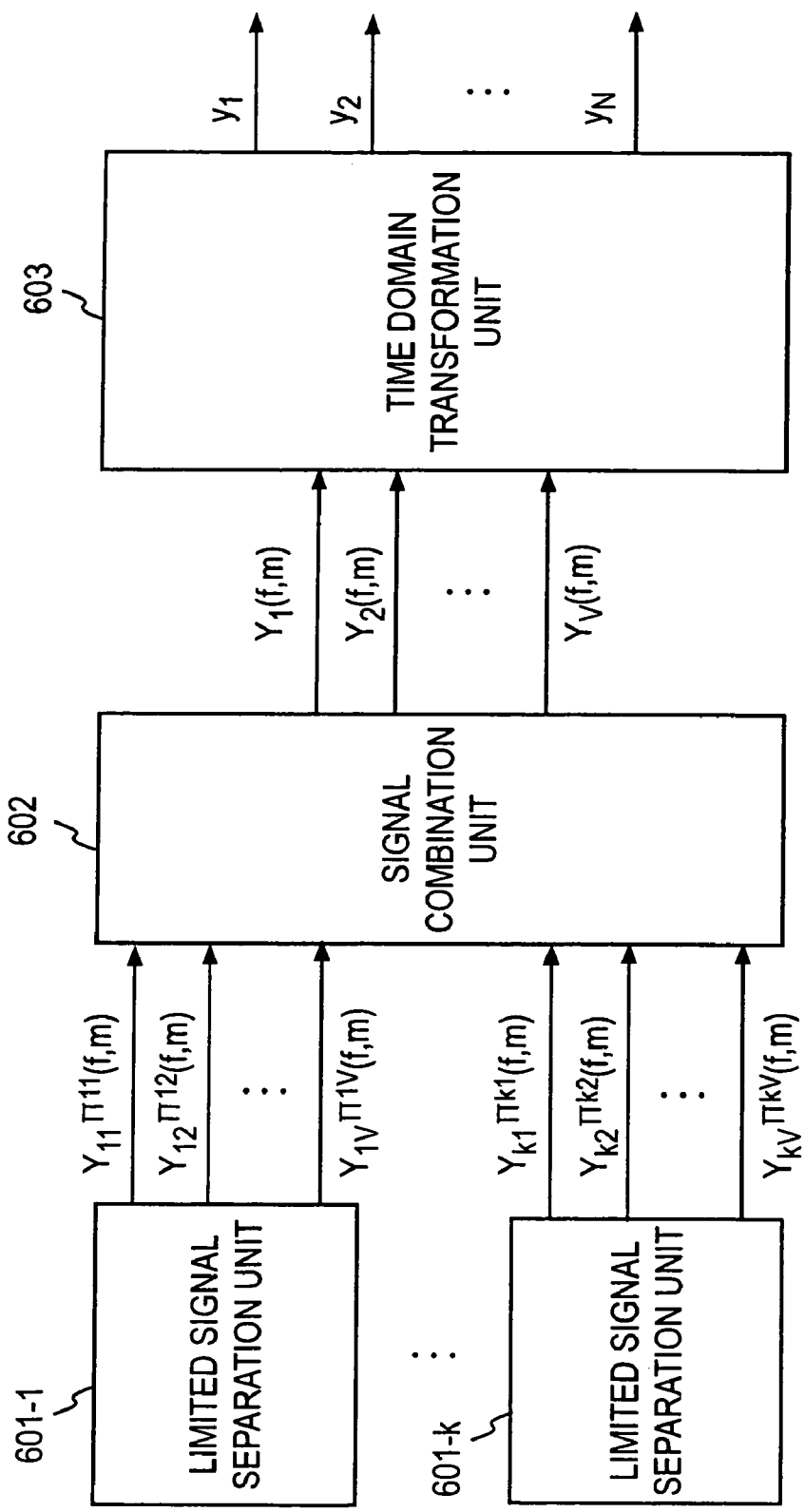
[FIG. 25] A partial block diagram showing an example of the configuration employed for transformation into the time domain after performing signal combination in the frequency domain.

FIG. 25 shows a partial block diagram illustrating a configuration in which the signals area transformed into the time domain after they have been combined in the frequency domain. The configuration shown in this figure is a configuration that can be provided instead of limited signal separation unit 60-k, time domain transformation unit 70-k and signal combination unit 80 in FIG. 1.

In this example, the frequency-domain signal values $Y_{kq}^{\Pi kq}(f,m)$ output of the limited signal separation units 601-k from all systems K are combined in the frequency domain by signal combination unit 602, and are then transformed into the time domain by time domain transformation unit 603. When there is only one separated signal $Y_{kq}^{\Pi kq}(f,m)$ having the same tag as at a certain frequency f, signal combination unit 602 obtains the separated signal value from the following formula:

$$Y_i(f,m) = Y_{kq}^{\Pi kq}(f,m)$$

Also, when there are two or more separated signals $Y_{kq}^{\Pi kq}(f, m)$ having the same tag $a_i$ at a certain frequency f, $Y_i(f,m)$ is obtained as, for example, the mean of the separated signals $Y_{kq}^{\Pi kq}(f,m)$ having the same tag $a_i$ as follows:

FORMULA 51

$$Y_i(f, m) = \frac{1}{K} \sum_{\Pi_{kq}=a_i} Y_{kq}^{\Pi_{kq}}(f, m)$$

(where K is the number of separated signals having the same tag $a_i$)

Finally, time domain transformation unit 603 performs a short time inverse Fourier transform or the like to transform into the time domain $y_i(t)$ the output signal values $Y_i(f,m)$ that have been combined in the frequency domain.

Also, in the first through eighth embodiments, the signal combination process was performed by applying a tag to each separated signal, but instead of applying a tag to each separated signal, the output signals could be combined by using temporary memory unit 90 to store the set $G_k$ of V representative values corresponding to the signals separated in each system k.

For example, when $G_k$ does not include the same representative values in a plurality of systems, all the separated signals $Y_{kq}(t)$ could be output as the final separated signals $y_i(t)$ (i=1, ..., N). Alternatively, all the separated signals $Y_{kq}(f,m)$ in the frequency domain could be taken as the final separated signals $Y_i(f,m)$ (i=1, ..., N) in the frequency domain and then transformed into time-domain signals.

Also, when $G_k$ includes K of the same representative values (where K≧2) in a plurality of systems, the signal correlations are calculated for all combinations of the separated signals of system k $y_{kq}(t)$ (q=1, ..., $V_k$; where $V_k$ is the number of elements in $G_k$) with the separated signals of system k' $y_{k'R}(t)$ (R=1, ..., $V_{k'}$), and the mean of $y_{kq}(t)$ and $y_{k'R}(t)$ is obtained for K elements with where there is a high correlation. This is repeated for a plurality of systems that include the same representative value, thereby combining the signals. Alternatively, by performing the same operations on all the separated signals in the frequency domain, the signals could be combined in the frequency domain and then transformed into the time domain, Furthermore, signal separation could be performed by a system that combines elements of the abovementioned first through ninth embodiments.

For example, the representative vectors could be obtained by the method of the eighth embodiment, and then the limited signals could be separated by the method of the second embodiment. For example, using the representative vectors obtained by representative value calculation unit 430 (FIG. 13), Formula (18) of the second embodiment could be replaced by obtaining $M_k(f,m)$ and $M_{DC}(f,m)$ as follows:

FORMULA 52

$$M_k(f,m) = \begin{cases} 1 & D(X(f,m), a_k(f)) < \min_{k \neq j} D(X(f,m), a_j(f)) \\ 0 & \text{otherwise} \end{cases}$$

$$M_{DC}(f,m) = \begin{cases} 1 & \max_{a_p(f) \in G_k} D(X(f,m), a_p(f)) < \min_{a_q(f) \in G_k^c} D(X(f,m), a_q(f)) \\ 0 & \text{otherwise} \end{cases}$$

(See FIG. 8 for an illustration of $M_k(f,m)$ and $M_{DC}(f,m)$), and then the limited signals could be separated by the same procedure as limited signal separation unit 160-k in the second embodiment.

Here, instead of obtaining the abovementioned $M_k(f,m)$ and $M_{DC}(f,m)$, it is also possible to determine $\hat{X}_k(f,m)=M_k X$ directly as follows:

FORMULA 53

$$\hat{X}_k(f,m) = \begin{cases} X(f,m) & D(X(f,m), a_k(f)) < \min_{k \neq j} D(X(f,m), a_j(f)) \\ 0 & \text{otherwise} \end{cases}$$

(corresponding to the processing performed by mask generation unit 151-k and multiplication arithmetic unit 161-k in FIG. 8), and to generate the limited signal values as follows:

$$\hat{X}_k(f,m) = \begin{cases} X(f,m) & \max_{a_p(f) \in G_k} D(X(f,m), a_p(f)) < \min_{a_q(f) \in G_k^c} D(X(f,m), a_q(f)) \\ 0 & \text{otherwise} \end{cases}$$

(corresponding to the processing performed by mask generation unit 151-k and limited signal extraction unit 152-k in FIG. 8).

Alternatively, instead of generating $M_k(f,m)$ in mask generation unit 151-k (FIG. 8), the representative vectors [$a_1$, ..., $a_N$] (where $a_1$ is a column vector) obtained by representative value calculation unit 430 (FIG. 13) could be gathered together as H^ in mixing process estimation unit 162-k (FIG. 8) and used as an estimated mixing matrix.

Also, instead of the Fourier transforms and inverse Fourier transforms used to transform between the time domain and frequency domain in the above embodiments, other forms of transformation can be used such as wavelet transformation, DFT filter banks, or polyphase filter banks (see, e.g., R. E. Crochiere and L. R. Rabiner: "Multirate Digital Signal Processing," Eaglewood Cliffs, N.J.: Prentice-Hall, 1983 (ISBN 0-13-605162-6)).

Computer implementations of the abovementioned first through ninth embodiments can be configured as described below.

Figure 26:
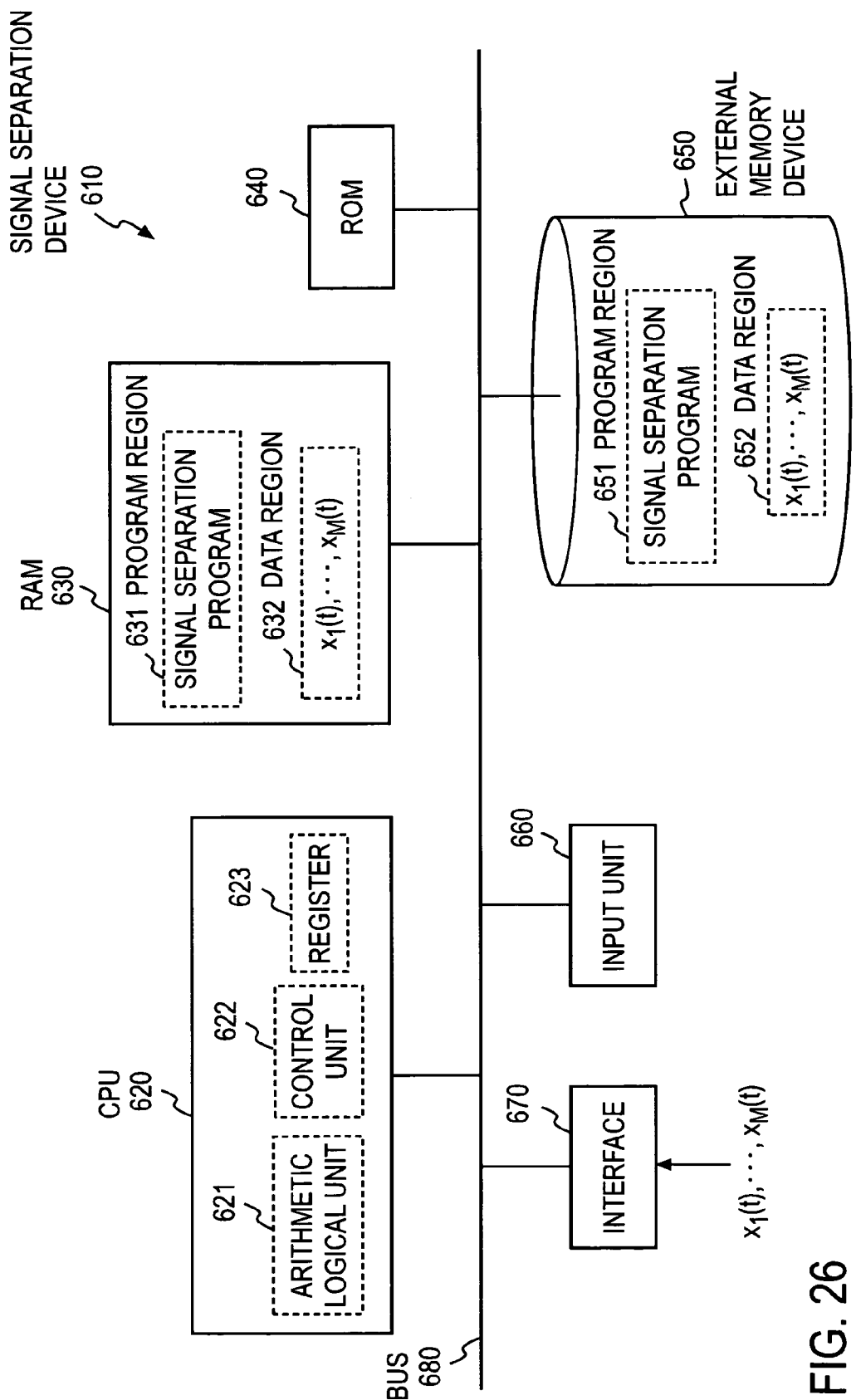
[FIG. 26] An example of a signal separation device wherein each embodiment is configured by a computer.
Figure 27A:
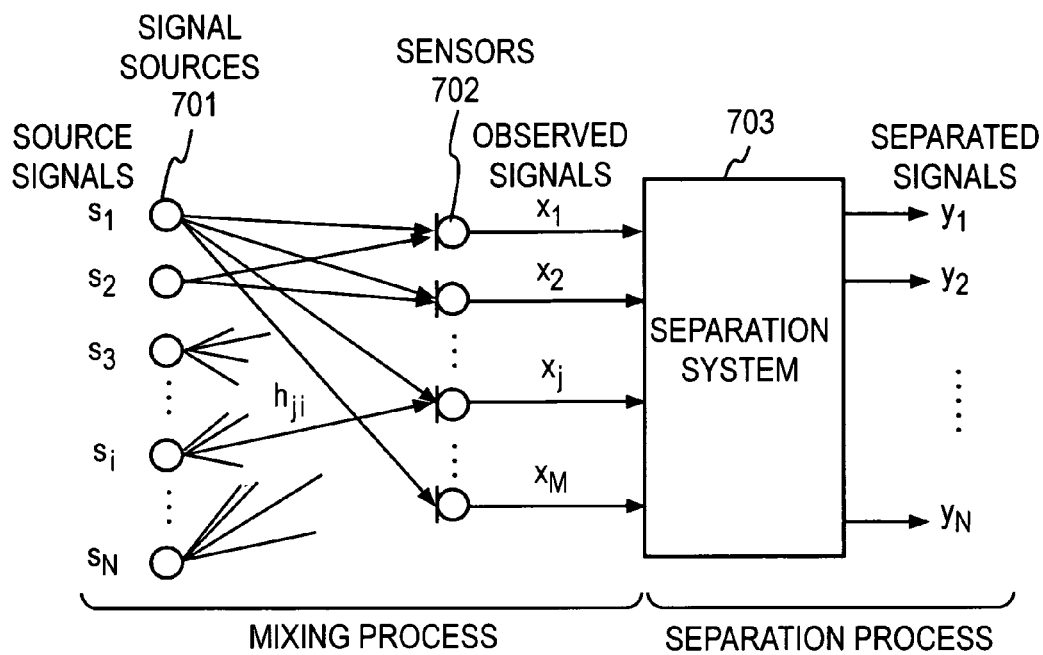
[FIG. 27] A block diagram showing a conceptual example of a conventional blind source separation technique (A), and a block diagram of an ICA separation process (B).
Figure 27B:
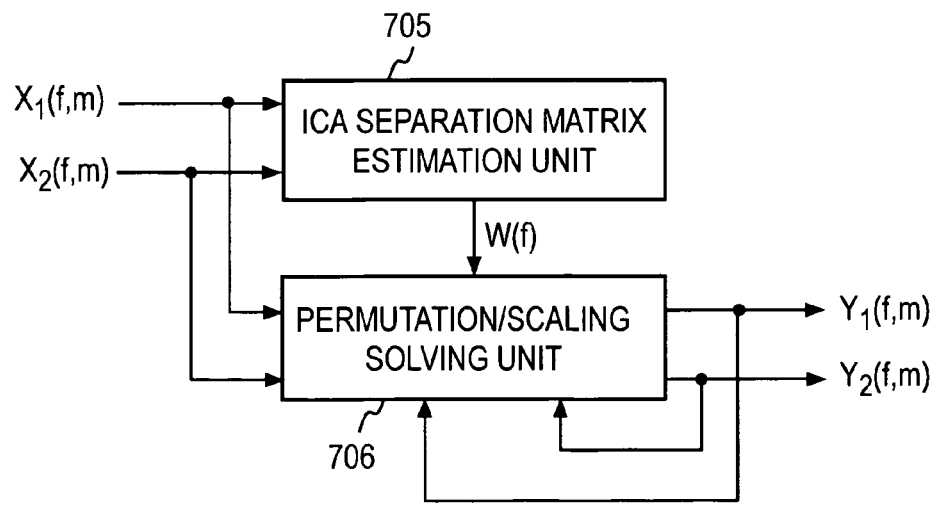
Figure 28:
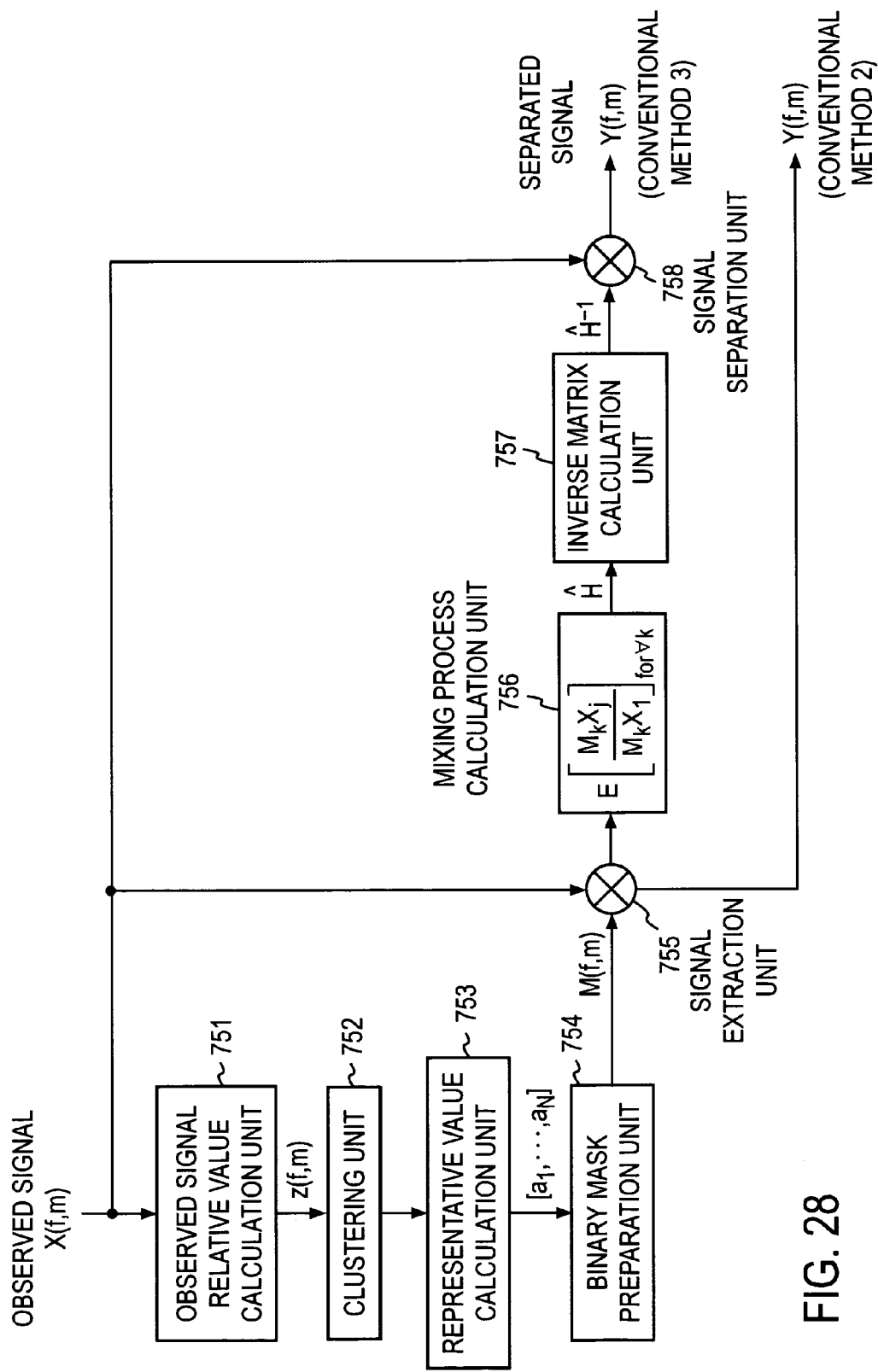
[FIG. 28] A block diagram illustrating a method based on sparsity and a method for estimating a mixing matrix based on sparsity.
Figure 29A:
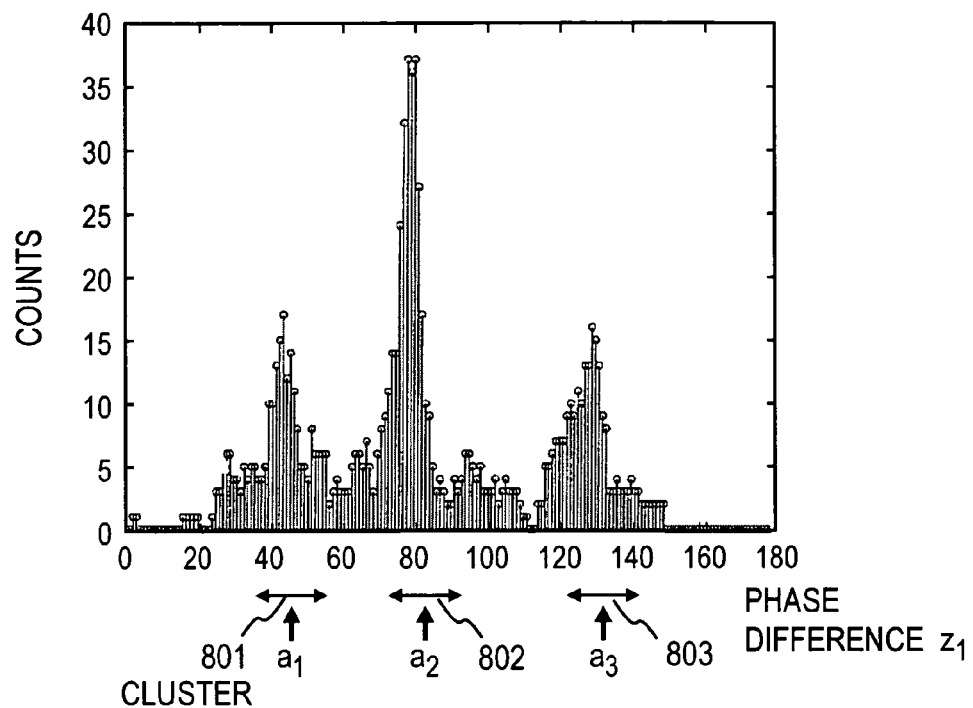
[FIG. 29] An example of the distribution of relative values.
Figure 29B:
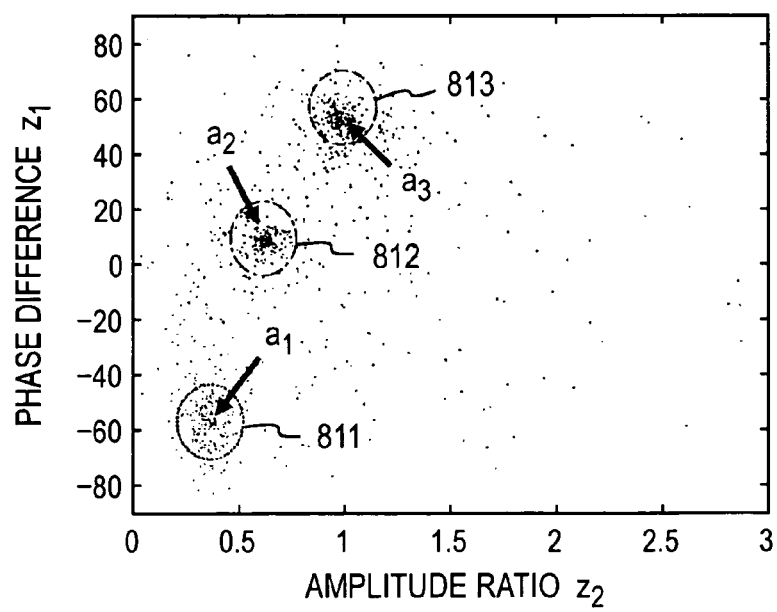

FIG. 26 shows an example of a signal separation device 610 in which each embodiment is configured on a computer.

The signal separation device 610 of this example includes a CPU (central processing unit) 620, RAM (random access memory) 630, ROM (read only memory) 640, an external memory device 650, an input unit 660, an interface 670, and a bus 680.

CPU 620 is a central processing unit such as a RISC (reduced instruction set computer) or CISC (complex instruction set computer) chip incorporating an arithmetic logical unit 621, a control unit 622, and a register 623. Register 623 is a fast memory such as DRAM (dynamic random access memory) or SRAM (static random access memory), for example.

Also, RAM 630 is a rewritable semiconductor memory such as a DRAM, SRAM, flash memory, or NV (nonvolatile) RAM. ROM 640 is a read-only semiconductor memory such as an MROM (mask read-only memory), for example, and is used to store various programs, data and the like.

External memory device 650 is, for example, a hard disk device, a magnetic recording device such as a flexible disk or magnetic tape device, an optical disk device such as a DVD-RAM (random access memory) or CD-R (recordable)/RW (rewritable) device, a magneto-optical recording device such as an MO (magneto-optical) disc device, or a semiconductor memory such as an EEPROM (electronically erasable programmable read-only memory) or flash memory.

Input unit 660 is an input device such as a keyboard, mouse, joystick or the like. Interface 670 is, for example, an input/output port that is used for the input and/or output of data, and can be connected to various types of device such as sensors, communication boards, and memory devices.

The processing algorithm performed by signal separation device 610 is, for example, declared in the form of a signal separation program which is, for example, recorded on a recording medium that can be read by the computer. Examples of recording media that can be read by computer include any kind of magnetic recording device, optical disk, magneto-optical recording medium, semiconductor memory or the like; specifically, it is possible to use a magnetic recording device such as a hard disk device, a flexible disk device or a magnetic tape device, an optical disk such as a DVD (digital versatile disc), DVD-RAM (random access memory), CD-ROM (compact disc read only memory) or CD-R (recordable)/RW (rewritable), a magneto-optical recording medium such as an MO (magneto-optical disc), or a semiconductor memory such as an EEPROM (electronically erasable programmable read-only memory).

The signal separation program can be circulated by such means as selling, transferring, or lending a portable recording medium such as a DVD or CD-ROM on which this program is recorded, for example. Alternatively, a configuration could be employed whereby this program is stored in the memory device of a server computer and circulated by transmitting the program across a network from the server computer to another computer.

When processing is performed in signal separation device 610, it first downloads into the program region 651 of external memory device 650 a signal separation program recorded on a portable recorded medium or a signal separation program transmitted from a server computer, for example.

Also, the time-domain observed signals $x_j(t)$ (j=1, ..., M) observed by each sensor are pre-stored in data region 652 of external memory device 650. The storage of these observed signals $x_j(t)$ may be achieved by inputting the observed signals $x_j(t)$ sent from the sensors into interface 670 and storing them in external memory device 650 via bus 680, or by employing a configuration where the observed signals $x_j(t)$ are pre-stored in external memory device 650 by a separate device, and this external memory device 650 is then connected to bus 680.

Next, for example, under the control of control unit 622 of CPU 620, the signal separation program is sequentially read in from the program region 651 of external memory device 650, and is stored in the program region 631 of RAM 630. The signal separation program stored in RAM 630 is read into CPU 620, and the control unit 622 of CPU 620 performs various processes according to the contents of this signal separation program, such as inputting and outputting data, performing computations in arithmetic logical unit 621, and storing data in register 623.

When the processing by CPU 620 is started, CPU 620 reads out the observed signals $x_j(t)$ from data region 652 of external memory device 650, for example, and writes them to data region 632 of RAM 630, for example. CPU 620 then performs each of the abovementioned processes under the control of control unit 622 while sequentially reading out the signal separation program from the program region 631 of RAM 630 and the observed signals $x_j(t)$ from data region 632. Here, for example, RAM 630 or external memory device 650 performs the functions of memory unit 2 or 501 in the first through ninth embodiments, and RAM 630 or register 623 performs the functions of temporary memory unit 90 or 522 in the first through ninth embodiments.

Also, as another embodiment of this program, CPU 620 could read the program directly from a portable recording medium and execute the processing according to this program, or CPU 620 could sequentially execute processing according to programs transmitted to it from a server computer. It is also possible to employ a configuration where when abovementioned processing is performed by a so-called ASP (application service provider), whereby, instead of transmitting programs from a server computer to this computer, the processing functions are implemented just by issuing instructions and gathering results.

Furthermore, in addition to performing the above processes in the temporal sequence described above, they may also be performed in parallel or individually according to requirements or to increase the performance of the device that executes the processing. And, needless to say, it is possible to make other suitable modifications without departing from the essence of the present invention.

POTENTIAL INDUSTRIAL USES

With this invention, it is possible to separate and extract target signals even, for example, in environments where various types of noise and interference signals are present. For example, when applied to the field of audio engineering, it could be used to construct a speech recognition system that achieves a high recognition rate by separating and extracting the target speech even in situations where the input microphones of the speech recognition equipment are some distance away from the speaker and pick up sounds other than the speech produced by the target speaker.

The invention claimed is:

1. A signal separation method that separates and extracts signals under conditions where N (N≧2) signals are mixed together and observed with M sensors, comprising:
   a procedure that transforms the observed signal values observed by said sensors into frequency-domain signal values,
   a procedure that uses said frequency-domain signal values to calculate at each frequency the relative values of the observed values between said sensors (including mapping these relative values),
   a procedure that clusters said relative values into N clusters,
   a procedure that calculates a representative value for each of said clusters,
   a procedure that uses said representative values to generate a mask for the purpose of extracting, from said frequency-domain signal values, mixed signal values comprising the signals emitted from V (2≦V≦M) signal sources, a procedure that uses said mask to extract said mixed signal values from said frequency-domain signal values, and a procedure that separates and extracts the values of V signals from said mixed signal values.

2. A signal separation method according to claim 1,
wherein said mask is a function that takes a high level value for said relative values that are within a prescribed range that includes V said representative values, and takes a low level value for said representative values that are not inside said prescribed range, and wherein the procedure that uses said mask to extract said mixed signal values from said frequency-domain signal values is a procedure in which said frequency-domain signal values are multiplied by said mask.

3. A signal separation method according to claim 1, wherein said mask is a function that takes a low level value for said relative values that are within a prescribed range that includes V said representative values, and takes a high level value for said representative values that are not inside said prescribed range, and wherein the procedure that uses said mask to extract said mixed signal values from said frequency-domain signal values is a procedure in which the values obtained by multiplying said frequency-domain signal values by said mask are subtracted from said frequency-domain signal values.

4. A signal separation method according to claim 2,
wherein said mask is a function that the transitions from said high level value to said low level value that accompany changes of said relative value occur in a continuous fashion.

5. A signal separation method according to claim 1,
wherein the procedure that uses said representative values to generate a mask for the purpose of extracting, from said frequency-domain signal values, mixed signal values comprising the signals emitted from V ($2 \leq V \leq M$) signal sources is a procedure whereby said mask is generated by using the directional characteristics of a null beamformer (NBF).

6. A signal separation method according to claim 1, wherein the procedure that uses said representative values to generate a mask for the purpose of extracting, from said frequency-domain signal values, mixed signal values comprising the signals emitted from V ($2 \leq V \leq M$) signal sources includes:

a procedure that generates an (N−V+1)×(N−V+1) delay matrix $H_{NBF}(f)$ in which the element at (j,i) is equal to $\exp(j2\pi f \tau_{ji})$, where $\tau_{ji} (d_j/v_e) \cos \theta_i$, $v_e$ is the velocity of the signals, $d_j$ is the distance between sensor 1 and sensor j (j=1, ..., N−V+1), $\theta_1$ is any one of the estimated directions of the signal sources corresponding to the V said representative values, $\theta_i$ (i=2, ..., N−V+1) are the estimated directions of the signal sources corresponding to the other said representative values of the V said representative values, and f is a frequency variable, a procedure that calculates the inverse matrix $W(f) = H_{NBF}^{-1}(f)$ of delay matrix $H_{NBF}(f)$ as a NBF matrix $W(f)$, a procedure that generates a directional characteristics function $$F(f, \theta) = \sum_{k=1}^{N-V+1} W_{1k}(f) \exp(j2\pi f d_k \cos\theta/v_e)$$

where θ is a signal arrival direction variable, and the first row element of said NBF matrix W(f) is $W_{1k}(f)$, and a procedure that uses said directional characteristics function F(f,θ) to generate said mask.

7. A signal separation method according to claim 1,
wherein the procedure that uses said representative values to generate a mask for the purpose of extracting, from said frequency-domain signal values, mixed signal values comprising the signals emitted from V ($2 \leq V \leq M$) signal sources includes:

a procedure that generates a function consisting of a single-peak function convolved with a binary mask, which is a function that takes a high level value for said relative values that are within a prescribed range including V said representative values and takes a low level value for said representative values that are not inside said prescribed range and where changes of the relative value are accompanied by discontinues transitions from said high level value to said low level value, and a procedure that generates said mask as a function in which said relative values are substituted into said function consisting of a single-peak function convolved with a binary mask.

8. A signal separation method according to claim 1,
wherein the procedure that uses said representative values to generate a mask for the purpose of extracting, from said frequency-domain signal values, mixed signal values comprising the signals emitted from V (2<=V<=M) signal sources is a procedure that generates said mask as a single-peak function obtained by mapping the differences between a first odd function that takes a value of zero when said relative value is the lower limit value $a_{min}$ in a prescribed range including V said representative values and a second odd function that takes a value of zero when said representative value is the upper limit value $a_{max}$ in said prescribed range.

9. A signal separation method according to one of claims 2 or 3, wherein said mask is a function that transitions from said high level value to said low level value occur in a discontinues fashion.

10. A signal separation method that separates and extracts signals under conditions where N ($N \geq 2$) signals are mixed together and observed with M sensors, comprising:

a procedure that transforms the observed signal values observed by said sensors into frequency-domain signal values, a procedure that uses said frequency-domain signal values to calculate at each frequency the relative values of the observed values between said sensors (including mapping these relative values), a procedure that clusters said relative values into N clusters, a procedure that calculates a representative value for each of said clusters, a procedure that generates a mask function that takes a high level value for said relative values that are within a prescribed range that includes one of the said representative values, and takes a low level value for said representative values that are not inside said prescribed range, wherein the transitions from said high level value to said low level value that accompany changes of said relative value occur in a continuous fashion, and a procedure that multiplies said frequency-domain signal values by said mask to extract the signal emitted from one signal source.

11. A signal separation method that separates and extracts signals under conditions where N (N≧2) signals are mixed together and observed with M sensors, comprising:

a procedure that transforms the observed signal values $x_1(t), \ldots, x_M(t)$ observed by said sensors into frequency-domain signal values $X_1(f,m), \ldots, X_M(f,m)$, a procedure that clusters first vectors $X(f,m)=[X_1(f,m), \ldots, X_M(f,m)]$ comprising said frequency-domain signal values $X_1(f,m), \ldots, X_M(f,m)$ into N clusters $C_i(f)$ (i1, ..., N) at each frequency f, a procedure that calculates second vectors $a_i(f)$ to represent each said cluster $C_i(f)$, a procedure that extracts V (1≦V≦M) third vectors $a_p(f)$ (p=1, ..., V) from said second vectors $a_i(f)$, a procedure that generates a mask M(f,m) represented by the formula $$M(f, m) = \begin{cases} 1 & \max_{a_p(f) \in G_k} D(X(f, m), a_p(f)) < \min_{a_q(f) \in G_k^c} D(X(f, m), a_q(f)) \\ 0 & \text{otherwise} \end{cases}$$

where $G_k$ is the set of said third vectors $a_p(f)$, $G_k^c$ is the complementary set of $G_k$, and $D(\alpha,\beta)$ is the Mahanalobis square distance between the vectors $\alpha$ and $\beta$, and a procedure that extracts the signal values emitted from V of said signal sources by calculating the product of said mask M(f,m) and said first vectors X(f,m).

12. A signal separation method that separates and extracts signals under conditions where N (N≧2) signals are mixed together and observed with M sensors, wherein a procedure that transforms the observed signal values $x_1(t), \ldots, x_M(t)$ observed by said sensors into frequency-domain signal values $X_1(f,m), \ldots, X_M(f,m)$, a procedure that clusters first vectors $X(f,m)=[X_1(f,m), \ldots, X_M(f,m)]$ comprising said frequency-domain signal values $X_1(f,m), \ldots, X_M(f,m)$ into N clusters $C_i(f)$ (i=1, ..., N) at each frequency f, a procedure that calculates second vectors $a_i(f)$ to represent each said cluster $C_1(f)$, a procedure that extracts V (1≦V≦M) third vectors $a_p(f)$ (p=1, ..., V) from said second vectors $a_i(f)$, and a procedure that judges whether or not said first vectors X(f,m) satisfy the relationship $$\max_{a_p(f) \in G_k} D(X(f,m), a_p(f)) < \min_{a_q(f) \in G_k^c} D(X(f,m), a_q(f)) \quad \text{Formula 56}$$

where $G_k$ is the set of said third vectors $a_p(f)$, $G_k^c$ is the complementary set of $G_k$, and $D(\alpha, \beta)$ is the Mahanalobis square distance between the vectors $\alpha$ and $\beta$, and, if so, extracts said first vectors X(f,m) as the signal values emitted from V of the said signal sources.

13. A signal separation method according to one of claims 11 or 12, wherein said clustering procedure is performed after performing the calculation $$\text{sign}(X_j(f, m)) \leftarrow \begin{cases} X_j(f,m)/|X_j(f,m)| & (|X_j(f,m)| \neq 0) \\ 0 & (|X_j(f,m)| = 0) \end{cases}$$

and $$X(f,m) \leftarrow \begin{cases} X(f,m)/\text{sign}(X_j(f,m)) & (|X_j(f,m)| \neq 0) \\ X(f,m) & (|X_j(f,m)| = 0) \end{cases}.$$

14. A signal separation method according to claim 13, wherein said clustering procedure is performed after performing the calculation $$X(f,m) \leftarrow \begin{cases} X(f,m)/\|X(f,m)\| & (\|X(f,m)\| \neq 0) \\ X(f,m) & (\|X(f,m)\| = 0) \end{cases}$$

(where the notation $\|X(f,m)\|$ denotes the norm of X(f,m)). After said formula $$X(f,m) \leftarrow \begin{cases} X(f,m)/\text{sign}(X_j(f,m)) & (|X_j(f,m)| \neq 0) \\ X(f,m) & (|X_j(f,m)| = 0) \end{cases}.$$

15. A signal separation method that separates and extracts signals under conditions where N (N≧2) signals are mixed together and observed with M sensors, comprising a procedure that transforms the observed signal values $x_1(t), \ldots, x_M(t)$ observed by said sensors into frequency-domain signal values $X_1(f,m), \ldots, X_M(F,m)$, a procedure that clusters first vectors $X(f,m)=[X_1(f,m), \ldots, X_M(f,m)]^T$ comprising said frequency-domain signal values $X1(f,m), \ldots, X_M(gm)$ into N clusters $C_i(f)$ (i=1, ..., N) at each frequency f, a procedure that calculates second vectors $a_i(f)$ to represent each said cluster $C_i(f)$, a procedure that calculates an N-row×M-column separation matrix W(f,m) that is the Moore-Penrose pseudo-inverse matrix of an M-row×N-column matrix in which 0 or more of the N said second vectors $a_i(f)$ are substituted with zero vectors, and a procedure that calculates a separated signal vector $Y(f,m)=[Y_1(f,m), \ldots, Y_N(f,m)]^T$ by performing the calculation Y(f,m)=W(f,m)X(f,m).

16. A signal separation method according to claim 15, wherein:

the procedure that calculates said separation matrix W(f,m) is a procedure that selects min(M,N) said second vectors $a_i(f)$, generates a matrix A'(f,m) whose columns are the selected min(M,N) said second vectors $a_i(f)$ and max (N−M,0) zero vectors, and calculates said separation matrix W(f,m) as the Moore-Penrose pseudo-inverse matrix of said matrix A'(f,m).

17. A signal separation method according to claim 15, wherein:

the procedure used to calculate said separation matrix W(f, m) when N>M is a procedure that selects M said second vectors $a_i(f)$ in each discrete time interval m, generates a matrix A'(f,m) whose columns are the selected M said second vectors $a_i(f)$ and N−M zero vectors, and calculates said (time-dependent) separation matrix W(f,m) as the Moore-Penrose pseudo-inverse matrix of said matrix A'(f,m), and the procedure used to calculate said separation matrix W(f,m) when N≦M is a procedure that calculates the Moore-Penrose pseudo-inverse matrix of a matrix comprising N said second vectors in each said cluster $C_i(f)$ to yield said (time-invariant) separation matrix W(f,m).

18. A signal separation method according to claim 15, wherein:

said clustering procedure is performed after performing the calculation $$\text{sign}(X_j(f,m)) \leftarrow \begin{cases} X_j(f,m)/|X_j(f,m)| & (|X_j(f,m)| \neq 0) \\ 0 & (|X_j(f,m)| = 0) \end{cases}$$

and $$X(f,m) \leftarrow \begin{cases} X(f,m)/\text{sign}(X_j(f,m)) & (|X_j(f,m)| \neq 0) \\ X(f,m) & (|X_j(f,m)| = 0) \end{cases}.$$

19. A signal separation method according to claim 18, wherein:
said clustering procedure is performed after performing the calculation $$X(f,m) \leftarrow \begin{cases} X(f,m)/\|X(f,m)\| & (\|X(f,m)\| \neq 0) \\ X(f,m) & (\|X(f,m)\| = 0) \end{cases}$$

(where the notation X(f,m) denotes the norm of X(f,m)) in addition to said formula $$X(f,m) \leftarrow \begin{cases} X(f,m)/\text{sign}(X_j(f,m)) & (|X_j(f,m)| \neq 0) \\ X(f,m) & (|X_j(f,m)| = 0) \end{cases}.$$

20. A signal separation method according to claim 16, wherein
said procedure that selects min(M,N) said second vectors $a_i(f)$ comprises a procedure that initializes fourth vectors e with said first vectors X(f,m), and
a procedure that repeats a process min(M,N) times wherein said process comprises steps for selecting said second vectors $a_{q(u)}(f)$ that maximize the absolute value of the dot product of $a_{q(u)}(f)/\|a_{q(u)}(f)\|$ and said fourth vectors, sets setting up a matrix $Q=[a_{q(1)}(f), \ldots, a_{q(k)}(f)]$ representing the subspace subtended by all said second vectors $a_{q(u)}$ (u=1, ..., k) selected so far, performing the calculation $P=Q(Q^H Q)^{-1}Q_H$, and updating the fourth vectors e with $e=X(f,m)-P\cdot X(f,m)$.

21. A signal separation device that separates and extracts signals under conditions where N (N≧2) signals are mixed together and observed with M sensors, comprising:
a memory unit that stores the observed signal values observed by said sensors;
and a processor which is connected to said memory unit and is configured to transform said observed signal values into frequency-domain signal values, to use said frequency-domain signal values to calculate at each frequency the relative values of the observed values between said sensors (including mapping these relative values), to cluster said relative values into N clusters, to calculate a representative value for each of said clusters, to use said representative values to generate a mask for the purpose of extracting, from said frequency-domain signal values, mixed signal values comprising the signals emitted from V (2≦V≦M) signal sources, to use said mask to extract said mixed signal values from said frequency-domain signal values, and to separate and extract the values of V signals from said mixed signal values.

22. A signal separation device that separates and extracts signals under conditions where N (N≧2) signals are mixed together and observed with M sensors, comprising:
a memory unit that stores the observed signal values observed by said sensors;
and a processor which is connected to said memory unit and is configured to transform said observed signal values into frequency-domain signal values, to use said frequency-domain signal values to calculate at each frequency the relative values of the observed values between said sensors (including mapping these relative values), to cluster said relative values into N clusters to calculate a representative value for each of said clusters, to generate a mask, which is a function that takes a high level value for said relative values that are within a prescribed range that includes one said representative value, and takes a low level value for said representative values that are not inside said prescribed range, and where the transitions from said high level value to said low level value that accompany changes of said relative value occur in a continuous fashion, and to extract the values of a signal emitted from one signal source by multiplying said frequency-domain values by said mask.

23. A signal separation device that separates and extracts signals under conditions where N (N≧2) signals are mixed together and observed with M sensors, comprising:
a memory unit that stores the observed signal values $x_1(t), \ldots, x_M(t)$ observed by said sensors;
and a processor which is connected to said memory unit and is configured to transform said observed signal values $x_1(t), \ldots, x_M(t)$ into frequency-domain signal values $X_1(f,m), \ldots, X_M(f,m)$, to cluster first vectors $X(f,m)=[X_1(f,m), \ldots, X_M(f,m)]$ comprising said frequency-domain signal values $X_1(f,m), \ldots, X_M(f,m)$ into N clusters $C_i(f)$ (i=1, ..., N) at each frequency f, to calculate second vectors $a_i(f)$ to represent each said cluster $C_i(f)$, and extracts V (1≦V≦M) third vectors $a_p(f)$ (p=1, ..., V) from said second vectors $a_i(f)$, to generate a mask M(f,m) represented by the formula $$M(f,m) = \begin{cases} 1 & \max_{a_p(f) \in G_k} D(X(f,m), a_p(f)) < \min_{a_q(f) \in G_k^c} D(X(f,m), a_q(f)) \\ 0 & \text{otherwise} \end{cases}$$

where $G_k$ is the set of said third vectors $a_p(f)$, $G_k^c$ is the complementary set of $G_k$, and D(αβ) is the Mahanalobis square distance between the vectors α and β, and to extract the signal values emitted from V of the said signal sources by calculating the product of said mask M(f,m) and said first vectors X(f,m).

24. A signal separation device that separates and extracts signals under conditions where N (N≧2) signals are mixed together and observed with M sensors, comprising:
a memory unit that stores the observed signal values $x_1(t), \ldots, x_M(t)$ observed by said sensors;
and a processor which is connected to said memory unit and is configured to transform said observed signal values $x_1(t), \ldots, x_M(t)$ into frequency-domain signal values $X_1(f,m), \ldots, X_M(f,m)$, to cluster first vectors $X(f,m)=[X_1(f,m), \ldots, X_M(f,m)]$ comprising said frequency-domain signal values $X_1(f,m), \ldots, X_M(f,m)$ into N clusters $C_i(f)$ (i=1, ..., N) at each frequency f, to calculate second vectors $a_i(f)$ to represent each said cluster $C_i(f)$, to extract V (1≦V≦M) third vectors $a_p(f)$ (p=1, ..., V) from said second vectors $a_i(f)$, to judge whether or not said first vectors satisfy the relationship $$\max_{a_p(f) \in G_k} D(X(f,m), a_p(f)) < \min_{a_q(f) \in G_k^c} D(X(f,m), a_q(f)) \quad \text{Formula 62}$$

where $G_k$ is the set of said third vectors $a_p(f)$, $G_k^c$ is the complementary set of $G_k$, and $D(\alpha,\beta)$ is the Mahanalobis square distance between the vectors $\alpha z$ and $\beta$, and to extract said first vectors $X(f,m)$ satisfying said relationship as the signal values emitted from V of the said signal sources.

25. A signal separation device that separates and extracts signals under conditions where N ($N \geq 2$) signals are mixed together and observed with M sensors, comprising:
a memory unit that stores the observed signal values $x_1(t), \ldots, x_M(t)$ observed by said sensors;
and a processor which is connected to said memory unit and is configured to transform said observed signal values $X_1(t), \ldots, X_M(t)$ into frequency-domain signal values $X_1(f,m), \ldots, X_M(f,m)$, to cluster first vectors $X(f,m) = [X_1(f,m), \ldots, X_M(f,m)]^T$ comprising said frequency-domain signal values $X_1(f,m), \ldots, X_M(gm)$ into N clusters $C_i(f)$ ($i=1, \ldots, N$) at each frequency f, to calculate second vectors $a_i(f)$ to represent each said cluster $C_i(f)$, to calculate an N-row×M-column separation matrix $W(f,m)$ that is the Moore-Penrose pseudo-inverse matrix of an M-row×N-column matrix in which 0 or more of the N said second vectors $a_i(f)$ are substituted with zero vectors, and to calculate a separated signal vector $Y(f,m) = [Y_1(f,m), \ldots, Y_N(f,m)]^T$ by performing the calculation $Y(f,m) = W(f,m)X(f,m)$.

26. A computer readable medium storing a signal separation program, which when executed by a computer causes the computer to perform:
a procedure that transforms observed signal values, which are mixtures of N ($N \geq 2$) signals observed with M sensors, into frequency-domain values,
a procedure that uses said frequency-domain signal values to calculate at each frequency the relative values of the observed values between said sensors (including mapping these relative values),
a procedure that clusters said relative values into N clusters,
a procedure that calculates a representative value for each of said clusters,
a procedure that uses said representative values to generate a mask for the purpose of extracting, from said frequency-domain signal values, mixed signal values comprising the signals emitted from V ($2 \leq V \leq M$) signal sources,
a procedure that uses said mask to extract said mixed signal values from said frequency-domain signal values, and
a procedure that separates and extracts the values of V signals from said mixed signal values.

27. A computer readable medium storing a signal separation program, which when executed by a computer, causes the computer to perform:
a procedure that transforms observed signal values, which are mixtures of N ($N \geq 2$) signals observed with M sensors, into frequency-domain values,
a procedure that uses said frequency-domain signal values to calculate at each frequency the relative values of the observed values between said sensors (including mapping these relative values),
a procedure that clusters said relative values into N clusters,
a procedure that calculates a representative value for each of said clusters,
a procedure that generates a mask, which is a function that takes a high level value for said relative values that are within a prescribed range that includes one of said representative values, and takes a low level value for said representative values that are not inside said prescribed range, wherein the transitions from said high level value to said low level value that accompany changes of said relative value occur in a continuous fashion,
and a procedure that extracts the signal values emitted from one signal source by multiplying said frequency-domain signal values by said mask.

28. A computer readable medium storing a signal separation program, which when executed by a computer, causes the computer to perform:
a procedure that transforms observed signal values $x_i(t), \ldots, x_M(t)$, which are mixtures of N ($N \geq 2$) signals observed by M sensors, into frequency-domain signal values $X_1(f,m), \ldots, X_M(f,m)$.
a procedure that clusters first vectors $X(f,m) = [X_1(f,m), \ldots, X_M(f,m)]$ comprising said frequency-domain signal values $X_1(f,m), \ldots, X_M(f,m)$ into N clusters $C_i(f)$ ($i=1, \ldots, N$) at each frequency f,
a procedure that calculates second vectors $a_i(f)$ to represent each said cluster $C_i(f)$,
a procedure that extracts V ($1 \leq V \leq M$) third vectors $a_p(f)$ ($p=1, \ldots, V$) from said second vectors $a_i(f)$,
a procedure that generates a mask $M(f,m)$ represented by the formula $$M(f,m) = \begin{cases} 1 & \max_{a_p(f) \in G_k} D(X(f,m), a_p(f)) < \min_{a_q(f) \in G_k^c} D(X(f,m), a_q(f)) \\ 0 & \text{otherwise} \end{cases}$$

where $G_k$ is the set of said third vectors $a_p(f)$, $G_k^c$ is the complementary set of $G_k$, and $D(\alpha,\beta)$ is the Mahanalobis square distance between the vectors $\alpha$ and $\beta$,
and a procedure that extracts the signal values emitted from V of said signal sources by calculating the product of said mask $M(f,m)$ and said first vectors $X(f,m)$.

29. A computer readable medium storing signal separation program, which when executed by a computer, causes the computer to perform:
a procedure that transforms observed signal values $x_1(t), \ldots, x_M(t)$, which are mixtures of N ($N \geq 2$) signals observed by M sensors, into frequency-domain signal values $X_1(f,m), \ldots, X_M(f,m)$,
a procedure that clusters first vectors $X(f,m) = [X_1(f,m), \ldots, X_M(f,m)]$ comprising said frequency-domain signal values $X_1(f,m), \ldots, X_M(f,m)$ into N clusters $C_i(f)$ ($i=1, \ldots, N$) at each frequency f,
a procedure that calculates second vectors $a_i(f)$ to represent each said cluster $C_i(f)$,
a procedure that extracts V ($1 \leq V \leq M$) third vectors $a_p(f)$ ($p=1, \ldots, V$) from said second vectors $a_i(f)$, and a procedure that judges whether or not said first vectors $X(f,m)$ satisfy the relationship $$\max_{a_p(f) \in G_k} D(X(f,m), a_p(f)) < \min_{a_q(f) \in G_k^c} D(X(f,m), a_q(f)) \quad \text{Formula 64}$$

where $G_k$ is the set of said third vectors $a_p(f)$, $G_k^c$ is the complementary set of $G_k$, and $D(\alpha,\beta)$ is the Mahanalobis square distance between the vectors $\alpha$ and $\beta$, and, if so, extracts said first vectors $X(f,m)$ as the signal values emitted from V of the said signal sources.

30. A computer readable medium storing a signal separation program, which when executed by a computer, causes the computer to perform:

a procedure that transforms observed signal values $x_1(t), \ldots, x_M(t)$, which are mixtures of N (N≧2) signals observed by M sensors, into frequency-domain signal values $X_1(f,m), \ldots, X_M(f,m)$, a procedure that clusters first vectors $X(f,m)=[X_1(f,m), \ldots, X_M(f,m)]^T$ comprising said frequency-domain signal values $X_1(f,m), \ldots, X_M(f,m)$ into N clusters $C^i(f)$ (i=1, \ldots, N) at each frequency f, a procedure that calculates second vectors $a_i(f)$ to represent each said cluster $C_i(f)$, a procedure that calculates an N-row×M-column separation matrix W(f,m) that is the Moore-Penrose pseudo-inverse matrix of an M-row×N-column matrix in which 0 or more of the N said second vectors $a_i(f)$ are substituted with zero vectors, and a procedure that calculates a separated signal vector $Y(f,m)=[Y_1(f,m), \ldots, Y_N(f,m)]^T$ by performing the calculation $Y(f,m)=W(f,m)X(f,m)$.

* * * * *